United States Patent
Okisu et al.

(10) Patent No.: US 6,806,903 B1
(45) Date of Patent: Oct. 19, 2004

(54) IMAGE CAPTURING APPARATUS HAVING A γ-CHARACTERISTIC CORRECTOR AND/OR IMAGE GEOMETRIC DISTORTION CORRECTION

(75) Inventors: Noriyuki Okisu, Osakasayama (JP); Shinichi Fuji, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/013,055

(22) Filed: Jan. 26, 1998

(30) Foreign Application Priority Data

| Jan. 27, 1997 | (JP) | ............................................. 9-012999 |
| Jan. 27, 1997 | (JP) | ............................................. 9-013000 |
| Jan. 27, 1997 | (JP) | ............................................. 9-013001 |
| Jan. 27, 1997 | (JP) | ............................................. 9-013002 |
| Jan. 27, 1997 | (JP) | ............................................. 9-013003 |
| Jan. 27, 1997 | (JP) | ............................................. 9-013004 |
| Jan. 27, 1997 | (JP) | ............................................. 9-013005 |
| Jan. 27, 1997 | (JP) | ............................................. 9-013006 |
| Jan. 27, 1997 | (JP) | ............................................. 9-013019 |
| Jan. 27, 1997 | (JP) | ............................................. 9-013020 |
| Jan. 27, 1997 | (JP) | ............................................. 9-013021 |

(51) Int. Cl.$^7$ ............................................. H04N 5/202
(52) U.S. Cl. .................. 348/254; 348/222.1; 382/289; 358/519
(58) Field of Search ............................. 348/222.1, 254, 348/674, 690, 169, 170; 382/254, 289, 295, 296; 358/455, 519

(56) References Cited

U.S. PATENT DOCUMENTS

| 5,530,771 A | * | 6/1996 | Maekawa | ................... 382/103 |
| 5,566,251 A | * | 10/1996 | Hanna et al. | ................ 382/284 |
| 5,581,637 A | * | 12/1996 | Cass et al. | ................... 382/284 |
| 5,617,484 A | | 4/1997 | Wada et al. | |
| 5,907,353 A | * | 5/1999 | Okauchi | ................... 348/218.1 |
| 6,271,891 B1 | * | 8/2001 | Ogawa et al. | ............... 358/519 |
| 6,449,004 B1 | * | 9/2002 | Okisu et al. | ................. 348/239 |

FOREIGN PATENT DOCUMENTS

| JP | 2-195774 | 2/1990 | |
| JP | 06113139 | 2/1994 | |
| JP | 406113139 A | * 4/1994 | ............ H04N/1/40 |

* cited by examiner

Primary Examiner—Wendy R. Garber
Assistant Examiner—Matthew L Rosendale
(74) Attorney, Agent, or Firm—McDermott Will & Emery LLP

(57) ABSTRACT

An image capturing apparatus capable of performing a suitable illuminance nonuniformity correction by setting a suitable γ-characteristic every block even in the case that the size of a character image projected on a sensing surface changes according to an image capturing magnification, and capable of extracting a boundary area between a white board portion and a background portion and applying a suitable image processing to this boundary area during the illuminance nonuniformity correction for a picked image, and capable of image capturing a representation such as characters drawn on a white board in such a manner that an obtained image is clear and easy to see by suitably performing an illuminance nonuniformity correction even in the case of color image capturing, and capable of detecting a regularly reflected light with high accuracy and can thereby securely prevent an error of obtaining an image of low quality by image capturing, and capable of preventing an error in flash-image capturing a representation such as characters drawn on a white board under insufficient illumination light and effectively perform an illuminance nonuniformity correction.

47 Claims, 55 Drawing Sheets

FIG. 21A

| A | B | C | D | E | F | G | H |
|---|---|---|---|---|---|---|---|
| I | J | K | L | M | N | O | P |
| Q | R | S | T | U | V | X | Y |
| Z | A | B | C | D | E | F | G |

| A | B | C | D | E | F | G | H |
|---|---|---|---|---|---|---|---|
| I | J | K | L | M | N | O | P |
| Q | R | S | T | U | V | X | Y |
| Z | A | B | C | D | E | F | G |

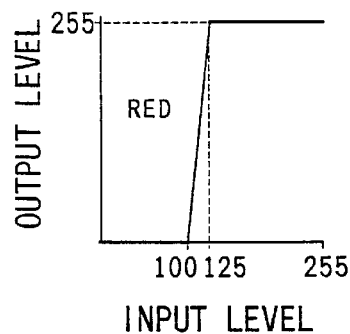
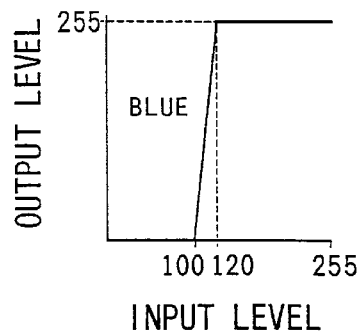
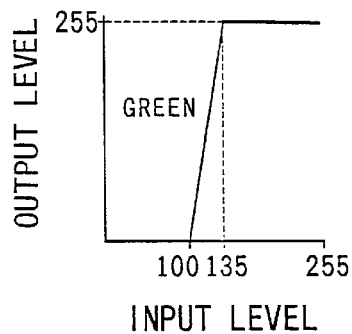
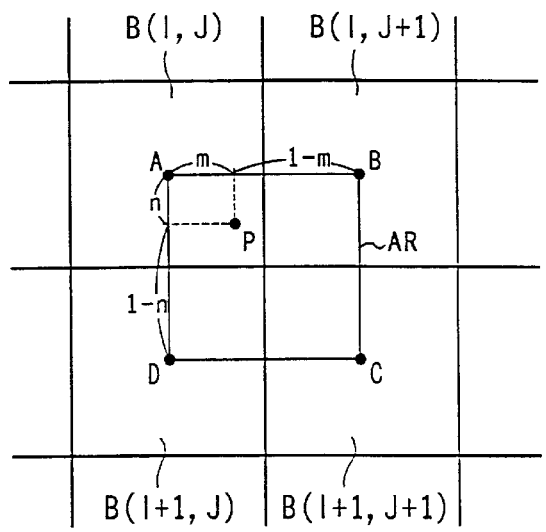

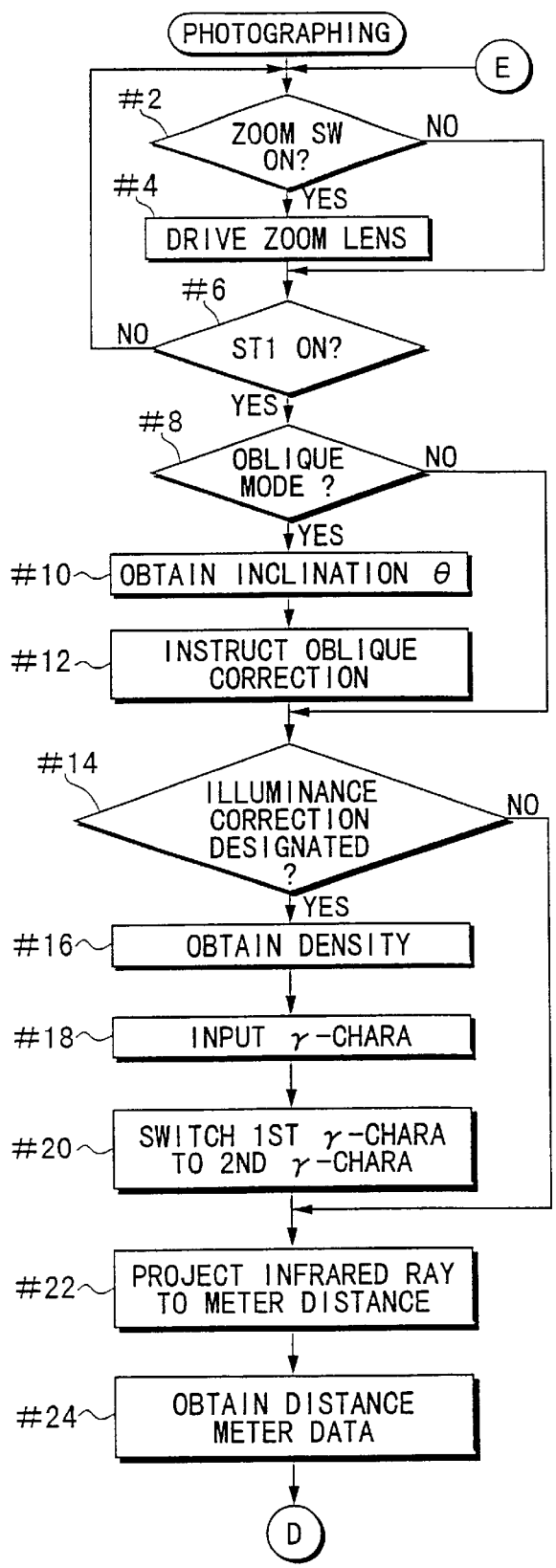

FIG. 44

| B(1,1) | | | | | | | | |
|---|---|---|---|---|---|---|---|---|
| B(2,1) | | | | | | | | |
| B(3,1) | B(3,2) | B(3,3) | B(3,4) | B(3,5) | B(3,6) | B(3,7) | B(3,8) | B(3,9) |
| B(4,1) | | | | | | | | |
| B(5,1) | | | | | | | | |

| B(1,1) | B(1,2) | B(1,3) | B(1,4) | B(1,5) | B(1,6) | B(1,7) | B(1,8) | B(1,9) |
|---|---|---|---|---|---|---|---|---|
| | | | | B(2,5) | | | | |
| | | | | B(3,5) | | | | |
| | | | | B(4,5) | | | | |
| | | | | B(5,5) | | | | |

G

BLOCK OF FLGM=1    BLOCK OF FLGM=0

IMAGE CAPTURING APPARATUS HAVING A γ-CHARACTERISTIC CORRECTOR AND/OR IMAGE GEOMETRIC DISTORTION CORRECTION

This application is based on patent application Nos. 9-12999, 9-13000, 9-13001, 9-13002, 9-13003, 9-13004, 9-13005, 9-13006, 9-13019, 9-13020, and 9-13021 filed in Japan, the contents of which is hereby incorporated by reference.

BACKGROUND OF THE INVENTION

This invention relates to an image capturing apparatus capable of picking up a light image of an object by an image pickup device such as CCD (Charge Coupled Device) by photoelectrically converting it into an electric image and storing it in a storage medium such as a hard disk card after applying a specified image processing thereto.

There have been known electronic cameras as image capturing apparatus. Electronic cameras have, as compared with conventional cameras which record light images on silver halide film, an advantage of picking up images of satisfactory quality by suitably applying an image quality processing to the picked up images according to image capturing purposes and types of objects since the quality of captured image can freely be processed. Thus, the digital cameras are used as devices not only for usual picture taking but also for image capturing images such as characters and figures drawn on a white board at, e.g., a conference hall.

In the case that a white board on which characters, figures, etc. are drawn by an electronic camera, the main purpose of the image capturing is to record a representation represented by characters, figures and the like on the white board. Accordingly, it is desirable to apply such a γ-correction to the captured image as to enhance the clearness of a representation portion (a portion of characters and figures) by making a white portion (white board portion) white. In this case, since a variation in the character density on the white board and an illuminance nonuniformity are large, it is desirable to correct the illuminance nonuniformity (shading correction) by dividing the captured image into a plurality of blocks in a two-dimensional manner and applying the γ-correction block by block.

Specifically, if the white board is assumed to be illuminated by ceiling lights of the room and sunlight coming through the windows, illuminance nonuniformity occurs due to a nonuniform illumination light. By the multiplying effect of this illuminance nonuniformity and a distribution of incident light amount by the so-called law of $Cos^4\theta$ according to which an image at an off-axis object point which is incident on the entrance pupil of the taking lens at an angle $\omega$, a distribution of the output of the image pickup devices such as CCDs largely varies along horizontal and vertical directions on a sensing surface.

Thus, it is desirable to perform the illuminance nonuniformity correction by dividing the picked image into a plurality of blocks in a two-dimensional manner and by applying the γ-correction according to the illuminance in the block for each block. More preferably, it is preferable to set a proper γ-characteristic for each block by making the block size as small as possible in order to avoid the creation of a pseudo line at the boundary of the blocks resulting from a sudden change in the γ-characteristic in the case that the γ-characteristic set for each block largely changes between neighboring blocks.

The γ-characteristic for each block used for the γ-correction performed block by block can be set using the histogram of level-frequency distribution of the pixel data included, for example, in the block. In other words, when an image of characters, figures or the like drawn on the white board is picked up and a histogram of level-frequency distribution of pixel data constituting the picked image is generated, the generated histogram of level-frequency distribution is normally a two-peak distribution histogram having a convex portion corresponding to the character portion at a dark side and a convex portion corresponding to the white portion (white board) at a bright side. The white level is detected from the convex portion corresponding to the white portion, and the γ-characteristic is so set as to convert the pixel data above this white level into pixel data of a predetermined white saturation level.

According to the γ-characteristic setting method using the histogram of level-frequency distribution, the set γ-characteristic varies according to the number and size of characters included in the block in the case that the picked image is divided into rectangular blocks. If the block size in relation to the character size is improper, a suitable γ-characteristic cannot be obtained. For example, if the block size is considerably smaller than a suitable size in relation to the character size, the character portion takes up a large area in the block and an area of the white portion is small. The convex portion corresponding to the white portion of the histogram of level-frequency distribution generated using the pixel data in the block becomes small and it is difficult to determine the white saturation level based on this convex portion. Conversely, if the block size is considerably larger than the suitable size, the convex portion corresponding to the white portion of the histogram of level-frequency distribution generated using the pixel data in the block is sufficiently large. However, since the white portion takes up a large area in the block, the convex portion corresponding to the white portion becomes moderately sloped due to the influence of the nonuniform illuminance. Thus, it is difficult to stably set the white saturation level based on this convex portion.

The character size in a field of the viewfinder easily varies according to the object distance and the image capturing magnification in picture taking. However, it is not preferable that the quality of images obtained by image capturing the same object considerably changes according to the object distance and the image capturing magnification. Accordingly, the block size needs to be set at the specified size in relation to the character size so that a suitable histogram of level-frequency distribution can be obtained.

Further according to the γ-characteristic setting method using the histogram of level-frequency distribution, the histogram of level-frequency distribution of the block including both the white board portion and the background portion displays a two-peak distribution having a convex portion corresponding to the white board portion and a convex portion corresponding to the background portion in a white area. Thus, there is a likelihood that the white level is erroneously detected based on the convex portion corresponding to the background portion.

In the case that the background portion is brighter than the white board portion, the white level is detected based on the convex portion corresponding to the background portion and the γ-characteristic is set using this white level, the pixel data of the white board portion are not converted into pixel data of specified saturation level (pure white) in monochromatic image capturing. If the γ-correction is performed to intensify the black portion to emphasize the characters, the pixel data of the white board portion are converted into black in some cases. This leads to a disadvantage that the white board portion of the block including the background portion turns black. In the case of a color image, if the γ-characteristic for the image of any color components is set as above, a part of color components are completely converted into those of the black saturation level. Therefore, a chromatic coloring phenomenon occurs in the white board portion.

In the case that the white board is captured together with its background, the image quality is considerably reduced, making the image hard to be seen if the coloring phenomenon occurs in the white board portion in a boundary area between the white board portion and the background portion during the image processing, namely the illuminance nonuniformity correction. Thus, it is desirable to detect the boundary area between the white board portion and the background portion and to properly perform the image processing in this boundary portion during the illuminance nonuniformity correction.

In a known image forming apparatus such as a digital copying machine, an image processing (γ-correction) is applied to an image picked by being photoelectrically converted into an electrical signal using a γ-characteristic having a relatively large γ-value (γ-characteristic having a characteristic similar to a binary processing) in order to make a representation such as characters and/or figures copied on a recording sheet more clear. This γ-correction is performed as follows in order to reduce the influence of the nonuniform illuminance. As shown in FIG. 71, a picked image G is divided into a plurality of long rectangular blocks B(1), B(2), . . . B(n) along sub-scanning direction. γ-characteristics γ(1), γ(2), . . . γ(n) are set for the respective blocks based on the histogram of level-frequency distributions of the pixel data included in the respective blocks B(r). The γ-correction is applied to the pixel data in each block B(r) (r=1, 2, . . . n) using the γ-characteristic γ(r) corresponding to this block. By this γ-correction, the white portion above a specified level is uniformly converted into an image of a specified white color, and the character portion (black portion) below the specified level is uniformly converted into an image of a specified black color. Accordingly, an image which could have been obtained by a binary processing can be obtained.

Japanese Unexamined Patent Publication No. 6-113139 discloses an image binary processing apparatus. This apparatus divides a picked image into a plurality of partial images; generates a histogram of level-frequency distribution of pixel data included in the block for each of a selected partial image block (object partial image block) and a plurality of partial image blocks neighboring the object partial image block; sets a threshold value for the object partial image block by neural network using the histogram of level-frequency distribution data; and applies a binary processing to the pixel data in the object partial image block using this threshold value.

Since the object distance and the copying magnification are substantially constant, the picked image is normally divided by blocks of predetermined size during the γ-correction in the known digital copying machine. The binary processing technique disclosed in the above publication mainly concerns a binary processing in a copying machine and a facsimile machine. This publication does not disclose any measure to deal with a change in the shape of the histogram of level-frequency distribution when the character density in the block varies according to the object distance and image capturing magnification. Accordingly, the illuminance nonuniformity correction may not be performed even if the conventional γ-correction technique is applied to digital cameras. According to this γ-correction technique, the picked image is divided by the blocks only along sub-scanning direction. Thus, even if this technique is applied to a picture image where the illuminance nonuniformity occurs in a two-dimensional manner, it is difficult to effectively correct the illuminance nonuniformity along main scanning direction.

On the other hand, according to the binary processing technique disclosed in the above publication, a picked image is divided by a plurality of blocks arranged as in a matrix and the binary processing is applied to the pixel data every block. This technique is effective as a method for correcting the illuminance nonuniformity of a picture image. However, since the histogram of level-frequency distribution of the pixel data is generated every block and the threshold value of the binary processing is set by neural network using the histogram of level-frequency distribution data, a complicated and cumbersome calculation is disadvantageously required to set the threshold value. If the block size is set too small, the histogram of level-frequency distribution of the pixel data is improper and a suitable threshold value cannot be set. Further, since a long time is disadvantageously required for the calculation due to a huge number of blocks, there should be a limit in the number of blocks. Further, a calculation made to avoid the discontinuity of the image quality resulting from a difference between the processings applied to the blocks using different γ-characteristics is not easy.

The known digital copying machine and the image binary processing apparatus disclosed in the above publication mainly concern the binary processing performed in the copying machine and the facsimile machine. The background portion image is picked substantially at the same white level as the white portion of a document in view of the construction of the apparatus. The aforementioned coloring phenomenon quite seldom occurs and, accordingly, presents no problem. Thus, a problem of the coloring phenomenon in the boundary area between the white board portion and the background portion is not considered at all and, hence, there is no indication or disclosure concerning this problem.

In the case that the picked image is a color image comprised of three primary color components R (red), G (green), B (blue), the aforementioned illuminance nonuniformity correction needs to be applied to the image of each color components since the γ-correction needs to be applied to the image of each color components.

If an object is a white board which is relatively pure white and on which black characters are drawn, a histogram of level-frequency distribution is generated using an image of green components having many luminance components out of the images of the respective color components R, G, B constituting a color image as a whole, and the white portion (the white board portion) can be detected based on the shape of this histogram of level-frequency distribution. The illuminance nonuniformity correction can be performed by using the γ-characteristic set for the image of green components for the γ-correction for the images of red and blue components.

Specifically, if the histogram of level-frequency distribution is generated using the pixel signals of green components, and an input level W is set as a white saturation level of the γ-characteristic based on this histogram of level-frequency distribution, the pixel signals of green components above the input level W are all converted into the pixel signals of the same saturation level. Since the white board is nearly pure white and the color components R, G, B of the image of the white board portion are substantially at the same level, the pixel signals of red and blue components above the input level W are all converted into those of the same saturation level even if the same γ-characteristic is applied thereto. Thus, the image of the white portion having the levels of the color components R, G, B above the input level W can be uniformly converted into an image of a specified white color.

However, if the white board has a tint, the color components R, G, B of the image of the white board portion are not at the same level. Thus, if the γ-characteristic set using the image of green components is applied to the pixel signals of red and blue components, the level balance of the color components R, G, B changes and the tint stands out more. Specifically, if the levels of the respective color components R, G, B are: $D_R$, $D_G$, $D_B$ ($D_G > D_R > D_B$), the color components are all converted to the saturation level, i.e., a specified white color in a portion having such color components: $W < D_R$, $W < D_G$, $W < D_B$. For example, in a portion having such color components: $D_B < D_R < W$, $W \geq D_G$, only the green components are converted into the saturation level and the red and blue components are converted to a specified level lower than the saturation level. Accordingly, the image in this portion is converted to, e.g., the one of a striking yellow green color having strong green components. As a result, the illuminance nonuniformity correction causes a problem of coloring the white portion.

Generally, the white board is seldom captured in pure white because of a variety of conditions including the color temperature of the illumination light and the smear on the white board. Thus, it is necessary to perform the illuminance nonuniformity correction while taking a measure to prevent the aforementioned problem in color image capturing. The known digital copying machine and the image binary processing apparatus disclosed in Japanese Unexamined Patent Publication No. 6-113139 mainly concerns a binary processing in a copying machine and/or a facsimile machine, and are premised on that a document image is picked up in the form of a monochromatic image. They neither disclose nor indicate the illuminance nonuniformity correction technique for a color image and the problem in the illuminance nonuniformity correction of the color image.

When characters and/or figures drawn on a white board in a conference hall are to be captured by an electronic camera provided with a built-in flash, the built-in flash is often automatically fired because only an insufficient amount of illumination light is normally available, thereby resulting in flash image capturing. If the white board is captured from front in such flash image capturing, the flash light is regularly reflected by the white board and the characters or the like drawn on the white board become white by this reflection light, with the result that an image having a low representation value is obtained by the image capturing. Even if the flash is not fired, the characters or the like drawn on the white board become white by the regularly reflected illumination light in such an image capturing position where the illumination light such as the ceiling light and sunlight is regularly reflected by the white board. Thus, this case also leads to a similar reduction in the image quality. If the aforementioned illuminance nonuniformity correction is performed in the image processing, an accurate histogram of level-frequency distribution cannot be generated in the block including the regularly reflected light. Therefore, the illuminance nonuniformity correction cannot be effectively performed, and the regularly reflected light adversely affects the blocks which are around this block, but do not include the regularly reflected light. As a result, the image quality and the representation value are considerably reduced.

In known image forming apparatuses such as digital copying machines, if illumination light is regularly reflected by a document, the density of characters or the like written on the document is considerably reduced by this regularly reflected light and a document image cannot be accurately picked up. In order to prevent such a problem, a technique for detecting the illumination light regularly reflected by the document was developed.

This detection technique is such that the histogram of level-frequency distribution of pixel signals picked by image pickup devices such as CCDs every line of a sensor is generated and the presence or absence of the regularly reflected light is judged based on the shape of the histogram of level-frequency distribution. More specifically, in the case that the regularly reflected light is included, the pixels having received the regularly reflected light output the pixel signal of saturated level. Accordingly, the presence or absence of the regularly reflected light is judged by, for example, judging whether the frequency at the saturation level of the histogram of level-frequency distribution exceeds a specified threshold value.

Since a document is illuminated by an artificial light source under a specified condition in digital copying machines, the regularly reflected light can be satisfactorily detected by the line detection of the sensor. However, with electronic cameras, the illumination condition of the illumination light is not constant and an external light such as a sunlight is incident on the white board as a spot light and regularly reflected. Thus, if the detection is made every line as with the known method for detecting the regularly reflected light in the digital copying machines, it is difficult to securely detect a spot regularly reflected light and a sufficiently satisfactory detection accuracy cannot be ensured.

The binary processing technique disclosed in Japanese Unexamined Patent Publication No. 6-113139 also mainly concerns a binary processing in copying machines and facsimile machines, and does not at all disclose the aforementioned problem of the regularly reflected light peculiar to the image capturing of the digital camera and the method for avoiding such a problem.

In the case that a representation such as characters and/or figures drawn on a white board is captured in an oblique direction with respect to the white board in, e.g., a conference hall due to a seating position of an image capture person, a perspective geometric distortion is created in a captured image because the representation such as characters cannot be entirely in focus. Such a distortion reduces the readability of the representation. In order to solve this problem, an electronic camera could be proposed which is able to capture an object image while correcting the perspective image distortion created therein, in other words, to perform image capturing while correcting an obliquely captured image into a pseudo front image (image seen as if it were captured from front).

This electronic camera is such that an image capturing magnification in each pixel position within a field is calculated using an angle of inclination of an object with respect to the camera, a focal length of the taking lens and an object distance, and that a geometric image distortion is corrected by enlarging or reducing a part of the captured image based on the image capturing magnifications. For example, in the case that the white board is captured in an oblique direction from the left, a partial image at the left side of the center of the field is close to the camera and a partial image at the right side thereof is away from the camera. Thus, the obliquely captured image is corrected into a pseudo front image by reducing the left side image and enlarging the right side image.

Generally, a white board in a conference hall is hardly illuminated at a uniform illuminance and can be seldom captured in a front position. Therefore, an image processing adopting both the illuminance nonuniformity correcting function and the oblique image correcting function is applied to an image captured in such a scene.

In this case, if the oblique image correction is performed after the illuminance nonuniformity correction, the number of characters in the blocks (character density of the blocks) varies depending on the positions of the blocks since the image capturing magnification of the obliquely captured image and the character size differ within the field. Accordingly, the shape of the histogram of level-frequency distribution generated for each block largely varies among the blocks. Thus, the white level becomes discontinuous due to a difference of the γ-characteristics between neighboring blocks, making it difficult to perform a proper illuminance nonuniformity correction and, depending on a case, leading to the creation of a pseudo line at the boundary of the blocks.

On the other hand, there are some cases where the illuminance nonuniformity correction cannot be properly performed even if the illuminance nonuniformity correction is performed after the oblique image correction. Specifically, pixel data are missing in a portion of an image where the oblique image is corrected by the reduction processing, and dummy data are filled in this portion. Accordingly, if the histogram of level-frequency distribution of the block including the dummy data is generated during the illuminance nonuniformity correction, the obtained histogram of level-frequency distribution cannot be accurate because of the presence of the dummy data. This leads to an improper γ-characteristic for the block including the dummy data. Thus, the γ-correction cannot be properly applied to the image in this block, and the white level becomes discontinuous between neighboring blocks, thereby creating a pseudo line at the boundary of the blocks.

For the block including the portion where the pixel data are missing, there is a method for generating the histogram of level-frequency distribution using only effective pixel data. However, this method has a disadvantage that an effective γ-characteristic cannot be obtained for a block having a small number of effective pixel data despite a complicated processing of extracting the pixel data.

The above problem occurs not only in the case of correcting the geometric distortion of the image obtained by image capturing the object in the oblique direction, but also in the case of correcting a geometric distortion resulting from the characteristic of an image pickup optical system.

The binary processing technique disclosed in Japanese Unexamined Patent Publication No. 6-113139 mainly concerns a binary processing in copying machines and facsimile machines similar to the known digital copying machines. This apparatus is not provided with the oblique image correcting function since a document image is not picked up in an oblique direction because of its construction. Accordingly, this apparatus does not experience the aforementioned problem arising when both the illuminance nonuniformity correction and the oblique image correction are performed. Therefore, this publication neither discloses nor indicates such a problem.

SUMMARY OF THE INVENTION

It is an object of the present invention to provide an image capturing apparatus which has overcome the problems residing in the prior art.

It is another object of the present invention to provide a method for processing image data generated by an image pickup device which has overcome the problems residing in the prior art.

According to an aspect of the present invention, an image capturing apparatus comprising: an image pickup device which photoelectrically picks up a light image of an object to generate image data including a number of pixel data; a block setter which sets a plurality of blocks over the number of pixel data; a first γ-characteristic setter which sets a first γ-characteristic for pixel data at a center position of each block based on pixel data included in its block; a second γ-characteristic setter which sets second γ-characteristics for pixel data at other positions than the center position of each block based on set first γ-characteristics; and a γ-characteristic corrector which corrects pixel data of each block in accordance with the set first and second γ-characteristics.

According to another aspect of the present invention, an image capturing apparatus comprising: an image pickup device which photoelectrically picks up a light image of an object to generate image data including a number of pixel data; a block setter which sets a plurality of blocks over the number of pixel data; a γ-characteristic setter which sets a γ-characteristic for each block based on pixel data included in its block; a γ-characteristic corrector which corrects pixel data of each block in accordance with the set γ-characteristic; and an image geometric distortion corrector which corrects a geometric distortion of the image data having been corrected by the γ-characteristic corrector.

According to another aspect of the present invention, an image capturing apparatus comprising: a taking lens having changeable image capturing magnifications; a detector which detects an image capturing magnification of the taking lens; an image pickup device which photoelectrically picks up a light image of an object passed through the taking lens to generate image data including a number of pixel data; a block setter which sets a plurality of blocks over the number of pixel data; a block size setter which sets a size of each block based on a detected image capturing magnification; a γ-characteristic setter which sets a γ-characteristic for each block; and a γ-characteristic corrector which corrects pixel data of each block in accordance with the set γ-characteristic.

According to another aspect of the present invention, an image capturing apparatus comprising: an image pickup device which photoelectrically picks up a light image of an object to generate image data including a number of pixel data; an image geometric distortion corrector which corrects a geometric distortion of the image data; a block setter which sets a plurality of blocks over the image data having been corrected by the image geometric distortion corrector; a γ-characteristic setter which sets a γ-characteristic for each block based on pixel data included in its block; and a γ-characteristic corrector which corrects pixel data of each block in accordance with the set γ-characteristic.

According to another aspect of the present invention, an image capturing apparatus comprising: an image pickup device which photoelectrically picks up a light image of an object to generate image data including a number of pixel data; and an image geometric distortion corrector which corrects a geometric distortion of the image data by applying a reduction processing to a specified portion of the image data, and filling dummy pixel data in a portion where pixel data is to be lost due to the reduction processing.

According to another aspect of the present invention, an image capturing apparatus comprising: a color image pickup device which photoelectrically picks up a light image of an object to generate image data of three primary color components; a white level calculator which calculates a white level for an image of each color component based on image data of its color component; a γ-characteristic setter which sets a γ-characteristic for an image of each color component to convert image data of its color component above the calculated corresponding white level to a white saturation level; and a γ-characteristic corrector which corrects image data of each color component in accordance with the set γ-characteristic.

According to another aspect of the present invention, an image capturing apparatus comprising: an image pickup device which photoelectrically picks up a light image of an object to generate image data including a number of pixel data; a block setter which sets a plurality of blocks over image data generated by the image pickup device; a reference histogram generator which generates a reference histogram for each block, the reference histogram representing a level-frequency distribution of pixel data included in its block; and a block extractor which extracts a boundary block including pixel data of a boundary between a main subject image and a background image based on the generated reference histogram.

According to another aspect of the present invention, an image capturing apparatus comprising: an image pickup device which photoelectrically picks up a light image of an object to generate image data including a number of pixel data; a flash device which emits flash light to the object; an illuminance nonuniformity corrector which performs an illuminance nonuniformity correction to image data generated by the image pickup device; and a controller which controls the flash device to prohibits emission of flash light when the illuminance nonuniformity correction is designated.

According to another aspect of the present invention, an image capturing apparatus comprising: an image pickup device which photoelectrically picks up a light image of an object to generate image data including a number of pixel data; a block setter which sets a plurality of blocks over image data generated by the image pickup device; a reference histogram generator which generates a reference histogram for each block, the reference histogram representing a level-frequency distribution of pixel data included in its block; a detector which detects based on a reference histogram for each block whether its block has pixel data in connection with light regularly reflected at a main subject; and an operator which performs a specified operation when there is detected to be a block having pixel data in connection with light regularly reflected at the main subject.

According to another aspect of the present invention, an image capturing apparatus comprising: an image pickup device which photoelectrically picks up a light image of an object to generate image data including a number of pixel data; a taking lens which focuses the light image onto an image pickup surface of the image pickup device; a distance meter which meters a distance to the object; a calculator which calculates a distribution of image capturing magnifications within a specified portion of the surface of the object based on a focal length of the taking lens and an object distance metered by the distance meter; a block setter which sets a plurality of blocks over image data generated by the image pickup device, the plurality of blocks respectively having different sizes in accordance with image capturing magnifications; a γ-characteristic setter which sets a γ-characteristic for each block based on pixel data included in its block; a γ-characteristic corrector which corrects pixel data of each block in accordance with the set γ-characteristic; and an image geometric distortion corrector which corrects, based on a calculated distribution of image capturing magnifications, a geometric distortion of γ-characteristic corrected image data that is caused by an oblique image capture.

According to another aspect of the present invention, a method for processing image data generated by an image pickup device, the image data including a number of pixel data, the method comprising the steps of setting a plurality of blocks over the number of pixel data; setting a first γ-characteristic for pixel data at a center position of each block based on pixel data included in its block; setting second γ-characteristics for pixel data at other positions than the center position of each block based on set first γ-characteristics; and correcting pixel data of each block in accordance with the set first and second γ-characteristics.

According to another aspect of the present invention, a method for processing image data generated by an image pickup device, the image data including a number of pixel data, the method comprising the steps of setting a plurality of blocks over the number of pixel data; setting a γ-characteristic for each block based on pixel data included in its block; correcting pixel data of each block in accordance with the set γ-characteristic; and correcting a geometric distortion of the γ-characteristic corrected image data.

According to another aspect of the present invention, a method for processing image data which is generated by an image pickup device photoelectrically picking up a light image of an object through a taking lens having changeable image capturing magnifications, the image data including a number of pixel data, the method comprising the steps of: detecting an image capturing magnification of the taking lens; setting a plurality of blocks over the number of pixel data; setting a size of each block based on a detected image capturing magnification; setting a γ-characteristic for each block; and correcting pixel data of each block in accordance with the set γ-characteristic.

According to another aspect of the present invention, a method for processing image data generated by an image pickup device, the image data including a number of pixel data, the method comprising the steps of: correcting a geometric distortion of the image data; setting a plurality of blocks over the corrected image data; setting a γ-characteristic for each block based on pixel data included in its block; and correcting pixel data of each block in accordance with the set γ-characteristic.

According to another aspect of the present invention, a method for processing image data generated by an image pickup device, the image data including a number of pixel data, the method comprising the steps of: correcting a geometric distortion of the image data by applying a reduction processing to a specified portion of the image data, and filling dummy pixel data in a portion where pixel data is to be lost due to the reduction processing.

According to another aspect of the present invention, a method for processing image data of three primary color components generated by a color image pickup device, the method comprising the steps of: calculating a white level for an image of each color component based on image data of its color component; setting a γ-characteristic for an image of each color component to convert image data of its color component above the calculated corresponding white level to a white saturation level; and correcting image data of each color component in accordance with the set γ-characteristic.

According to another aspect of the present invention, a method for processing image data generated by an image pickup device, the image data including a number of pixel data, the method comprising the steps of: setting a plurality of blocks over image data; generating a reference histogram for each block, the reference histogram representing a level-frequency distribution of pixel data included in its block; and extracting a boundary block including pixel data of a boundary between a main subject image and a background image based on the generated reference histogram.

According to another aspect of the present invention, a method for controlling an image capturing apparatus provided with an illuminance nonuniformity corrector for performing an illuminance nonuniformity correction to obtained image data, and a flash device for emitting flash light to an object, the method comprising the step of prohibiting flash light emission of the flash device when the illuminance nonuniformity correction is designated.

According to another aspect of the present invention, a method for processing image data generated by an image pickup device, the image data including a number of pixel data, the method comprising the steps of: setting a plurality of blocks over the number of pixel data; generating a reference histogram for each block, the reference histogram representing a level-frequency distribution of pixel data included in its block; detecting based on a reference histogram for each block whether its block has pixel data in connection with light regularly reflected at a main subject; and performing a specified operation when there is detected to be a block having pixel data in connection with light regularly reflected at the main subject.

According to another aspect of the present invention, a method for processing image data which is generated by an image pickup device photoelectrically picking up a light image of an object through a taking lens having a focal length, the image data including a number of pixel data, the method comprising the steps of: metering a distance to an object; calculating a distribution of image capturing magnifications within a specified portion of a surface of the object based on a focal length of the taking lens and a metered object distance; setting a plurality of blocks over the number of pixel data, the plurality of blocks respectively having different sizes in accordance with image capturing magnifications; setting a γ-characteristic for each block based on pixel data included in its block; correcting pixel data of each block in accordance with the set γ-characteristic; and correcting, based on a calculated distribution of image capturing magnifications, a geometric distortion of γ-characteristic corrected image data that is caused by an oblique image capture.

These and other objects, features and advantages of the present invention will become more apparent upon a reading of the following detailed description and accompanying drawings.

BRIEF DESCRIPTION OF THE DRAWINGS

FIGS. 4A and 4B are diagrams showing the oblique image capturing, wherein FIG. 4A shows an obliquely captured image and FIG. 4B shows an image after an oblique image correction;

FIGS. 6A and 6B are graphs showing distributions of output of an image pickup device, wherein FIG. 6A shows an output distribution along vertical direction and FIG. 6B shows an output distribution along horizontal direction;

FIGS. 16A and 16B are diagrams showing the oblique image capturing, wherein FIG. 16A shows an obliquely captured image and FIG. 16B shows an image after the oblique image correction;

FIGS. 21A and 21B are diagrams showing states where a picked image is divided by blocks of improper size, wherein FIG. 21A shows a case where the block size is smaller than a proper one and FIG. 21B shows a case where the block size is larger than the proper one;

FIGS. 26A to 26C are graphs showing γ-characteristics set for the respective color components using the pixel data of the respective color components, wherein FIG. 26A shows a γ-characteristic for the pixel data of red components, FIG. 26B shows a γ-characteristic for the pixel data of green components, and FIG. 26C shows a γ-characteristic for the pixel data of blue components;

FIG. 27 is a diagram showing an interpolation calculation of the characteristic for the pixel data within an area enclosed by the center positions of neighboring blocks;

FIGS. 34A and 34B are diagrams showing an oblique image correcting method, wherein FIG. 34A shows an oblique image and FIG. 34B shows a pseudo front image after the oblique image correction;

FIGS. 35A and 35B are diagrams showing an interpolation processing of the pixel data in the oblique image correction, wherein FIG. 35A shows the interpolation processing along vertical direction and FIG. 35B shows the interpolation processing along horizontal direction;

FIGS. 39A and 39B are diagrams showing an obliquely captured image divided into a plurality of small images, wherein FIG. 39A shows the image divided by blocks of the same size and FIG. 39B shows the image divided by blocks of different sizes;

FIGS. 40 to 42 are flowcharts showing an image capturing control of the electronic camera according to the second embodiment;

FIG. 44 is a diagram showing a method for setting a γ-characteristic for the illuminance nonuniformity correction for other blocks using a γ-characteristic for the illuminance nonuniformity correction set for the blocks arranged along row direction;

FIG. 45 is a diagram showing a method for setting a γ-characteristic for the illuminance nonuniformity correction for other blocks using a γ-characteristic for the illuminance nonuniformity correction set for the blocks arranged along column direction;

FIGS. 49A to 49C are graphs showing the reason why coloring phenomenon occurs during the γ-correction for the illuminance nonuniformity correction and the black intensification, wherein FIG. 49A shows a histogram of level-frequency distribution, FIG. 49B shows a γ-characteristic for the illuminance nonuniformity correction and FIG. 49C shows a γ-characteristic for the black intensification;

FIG. 50 are graphs showing the reason why coloring does not occur during the γ-correction for the illuminance nonuniformity correction and the black intensification, wherein

FIG. 53 is a diagram showing a search range for detecting the blocks not including the background image around the block including the background image;

FIGS. 54A to 54D are diagrams showing a search procedure of the blocks not including the background image, wherein FIG. 54A shows a search procedure of the blocks in an upper left area of the block including the background image, FIG. 54B shows a search procedure of the blocks in an upper right area of the block including the background image, FIG. 54C shows a search procedure of the blocks in a lower left area of the block including the background image, and FIG. 54D shows a search procedure of the blocks in a lower right area of the block including the background image;

FIGS. 58A and 58B are graphs showing a method for expanding a dynamic range in the γ-correction during the illuminance nonuniformity correction, wherein FIG. 58A shows a histogram of level-frequency distribution and FIG. 58B shows a γ-characteristic;

DETAILED DESCRIPTION OF THE PREFERRED EMBODIMENTS OF THE INVENTION

Figure 1:
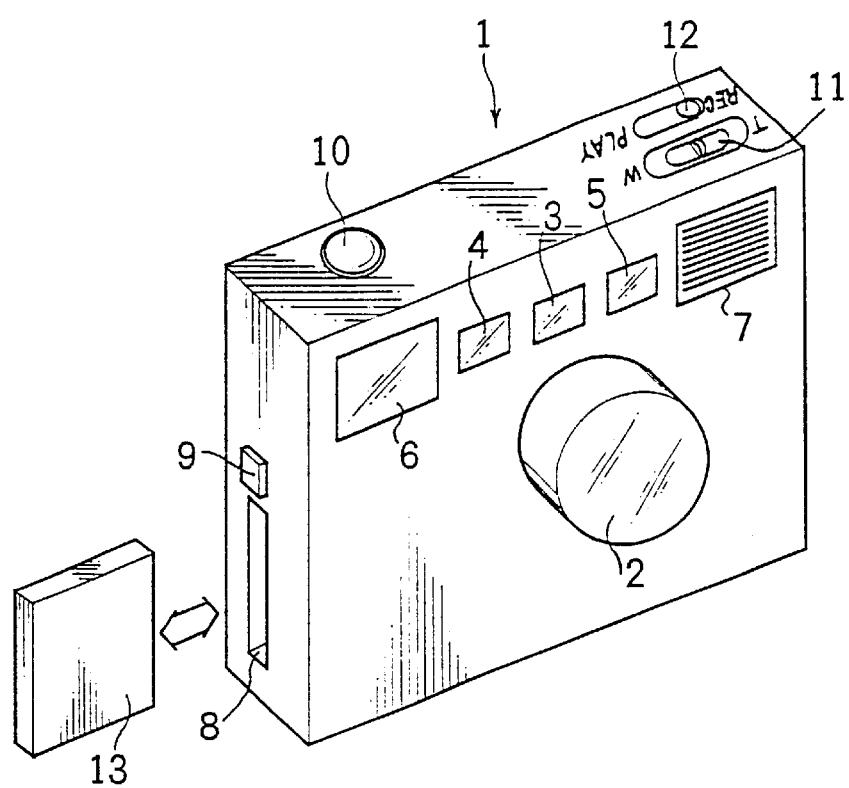
FIG. 1 is a perspective view showing an external configuration of an electronic camera according to a first embodiment of the invention.
Figure 2:
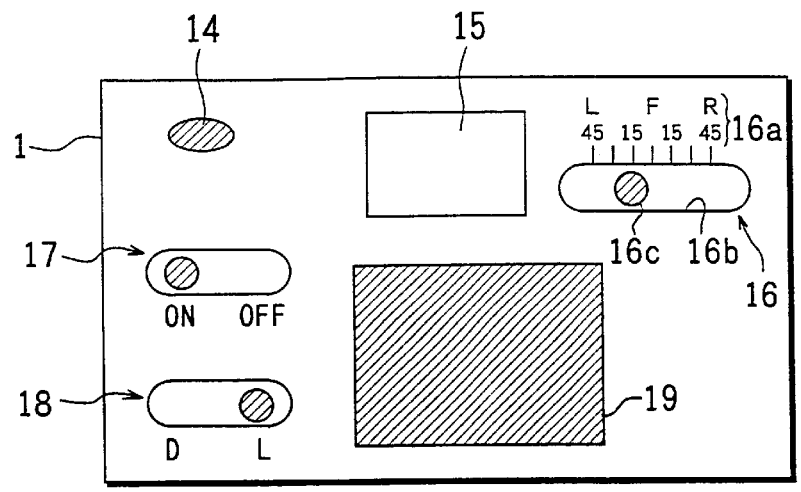
FIG. 2 is a rear view of the electronic camera.

FIG. 1 is a perspective view showing an external configuration of an electronic camera according to a first embodiment of the invention, and FIG. 2 is a rear view of this electronic camera.

A camera 1 of FIGS. 1 and 2 includes a CCD area sensor as an image pickup device. An image data sensed by this CCD area sensor is recorded in an unillustrated hard disk card of PCMCIA standards. Although a case where the area sensor is used as an image pickup device is described in this embodiment, an image data may be picked by scanning an object light image by a line sensor.

The camera 1 is provided with a function of correcting an image of an object whose surface is not parallel with the sensing surface of the CCD area sensor (hereinafter, "oblique image") into an image of an object whose surface is parallel with the sensing surface of the CCD area sensor (hereinafter, "front image"). Hereinafter, the above correction is referred to as an oblique image capturing correction.

Figure 3:
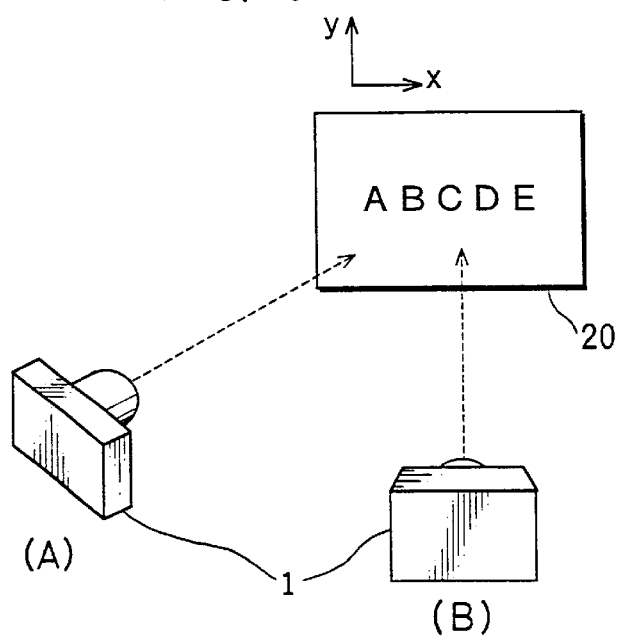
FIG. 3 is a perspective view showing oblique image capturing of an object.
Figure 4A:
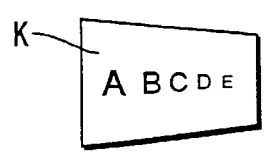
Figure 4B:

For example, in the case that characters, figures and the like drawn on a white board 20 are captured in a normal image capturing mode in a position (A) obliquely forward of the white board 20 to the left as shown in FIG. 3, the captured image is an oblique image K in which a dimension at the right end is smaller than that at the left end as shown in FIG. 4A resulting from a different object distance distribution within a field. However, the oblique image K is corrected into a front image K' as shown in FIG. 4B which could be obtained by image capturing the object in a position (B) substantially in front of the white board 20.

The electronic camera 1 is also provided with a function of correcting an illuminance nonuniformity, which results from the nonuniformity of illumination light (ceiling lights, sunlight coming through the windows, etc.) of the white board and a variation of the sensitivity of the CCD area sensor, for the picked image of the representation (hereinafter, this kind of binary representation is referred to as character representation) represented by characters, figures and the like drawn on the white board.

Figure 5:
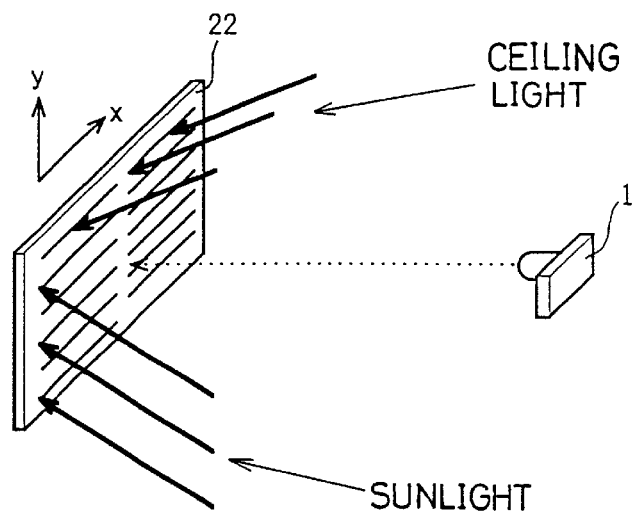
FIG. 5 is a perspective view showing an example of illuminating directions of illumination light for a white board.
Figure 6A:
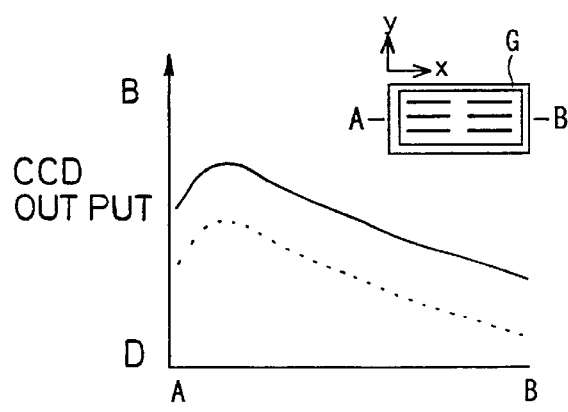
Figure 6B:
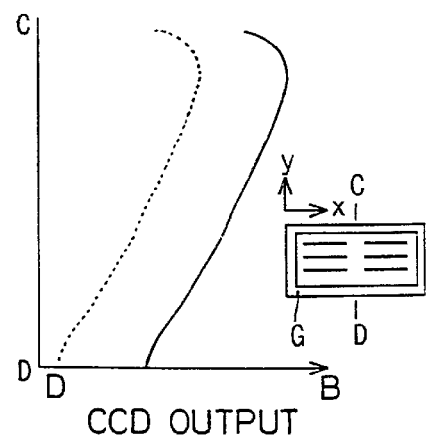

If the white board 20 is illuminated, for example, by the ceiling lights of the room and the sunlight coming through the windows as shown in FIG. 5, illuminance nonuniformity occurs due to the nonuniform illumination light. Further, by the multiplying effect of this illuminance nonuniformity and a distribution of incident light amount by the so-called law of $\cos^4\theta$ according to which an image at an off-axis object point which is incident on the entrance pupil of the taking lens at an angle ω, a distribution of the output of the CCD area sensor largely varies along horizontal and vertical directions on a sensing surface. When the illuminance nonuniformity correction processing is performed, a proper γ-characteristic is set for each pixel data or for each pixel data group including a plurality of pixel data. The two-dimensional variation of the output of the CCD area sensor is reduced as much as possible by applying a γ-correction for each pixel data or for each pixel data group using the γ-characteristic set therefor. In FIGS. 6A and 6B, solid line represents output distributions of the white portion of the white board 20 when nothing is drawn thereon, whereas dotted line represents output distribution of the character portion when characters are drawn on the white board 20.

The electronic camera 1 according to the first embodiment performs the illuminance nonuniformity correction after performing an oblique image correction as described later.

Here, the principle of oblique image capturing correction is briefly described. It should be noted that description be made on a linear image in order to simplify the description.

Figure 7:
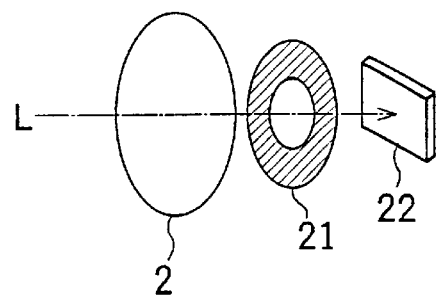
FIG. 7 is a diagram showing a schematic construction of an optical system of the electronic camera of the first embodiment.

FIG. 7 is a schematic construction diagram of an optical system of the camera 1. This optical system is such that a laterally long rectangular shaped CCD area sensor 22 (hereinafter, "CCD 22") is arranged in a focus position of a taking lens 2 and a diaphragm 21 is arranged between the taking lens 2 and the CCD 22. A light image representing figures or the like drawn on the white board 20 is focused on the sensing surface of the CCD 22 after having passed through the taking lens 2 and the diaphragm 21.

Figure 8:
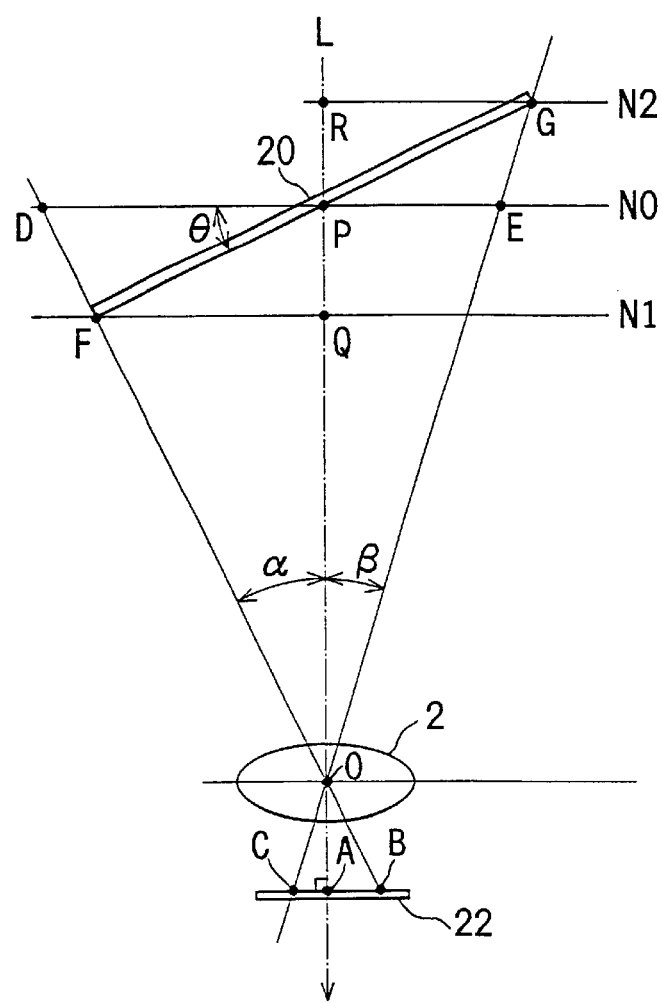
FIG. 8 is a diagram showing an image sensing system in oblique image capturing when viewed from above.

FIG. 8 is a diagram of an image pickup system viewed from right above during oblique image capturing, wherein the display surface of the white board 20 (hereinafter, "object surface") is inclined by an angle θ (hereinafter, "angle of inclination θ") with respect to the sensing surface of the CCD 22.

In FIG. 8, indicated at L is an optic axis of the taking lens 2, and by N0, N1, N2 are line segments parallel to the sensing surface of the CCD 22 which pass points P, F, G on the white board 20, respectively. Points O, Q, R, D and E are an intersection of a lens surface of the taking lens 2 and the optic axis L; an intersection of the line segment N1 and the optic axis L; an intersection of the line segment N2 and the optic axis L; an intersection of the line segment N0 and the extension of a line segment BF; and an intersection of the line segment N0 and a line segment GC.

A light image of line segment FG on the white board 20 is formed between points B and C of the sensing surface of the CCD 22. However, since the sensing surface and the object surface are inclined to each other by the angle of inclination θ, the light image BC formed on the sensing surface of the CCD 22 is equivalent to the projection of an image between points D and E on the sensing surface of the CCD 22. Assuming that, at the respective points A, B, C on the sensing surface of the CCD 22, image capturing magnifications are $m_A$, $m_B$, $m_C$ and object distances are $D_A (= OP)$, $D_B (= OQ)$, $D_C (= OR)$, $m_B = m_A \cdot OP/OQ = m_A \cdot D_A / D_B$, $m_C = m_A \cdot OP/OR = m_A \cdot D_A / D_C$. Accordingly, $m_B > m_A > m_C$. The light image formed on the sensing surface is an oblique image K as shown in FIG. 4A, and only point A (intersection of the optic axis L and the sensing surface) is perfectly in focus among the light image BC.

In this embodiment, the oblique image correction is performed by obtaining an image capturing magnification mi (i=1, 2, . . . n) of the respective points between points A and C on the sensing surface of the CCD 22 and an image capturing magnification mi' (i'=1, 2, . . . n) of the respective points between points B and A on the sensing surface of the CCD 22, enlarging the picked image of the light image AC based on the image capturing magnification mi, and reducing the picked image of the light image BA based on the image capturing magnification mi'.

If Di' is an object distance at an arbitrary point between points B and A on the sensing surface of the CCD 22 and αi is an angle of view at that point (an angle between a line segment passing that point and the point O and the optic axis L), $D_A/Di'=1+\tan(\alpha i)\cdot\tan(\theta)$. Accordingly, the image capturing magnification mi' at this arbitrary point can be calculated based on the angle of inclination θ, the image capturing magnification $m_A$ and the angle of view αi in accordance with Equation (1):

$$mi'=m_A\cdot D_A/Di'=m_A\cdot\{1+\tan(\alpha i)\cdot\tan(\theta)\} \quad (1)$$

In accordance with Equation (1), the image capturing magnification $m_A$ can be calculated as: $m_A=a\cdot f/D_A$ (where a: proportion coefficient, f: focal length). Further, Equation: $D_A/Di'=1+\tan(\alpha i)\cdot\tan(\theta)$ can be obtained as follows, using the object distance $D_B$ and the angle of view $\alpha_B$ with respect to point B in FIG. 8:

$$OQ=OP-PQ=OP-OQ\cdot\tan(\alpha_B)\cdot\tan(\theta)$$

$$(PQ=FQ\cdot\tan(\theta), FQ=OQ\cdot\tan(\alpha_B))$$

$$\therefore OP=OQ\cdot\{1+\tan(\alpha_B)\cdot\tan(\theta)\}$$

$$\therefore D_A/D_B=1+\tan(\alpha_B)\cdot\tan(\theta)$$

Hence, in a position of the arbitrary angle of view αi:

$$D_A/Di'=1+\tan(\alpha i)\cdot\tan(\theta).$$

If Di is an object distance at an arbitrary point between points A and C on the sensing surface of the CCD 22 and βi is an angle of view at that point, $D_A/Di=1-\tan(\beta i)\cdot\tan(\theta)$. Accordingly, the image capturing magnification mi at this arbitrary point can be calculated based on the angle of inclination θ, the image capturing magnification $m_A$ and the angle of view βi in accordance with Equation (2):

$$mi=m_A\cdot D_A/Di=m_A\cdot[1+\tan(\beta i)\cdot\tan(\theta)] \quad (2)$$

It should be noted that $D_A/Di'=1-\tan(\beta i)\cdot\tan(\theta)$ can be obtained according to the similar method as above.

Next, the illuminance nonuniformity correction is briefly described.

The main purpose of the image obtained by image capturing a character representation is to record the character representation. Such an image is required to have an image quality of high representation readability rather than depiction. Accordingly, it is desirable to make the character representation clear by making the contrast of the character representation portion against the white portion of the white board and to make the entire image easily visible by reducing the illuminance nonuniformity.

Figures 9, 10:
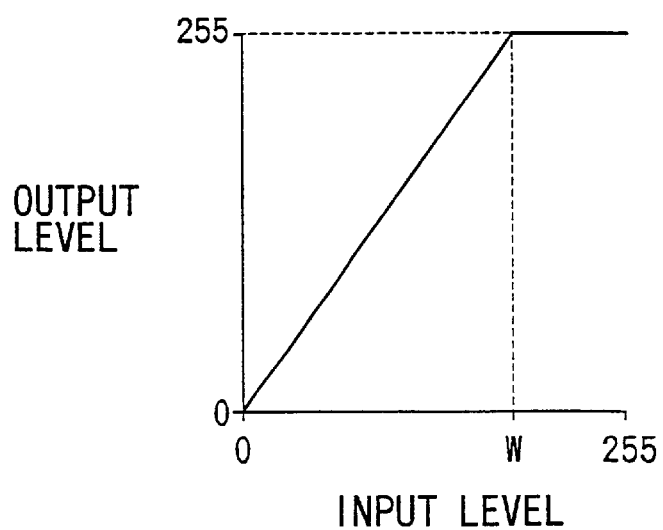
FIG. 9 is a diagram showing a sensed image divided into a plurality of blocks.
FIG. 10 is a graph showing an exemplary γ-characteristic for intensifying a white portion set for each block.

In this embodiment, as shown in FIG. 9, the picked image G is divided along horizontal and vertical directions into a plurality of square blocks B(I) (I=, 2, . . . 18 in FIG. 9). A γ-characteristic as shown in FIG. 10 is set as a γ-characteristic γ(I) for a center position O(I) of the block B(I) based on the white level W calculated using the histogram of level-frequency distribution of the pixel data included in each block B(I). Further, the γ-characteristics γ(P) of the pixel positions of each block B(I) except the center position O(I) are interpolated. Using the γ-characteristics γ(I), γ(P), γ-correction is applied to the pixel data in the pixel positions O(I), P to make the character representation clear and perform the illuminance nonuniformity correction.

The γ-characteristic of FIG. 10 is the one for a case where the pixel data are A/D converted into 8-bit data, and "255" is a maximum value of input/output levels. With the γ-characteristic shown in FIG. 10, all pixel data above the input level W are converted into the pixel data saturated to the maximum level. Accordingly, the picked image is corrected such that the white portion constituted by the pixel data above the input level W uniformly becomes white of maximum brightness. In this way, the contrast of the character representation portion against the white portion is intensified, making the character representation clear.

Figure 11:
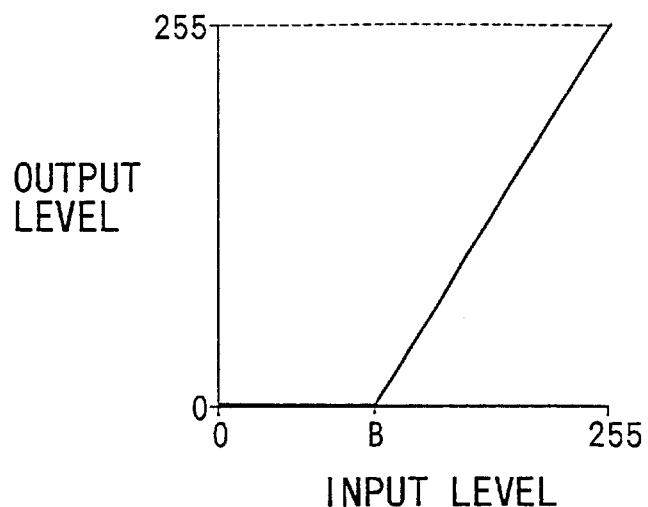
FIG. 11 is a graph showing an exemplary γ-characteristic for intensifying a black portion.
Figure 12:
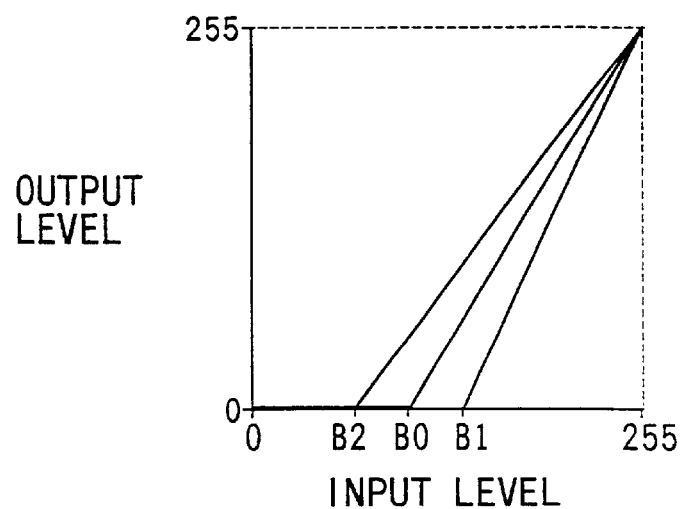
FIG. 12 is a graph showing a relationship between a black adjustment by a black density adjustment switch and a γ-characteristic for intensifying the black portion.

Further, if necessary, γ-correction is applied to the image after the illuminance nonuniformity correction using the γ-characteristic as shown in FIG. 11 to intensify the black portion of the character representation portion. Specifically, the image after the illuminance nonuniformity correction is corrected such that the black portion constituted by the pixel data below an input level B uniformly becomes black of minimum brightness. Accordingly, the blackness of the character portion is intensified according to the density, the thickness and the line density of the characters, figures and the like drawn on the white board 20 so as to properly make the character representation clear. The γ-correction in the illuminance nonuniformity correction is described in detail later.

Referring back to FIG. 1, the electronic camera 1 is provided substantially in the middle of its front surface with the taking lens 2 including a zoom lens, and a light emitting window 4 and a light receiving window 5 for metering an object distance by the active metering system are provided above the taking lens 2. Between the windows 4 and 5 is provided a light meter window 3 for metering an object brightness. Further, an objective window 6 of a viewfinder is provided at the left side of the light emitting window 4 and a flash 7 is provided at the right side of the light receiving window 5.

The light emitting window 4 is a window through which infrared rays are projected toward an object, and the light receiving window 5 is a window through which the infrared rays reflected by the object are received. Although the active metering system is adopted in this embodiment, the passive metering system may be adopted.

In one side surface of the electronic camera 1 is provided a card insertion slot 8 through which a hard disk card 13 (hereinafter, "HD card 13") is mounted and ejected. Above the card insertion slot 8 is provided a card eject button 9 which is operated to eject the HD card 13. In the case that the image capturing result is to be printed, the HD card 13 is ejected from the electronic camera 1 by pushing the card eject button 9, and is mounted in a printer compatible with the HD card 13 for the printout.

It should be appreciated that the electronic camera 1 may be provided with an interface of SCSI cable and directly connected with a printer via the SCSI cable, so that the image data can be transferred from the electronic camera 1 to the printer to print the captured images.

Although the hard disk card of PCMCIA standards is adopted as a storage medium of the image data in this embodiment, any other storage medium such as a memory card and a mini-disk (MD) may be used provided it can store the captured result as an image data.

On the upper surface of the electronic camera 1 are provided a shutter release button 10 at a left end, and a zoom switch 11 and an image capturing/reproduction switch 12 at a right end. When the shutter release button 10 is partly pressed to turn on an ST1 switch for designating the image capturing preparation such as focusing and setting of exposure control values. When the shutter release button 10 is fully pressed to turn on an ST2 switch for designating an exposure. The zoom switch 11 is a three-contact switch slidable along transverse direction. The zooming ratio of the taking lens 2 can be continuously changed to a telephoto side when the zoom switch 11 is slid toward T(TELE)-side, while being changed to a wide-angle side when the zoom switch 11 is slid toward W(WIDE)-side.

The image capturing/reproduction switch 12 is a switch for switchingly setting an image capturing mode and a reproduction mode. The switch 12 is a two-contact switch slidable along transverse direction. The image capturing of an object (recording of the picked image in the HD card 13) is enabled when the switch 12 is set at an image capturing (REC) side, whereas the display of the picked image stored in the HD card 13 on an LCD device 19 (see FIG. 2) is enabled when the switch 12 is set at a reproduction (PLAY) side.

In the rear surface of the electronic camera 1 are provided a main switch 14 for electrically activating the camera 1 and an eyepiece window 15 of the viewfinder which are located at the left end and substantially in the middle of an upper portion, respectively as shown in FIG. 2. At the right side of the eyepiece window 15 is provided a mode setting switch 16.

The mode setting switch 16 is operated to switchingly set a usual image capturing mode and an oblique image correction mode for correcting an oblique image into a pseudo front image, and has a function of setting the angle of inclination θ (see FIG. 8).

The mode setting switch 16 includes a transversely long guide groove 16b having an angle scale 16a on its upper portion, and an operation button 16c movable along the guide groove 16b. The angle of inclination θ can be set by setting the operation button 16c in a specified angle position of the angle scale 16a.

In the angle scale 16a, 0° is arranged in the middle, and 15°, 30° and 45° are arranged on each of the opposite sides of 0° so that three different angles of inclination θ can be set on the left and right sides. Here, the angles on the left side are angles of inclinations in the case that an object is captured from the left side (hereinafter, "left side oblique image capturing"), whereas the angles on the right side are angles of inclinations in the case that an object is captured from the right side (hereinafter, "right side oblique image capturing"). If the operation button 16c is set in the middle position, the angle of inclination is 0°. Accordingly, the normal image capturing mode is set in which the oblique image capturing correction is not applied to the captured image.

Although the angle of inclination θ which an image capture person measures by the eye can discretely be set in this embodiment, it may continuously be set according to a slide amount of the operation button 16c.

Further, in this embodiment, the angle of inclination θ is measured by the eye. However, it may be appreciated to measure distances to two separate portions of an object from the electronic camera, and calculate an angle of inclination θ based on measured two distances.

Furthermore, an illuminance nonuniformity correction switch 17 and a black density adjustment switch 18 are provided below the main switch 14. Further, the LCD device 19 is provided below the eyepiece window 15.

The illuminance nonuniformity correction switch 17 is a switch for designating the aforementioned illuminance nonuniformity correction. The switch 17 is an ON/OFF switch whose operation button is slidable along transverse direction. When the illuminance nonuniformity correction is designated by the switch 17, the picked image is divided into a plurality of blocks (small images), and γ-correction is applied to each block using a γ-characteristic as shown in FIG. 10 set using the pixel data included in the block. On the other hand, when the switch 17 is off, γ-correction is applied to the picked image using a preset γ-characteristic suitable for usual picture taking (γ-characteristic which provides an image of high depiction in which the gradation of an object can be reproduced as true as possible).

The illuminance nonuniformity correction is designed to improve the image quality degraded by nonuniform illuminance when image capturing the character representation drawn on the white board, and is mainly applied when image capturing such a character representation. Accordingly, if the content of the captured images is classified into two types: "character image" obtained by image capturing a representation such as characters and figures and "natural image" obtained by image capturing a landscape or people, the illuminance nonuniformity correction switch 17 serves as a switch for switching the image processing to the picked image (particularly γ-correction) between a character image mode and a natural image mode.

When image capturing characters, figures or the like, an image capture person can obtain a picked image of the quality suitable for a character image (representation such as characters is properly emphasized by making a white portion whiter) by setting the illuminance nonuniformity correction switch 17 "on". When image capturing a landscape, people or the like, he can obtain a picked image of the quality suitable for a natural image (high depiction) by setting the illuminance nonuniformity correction switch 17 "off".

The black density adjustment switch 18 is a switch for adjusting the black saturation level B (see FIG. 11) of the γ-characteristic for the γ-correction for the black intensification to the image after the illuminance nonuniformity correction. The switch 18 is a three-contact switch whose operation button is slidable along transverse direction. The switch 18 functions only when the illuminance nonuniformity correction switch 17 is on (when the character image mode is set). In the character mode, the black saturation level of the γ-characteristic is set at a predetermined specified level B0 when the switch 18 is off in the character image mode; it is set at a specified level B1 (>B0) higher than the level B0 when the switch 18 is set at "DARK"; and it is set at a specified level B2 (<B0) lower than the level B0 when the switch 18 is set at "LIGHT".

The white saturation level of the γ-characteristic is automatically adjusted to make the base portion whiter during the image processing in the character image mode. However, the density of the character portion can be changed by changing the black saturation level by the black density adjustment switch 18, thereby adjusting the contrast of the character portion against the base portion (white portion).

For example, if characters drawn on a white board and characters drawn or printed on a document are compared, the characters on the white board are generally larger and thicker than those on the document. Accordingly, if a γ-correction similar to the one applied when a white board image is picked up is applied when a document image is picked up, the contrast of the characters against the base in the document image is reduced than in the white board image. Thus, in the case that the document image is picked up, the blackness of the character portion is intensified by setting the black density adjustment switch 18 at "DARK", thereby suitably adjusting the contrast of the character portion against the base portion.

Although the black saturation level is switched in two stages in this embodiment, it may be switched in a multitude of stages or may be continuously changed.

The LCD device 19 is adapted to display the picked image. When the image capturing/reproduction switch 12 is set at the reproduction side, the picked image of the frame designated by an unillustrated selection switch is read from the HD card 13 and reproduced and displayed on the LCD device 19.

Figure 13:
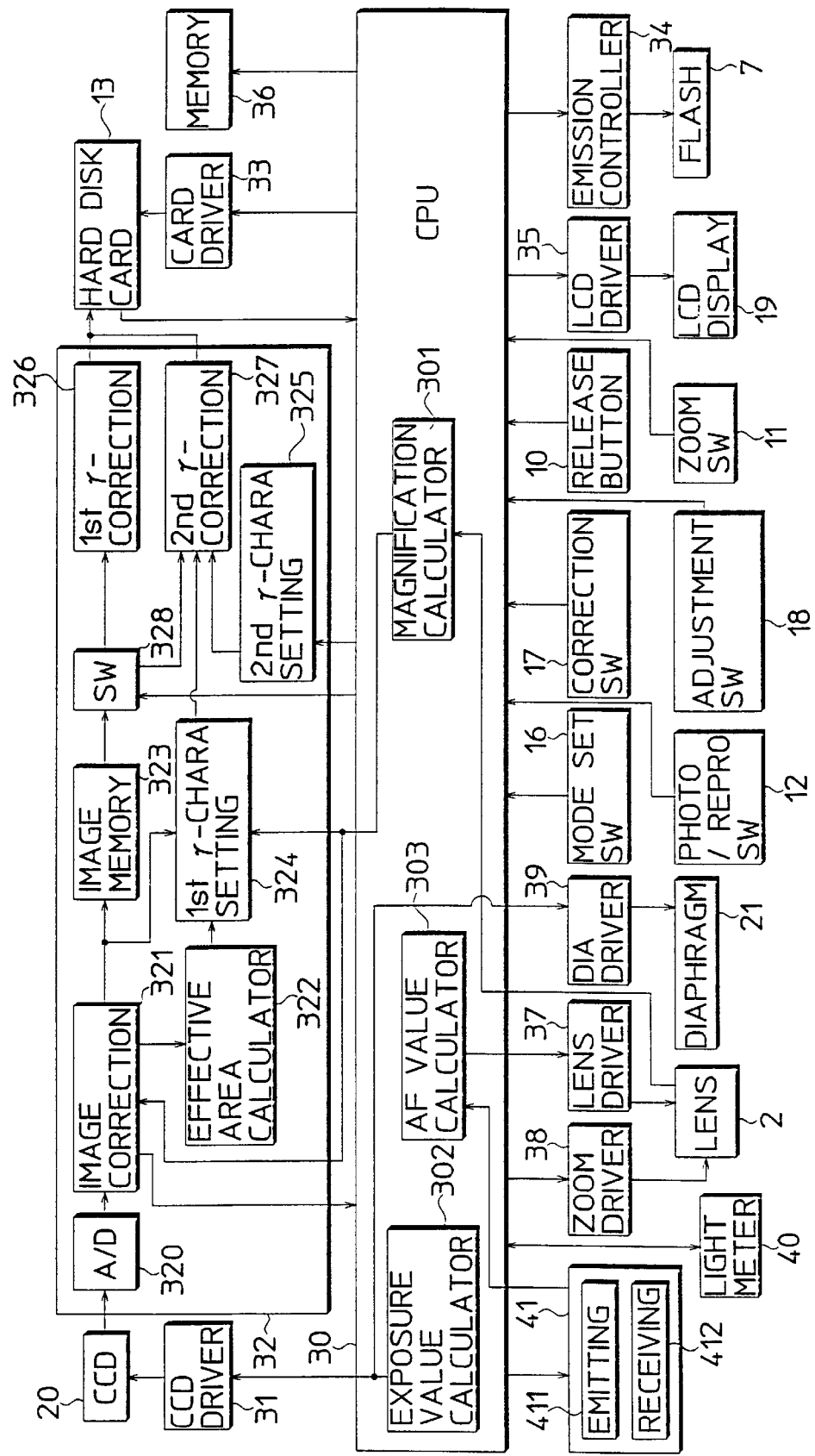
FIG. 13 is a block diagram showing a construction of the electronic camera of the first embodiment.

FIG. 13 is a block construction diagram of the electronic camera 1 according to the first embodiment.

In FIG. 13, the same elements as those described above are indicated at the same reference numerals. A CCD driver 31 controls the image pickup operation of the CCD 22 based on the shutter speed of the exposure control values inputted from the CPU 30. The CCD 22 include a color area sensor, and is adapted to perform the image pickup operation (electric charge storing operation) in accordance with a control signal inputted from the CCD driver 31 and to output the pixel signals of the respective color components R, G, B to an image processor 32 after converting them into signals in time series.

The image processor 32 is adapted to output the pixel signals outputted from the CCD 22 to the HD card 13 after applying a specified signal processing thereto. The image processor 32 includes an A/D converter 320, an oblique image correction device 321, a data effective area calculator 322, an image memory 323, first and second γ-characteristic setting devices 324, 325, first and second γ-correction devices 326, 327, and a switch circuit 328, and applies the oblique image correction to an oblique image. When the illuminance nonuniformity correction is designated, the image processor 32 sets a γ-characteristic for the illuminance nonuniformity correction for each block and performs the γ-correction using the set γ-characteristics. At this time, the γ-characteristics corresponding to the positions between the center positions of the respective blocks are interpolated. By applying the γ-correction to the pixel signals in these positions using the interpolated γ-characteristics, the discontinuity of the image quality caused by the difference of the γ-characteristics between the blocks can be moderated.

The A/D converter 320 converts the respective pixel signals included in the image signal read from the CCD 22 into digital signals (hereinafter, "pixel data").

The oblique image correction device 321 performs the oblique image correction when the oblique image correction mode is set. The oblique image correction device 321 applies enlargement and reduction processings along horizontal direction (x-axis direction in FIG. 3) and along vertical direction (y-axis direction in FIG. 3) based on the aforementioned principle of the oblique image correction.

Figure 16A:
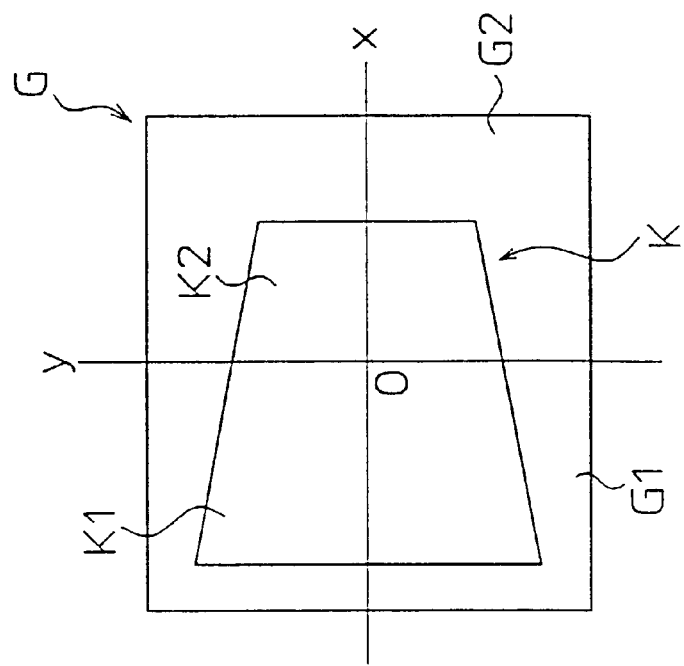
Figure 16B:
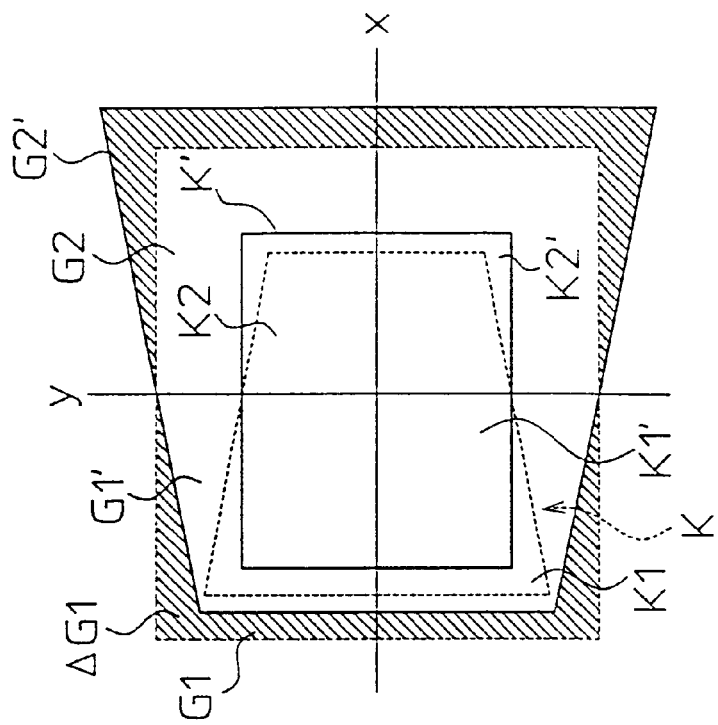

FIGS. 16A and 16B are diagrams showing an image processing method for correcting the captured oblique image into a pseudo front image, wherein FIG. 16A shows an image before the correction and FIG. 16B shows an image after the correction.

In FIG. 16, xy-coordinate systems are orthogonal coordinate systems tentatively provided for an image G picked up by the CCD 22 (image constructed by pixel data), and its origin is set in the center of the image G. An obliquely captured image K included in an image G (corresponding to the white board 20) is an image to which the oblique image correction is applied (hereinafter, "correction image").

Since the focus adjustment position of the camera 1 is set in the center of the field (origin 0 of the xy-coordinate systems) in this embodiment, a portion of the correction image K on y-axis is accurately in focus in FIG. 16A. An image K1 on the left side of y-axis is an image inclined toward the camera 1, whereas an image K2 on the right side of y-axis is an image inclined away from the camera 1.

Accordingly, as shown in FIG. 16B, the image G1 of the image G on the left side of y-axis is reduced with respect to both x- and y-axes so as to obtain an image G1'. In this way, the trapezoidal oblique image K1 is corrected into a rectangular reduced image K1'. The image G2 on the right side of y-axis is enlarged with respect to both x- and y-axes to obtain an image G2'. In this way, a trapezoidal oblique image K1 is corrected into a rectangular enlarged image K2'.

Enlargement and reduction processings of the picked image during the oblique image correction are performed according to the method disclosed in, e.g., Japanese Unexamined Patent Publication No. 8-164722. Specifically, since the object surface is not inclined with respect to the sensing surface of the CCD 22 along the y-axis direction, a processing for correcting the picked image into an image enlarged at a magnification $k(>1)$ is performed by replacing the respective pixel data constituting the picked image (image before the correction) by the respective pixel data constituting the picked image which could be obtained by picking up an image obtained by enlarging the original image at the magnification k.

The enlargement and reduction of the image with respect to the x-axis direction can be performed based on the same concept of the enlargement and reduction of the image with respect to the y-axis direction. However, since the image capturing magnifications mi, mi' vary along x-axis direction and the magnification k differs every pixel, the image is enlarged and reduced using the magnification ki of each pixel.

In the case of enlargement processing, the magnification ki in an arbitrary pixel position between points A and C in FIG. 8 is expressed as a product of an inverse of a ratio of the image capturing magnification mi in this pixel position to the image capturing magnification $m_A$ at point A $(m_A/mi)$ and a correction coefficient $(1/\cos(\theta))$ for correcting an oblique image into a front image, i.e., $ki=(m_A/mi)/\cos(\theta)$. On the other hand, since $mi/m\ A=1\cdot\tan(\beta i)\cdot\tan(\theta)=\cos(\beta i+\theta)/(\cos(\beta i)\cdot\cos(\theta))$ from Equation (2), the enlargement magnification ki is calculated by following Equations (3), (4):

$$ki=1/[\{1-\tan(\beta i)\cdot\tan(\theta)\}\cdot\cos(\theta)] \quad (3)$$

$$=\cos(\beta i)/\cos(\beta i+\theta) \quad (4)$$

In the case of reduction processing, the reduction magnification ki' in an arbitrary pixel position between points B and A in FIG. 8 is expressed as a product of an inverse of a ratio of the image capturing magnification mi' in a pixel position to the image capturing magnification $m_A$ at point A $(m_A/mi')$ and the correction coefficient $(1/\cos(\theta))$ for correcting an oblique image into a front image, i.e., $ki'=(m_A/mi')/\cos(\theta)$. On the other hand, since $mi'/m_A=\tan(\alpha i)\cdot\tan(\theta)=\cos(\alpha i-\theta)/(\cos(\beta i)\cdot\cos(\theta))$ from Equation (1), the reduction magnification ki' is calculated by following Equations (5), (6):

$$ki'=1/[\{1+\tan(\alpha i)\cdot\tan(\theta)\}/\cos(\theta)] \quad (5)$$

$$=\cos(\alpha i)/\cos(\alpha i-\theta) \quad (6)$$

Although the obliquely captured image is corrected by the enlargement and reduction processings as described above in this embodiment, it may be corrected by a so-called pixel addition method according to which an image is enlarged by adding known pixel data to the pixel data and by a so-called pixel weed-out method according to which pixel data are weeded out. Further, although the obliquely captured image is corrected by the enlargement and reduction processings, it may be corrected only by either the enlargement or reduction processing.

If the image G1 is reduced, a portion missing pixel data (see a hatched area ΔG1 of FIG. 16B) is seen in the image after the correction. The corrected image looks unnatural when being reproduced in a monitor television or by a printer. In the example of FIG. 16B, since the pixel data of noise level are outputted in the portion of the image corresponding to the area ΔG1, the quality of this portion becomes unstable during the reproduction, with the result that the image as a whole does not look nice. Thus, during the correction, a white dummy data may be set as, e.g., pixel data so that the missing portion turns white.

Figure 17:
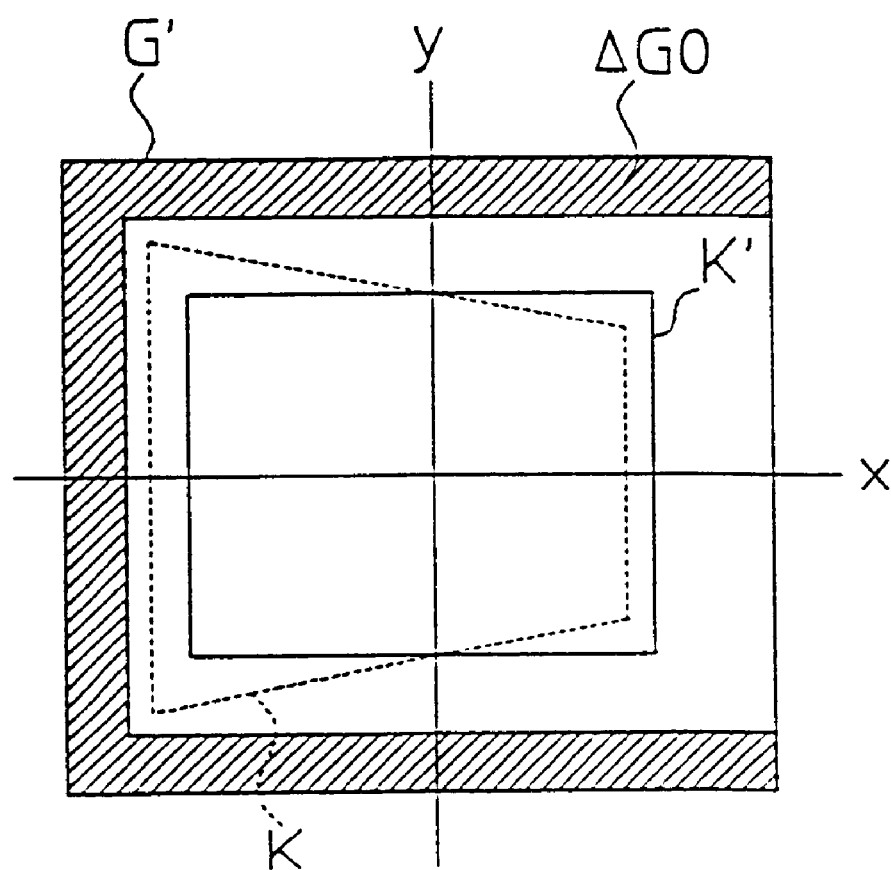
FIG. 17 is a diagram showing an image after a portion of pixel data missed during a compression processing is corrected.

Since the area ΔG1 has a wedge shape at its upper and lower portions, thereby looking unnatural, a margin area AGO comprised of strip-like areas capable of covering the area ΔG1 may be preferably provided at a left side portion, an upper side portion and a lower side portion (or a peripheral portion if necessary) of the corrected image G' as shown in FIG. 17, and a dummy data of a specific color such as white may be set for the margin area ΔGO. Since such an arrangement makes the reproduced image rimmed, a sense of unnaturalness can be reduced.

When the usual image capturing mode is set, no correction processing is performed in the oblique image correction device 321 and the pixel data inputted from the A/D converter 320 are outputted to the image memory 323 as they are.

The data effective area calculator 322 calculates an area of the image after the oblique image correction except the dummy data (area except ΔG1 in FIG. 16B, area except ΔGO in FIG. 17, hereinafter, "data effective area"). When a γ-characteristic for the illuminance nonuniformity correction is set for each block after the oblique image is corrected into a front image, an accurate γ-characteristic cannot be obtained in the blocks including the dummy data because of the presence of the dummy data. Accordingly, in this embodiment, a γ-characteristic is set using only the effective pixel data excluding the dummy data for such blocks as described later. The information on the data effective area are calculated by the data effective area calculator 323 is used when the effective pixel data in the respective blocks are extracted.

The image memory 323 is adapted to store the pixel data outputted from the oblique image correction device 321. The image memory 323 has a capacity for storing the pixel data corresponding to one frame of picked image, so that the image processing can be applied to the entire picked image at once.

Figure 18:
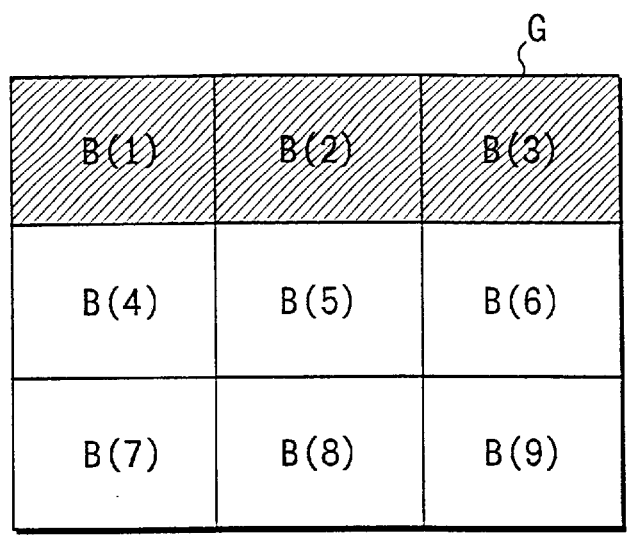
FIG. 18 is a diagram showing the capacity of an image memory.

The capacity of the image memory 323 may be so set as to allow the image processing line by line of the block when the picked image is divided into blocks. Specifically, the capacity of the image memory 323 is such as to store the pixel data included at least in the blocks arranged along one row when the picked image is divided into a plurality of blocks of the maximum settable size. By doing so, the memory capacity can be reduced. Specifically, if the picked image G is divided, for example, into 3×3 blocks B(1) to B(9) as shown in FIG. 18, the capacity of the image memory 323 may be so as to store the pixel data included in the blocks B(1) to B(3), the blocks B(4) to B(6), or the blocks B(7) to B(9) arranged in each row.

The first γ-characteristic setting device 324 is adapted to set γ-characteristics for the illuminance nonuniformity correction of the picked image. The first γ-characteristic setting device 324 divides the picked image into a plurality of blocks and sets a γ-characteristic for the illuminance nonuniformity correction every block using the pixel data included in each block. The second γ-characteristic setting device 325 is adapted to set a γ-characteristic for the black intensification of the image after the illuminance nonuniformity correction. The second γ-characteristic setting device 325 sets the Y-characteristic for the black intensification based on the information on the state of the black density adjustment switch 18 which is inputted from the CPU 30.

The first γ-correction device 326 is a circuit for applying a γ-correction to a natural image, whereas the second Y-correction device 327 is a circuit for applying a γ-correction to a character image. The first γ-correction device 326 applies the γ-correction to the pixel data read from the image memory 323 using a predetermined γ-characteristic suitable for the natural images. The second γ-correction device 327 divides a picked character image into a plurality of blocks, and applies the γ-correction to the pixel data constituting the picked image using the γ-characteristic for the black intensification set by the second γ-characteristic setting device 325 after applying the γ-correction to the pixel data using the γ-characteristics for the illuminance nonuniformity correction set for the respective blocks by the first γ-characteristic setting device 324. It should be noted that the γ-correction to be applied to the character image is described later.

The switch circuit 328 switches the connection of the image memory 323 with the first and second γ-correction devices 326, 327. The switching of the switch circuit 328 is controllably performed in accordance with a control signal outputted from the CPU 30 in correspondence with the set state of the illuminance nonuniformity correction switch 17. When the illuminance nonuniformity correction switch 17 is off (when the natural image mode is set), the image memory 323 is connected with the first γ-correction device 326. On the other hand, when the illuminance nonuniformity correction switch 17 is on (when the character image mode is set), the image memory 323 is connected with the second γ-correction device 327.

Here, a method for applying the γ-correction (illuminance nonuniformity correction and black intensification) to the character image is described.

As described above, it is desirable to make the character portion more clear than the white portion in the case of the character image. In order to make the white portion whiter, a γ-characteristic having an output level saturated at a specified input level W as shown in FIG. 10 is used.

Figure 19:
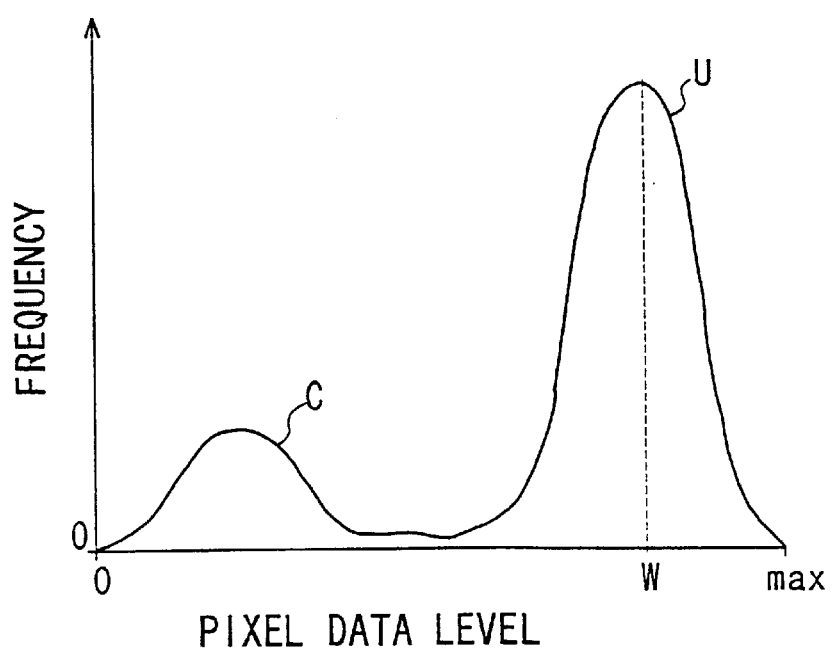
FIG. 19 is a graph showing a general shape of a histogram of level-frequency distribution of pixel data constituting a character image.

A histogram of level-frequency distribution of the pixel data of, e.g., green components constituting the character image is generated, and a level having a maximum frequency within a range corresponding to the white portion is set as a white saturation level W of this γ-characteristic. In other words, if the histogram of level-frequency distribution of the pixel data of green components is generated for an image obtained by image capturing the white board 20 on which characters, figures or the like are drawn, it is generally a two-peak distribution portion having a convex portion U corresponding to a white portion (board portion) and a convex portion C corresponding to a black portion (character portion) as shown in FIG. 19. A level w corresponding to the peak of the convex portion U is set as the white saturation level W of the γ-characteristic.

The γ-characteristic for determining the white saturation level W may be set based on the histogram of level-frequency distribution of the pixel data of green components constituting the entire picked image and the γ-correction may be applied to the entire picked image using this characteristic. However, the characters drawn on the white board 20 by hand has a largely varying character density (a ratio of the character portion to the white portion), and a distribution of illuminance largely varies within the field in the case of a picture taking since a light source is not constant as in a copying machine provided with an illuminating device. Accordingly, it is preferable to correct the illuminance nonuniformity by dividing the picked image into a plurality of blocks and applying the γ-correction to each block using the γ-characteristic set for each block.

Figure 20:
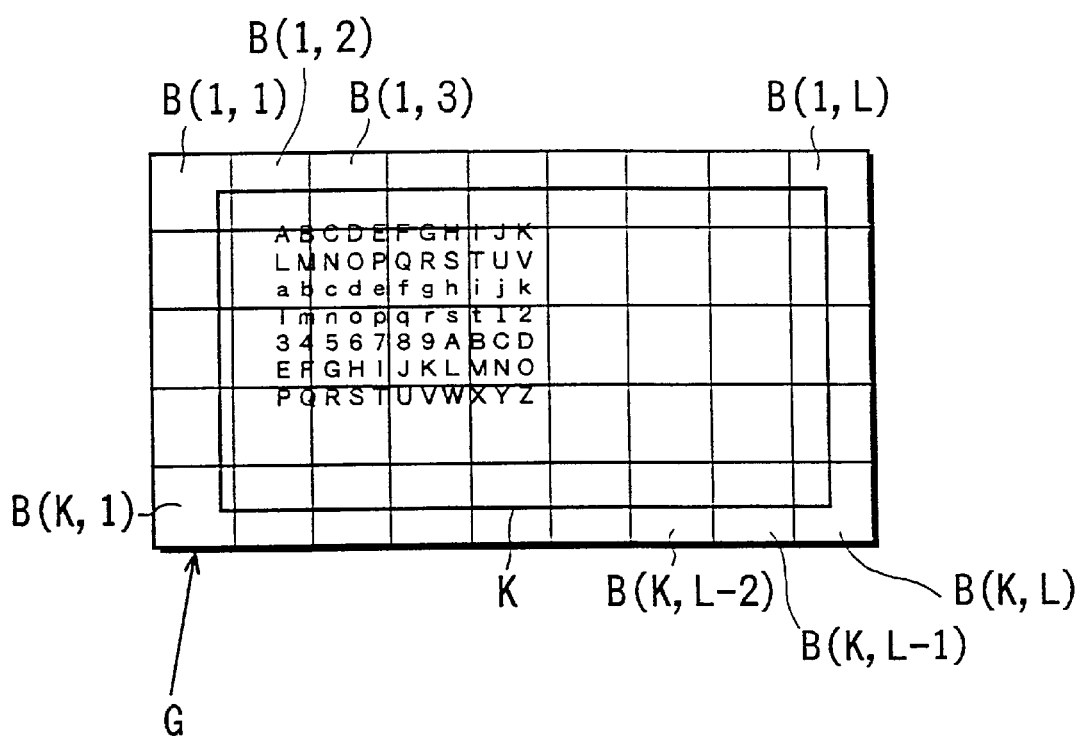
FIG. 20 is a diagram showing a sensed image divided into a plurality of small images in blocks.

In the electronic camera 1 according to this embodiment, as shown in FIG. 20, the picked image G is divided into n (=K (column)×L (row)) blocks B(I, J) (I=1, 2, . . . K, J=1, 2, . . . L) along column and row directions, and the γ-characteristic for the illuminance nonuniformity correction representing the block B(I, J) is set for each block B(I, J). In this case, the size (area) of the blocks B(I, J) is set such that about 9 (3×3) characters can be included therein. The size of the blocks B(I, J) is set in relation to the number of characters for the following reason. In the case that the histogram of level-frequency distribution is generated using the pixel data in the block, the convex portion U corresponding to the white board 20 is permitted to have a suitably steep slope, so that the peak position w of the convex portion U can be securely detected.

Specifically, if the block size is set relatively small with respect to the characters as shown in FIG. 21A, an area of the block B(I, J) taken up by the character portion is large, thereby making the convex portion U of the histogram of level-frequency distribution corresponding to the white board 20 flat. Thus, the peak position w of the convex portion U may be erroneously detected. If the block size is set relatively large with respect to the characters as shown in FIG. 21B, illuminance largely varies in the blocks B(I, J), making the convex portion U of the histogram of level-frequency distribution corresponding to the white board 20 moderately sloped. In this case as well, the peak position w of the convex portion U may be erroneously detected.

In order to determine the block size, it is necessary to know the size of the character image projected on the field. The size y' of the character image projected on the field can be calculated from the size y of the characters drawn on the white board 20 and the image capturing magnification m: y'=y·m. Further, the size y of the characters drawn on the white board 20 is considered to be in a specific range although it may differ depending upon who draws. Accordingly, if a representative value y0 of the size y of the characters drawn on the white board 20 and an image capturing magnification m0 are empirically determined, the size y' of the character image projected on the field can be simply determined from the image capturing magnification m.

In this embodiment, a reference block size S0 is determined based on the size y0 of the characters projected on the field at the image capturing magnification m0, the block size S at any arbitrary image capturing magnification m is calculated based on the image capturing magnification m0 and the block size S0: S=S0·m/m0. Accordingly, if (i×j) pixel data are assumed to be included in the block of the size S0, the number i' of the pixel data along column direction of the block of the size S is i·m/m0, and the number j' of the pixel data along row direction of the block of the size S is j·m/m0.

Although the block size S is set such that 9 characters are included in the block in this embodiment, this is only an example. If the representative value y0 of the size y of the characters drawn on the white board 20 is changed, the number of the characters in the block changes. Thus, the block size S is set according to the representative value y0 such that a suitable number of characters are included in the block.

Figure 22:
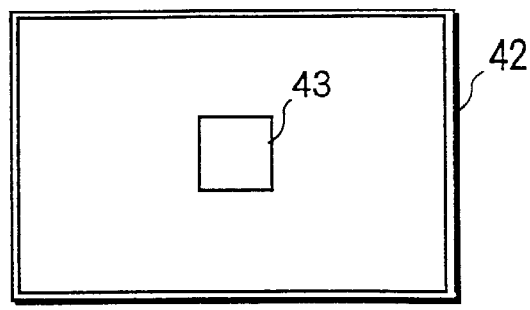
FIG. 22 is a diagram showing a viewfinder frame displaying a block frame.

Further, although the block size S is changed according to the image capturing magnification m in this embodiment, the image capturing magnification m may be adjusted to a specified value m0 corresponding to the block size S0 in image capturing a character image while the block size S0 is fixed. Specifically, as shown in FIG. 22, a block frame 43 corresponding to the block size S0 may be displayed in the viewfinder frame 42 and an image capture person may adjust the zooming ratio of the taking lens 2 or the object distance such that an image corresponding to 9 characters drawn on the white board 20 falls within this block frame 43. The block frame 43 may be displayed constantly or only when the character image is set.

Next, a method for determining the γ-characteristic for the illuminance nonuniformity correction based on the histogram of level-frequency distribution of the pixel data of green components is described.

Out of (i×j) pixel data g(1, 1), g(1, 2), . . . g(i−1, j), g(i, j) included in the block B(I, J), a predetermined X(%) of pixel data are deleted from the maximum level toward the lower level. The histogram of level-frequency distribution is generated using the remaining pixel data. For example, if the total number of the pixel data included in the block is 10000 and X=3%, 300 pixel data added from the maximum level p toward the lower level are deleted, and the histogram of level-frequency distribution is generated using the remaining 9700 pixel data. X% of the pixel data at the high level side are deleted in order to avoid adverse influences such as a noise.

Figure 23:
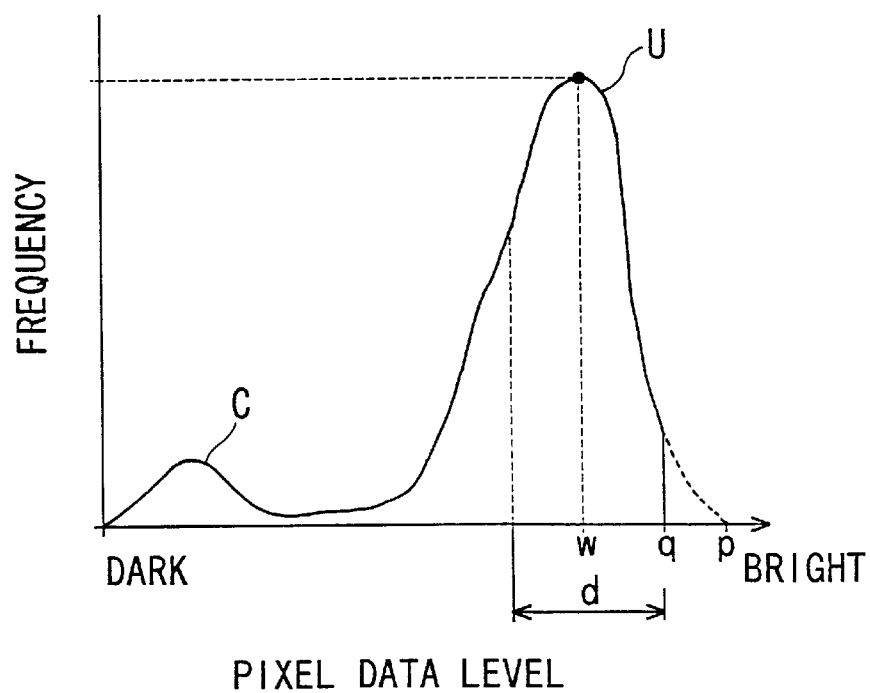
FIG. 23 is a graph showing an exemplary histogram of level-frequency distribution of pixel data constituting a small image divided by the block.

This histogram of level-frequency distribution is generally a two-peak distribution histogram as shown in FIG. 23. A convex portion U at the high level side corresponds to the base portion of the white board 20, and a convex portion C at the low level corresponds to the character portion. A level p in FIG. 23 is a maximum level of the pixel data included in the block B(I, J), and a level q (<p) is a maximum level of the histogram of level-frequency distribution.

Upon the generation of the histogram of level-frequency distribution, a most frequent level w in a distribution of a predetermined range d extending from the maximum level p toward the low level is calculated, and is set as the white saturation level W of the γ-characteristic for the illuminance nonuniformity correction. The range d is such that only the convex portion U of the high level side is presumed to be securely included in the block captured at a normal illuminance since the block size is set at a specified size in relation to the number of characters. If, for example, the pixel data is an 8-bit data and has 0 to 255 gradation levels, the width of the range d is set at about 48 levels.

Figure 24:
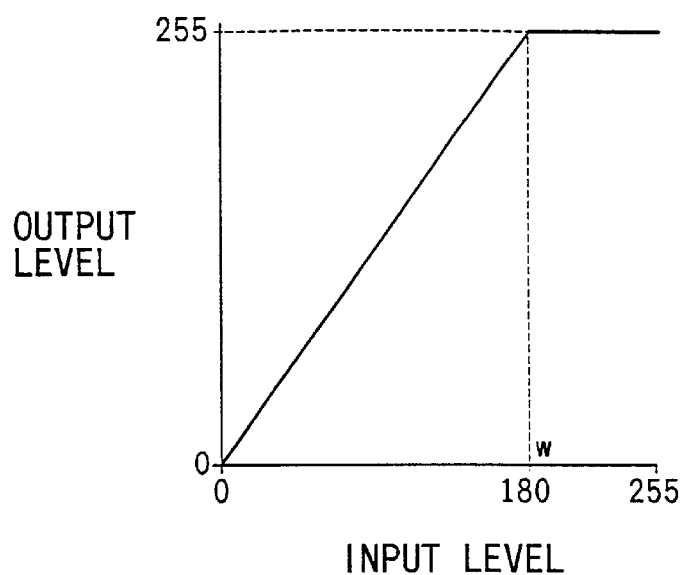
FIG. 24 is a graph showing an exemplary γ-characteristic set using the histogram of level-frequency distribution of the pixel data.

Accordingly, if the maximum level q is, for example, 200, the level w having a maximum frequency in the level range 152 to 200 is calculated. If the level w is 180, the white saturation level W is set at 180 and a γ-characteristic as shown in FIG. 24 is determined.

In the oblique image correction mode, there is an area where dummy data exist in a portion of the image to which the compression processing is applied. If the white saturation level W is set for the block including the dummy data using the histogram of level-frequency distribution of all pixel data including the dummy data, the correct white saturation level W cannot be set. Accordingly, for the block including the dummy data, the histogram of level-frequency distribution is generated using the effective pixel data excluding the dummy data and the white saturation level W is set using this histogram of level-frequency distribution.

If the white board 20 is not completely white, but slightly colored, or if the white balance adjustment of the electronic camera 1 is improper, the γ-characteristic for the illuminance nonuniformity correction set using the pixel data of green components cannot be applied for the γ-correction applied to the pixel data of red and blue components since a γ-value of an equivalent γ-characteristic for the γ-correction performed using the γ-characteristic for the illuminance nonuniformity correction and the γ-characteristic for the black intensification is relatively large.

Figure 25:
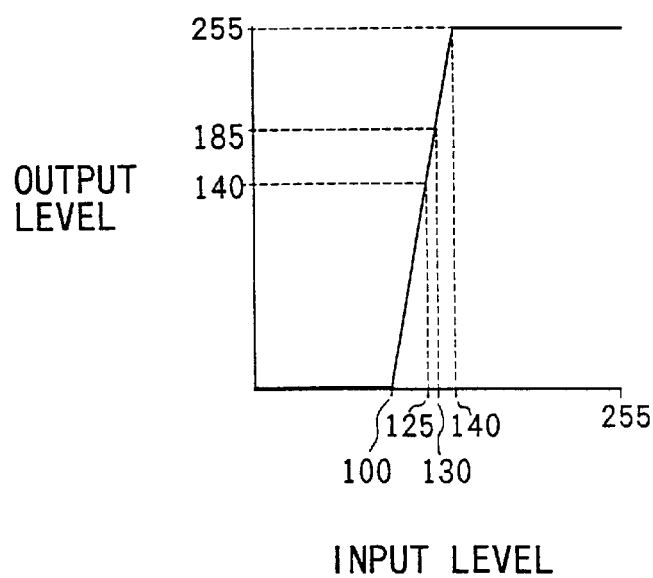
FIG. 25 is a graph showing an exemplary γ-characteristic set using the pixel data of green components.

Specifically, let it be assumed that a captured image of a certain area of the white board 20 is not completely white and levels $D_R$, $D_G$, $D_B$ of the pixel data of the respective color components R, G, B are, for example, ($D_R$, $D_G$, $D_B$)=(130, 140, 125), and a γ-characteristic equivalent to the γ-characteristic for the illuminance nonuniformity correction and the γ-characteristic for the black intensification which are set using the pixel data of green components (γ-characteristic obtained by combining the two γ-characteristics) is set, for example, as shown in FIG. 25. If the γ-correction is applied to the pixel data of red and blue components using this γ-characteristic, the outputs of the respective color components are: ($D_R$, $D_G$, $D_B$)=(185, 255, 140) as shown in FIG. 25, with the result that the image after the γ-correction turns considerable yellow green.

If the γ-value of the γ-characteristic shown in FIG. 25 is small (moderately sloped), the resulting color difference is almost no problem since the outputs of the respective color components after the γ-correction differ to a small degree. However, the γ-characteristic used in the character image mode is adapted to perform a γ-correction similar to a binary processing and the γ-value is set relatively large. Accordingly, it is difficult to use the γ-characteristic set using the pixel data of green components for the γ-correction to be applied to the pixel data of red and blue components.

As a method for avoiding the above coloring phenomenon of the white portion, there can be considered a method according to which the pixel data of the color components R, G, B are converted into luminance data and color difference data and are reconverted into the pixel data of the color components R, G, B after the y correction is performed using only the luminance data. However, according to this method, the color difference data are kept. Thus, if the characters drawn on the white board 20 are, for example, scratchy light characters, they remain light even after the γ-correction. It is difficult to clearly reproduce the light characters.

In this embodiment, exclusive γ-characteristics for the respective color components are set by correcting the γ-characteristic for the illuminance nonuniformity correction set using the pixel data of green components. By performing the γ-correction using the exclusive γ-characteristic for each color component, even the light characters can be clearly reproduced.

The γ-characteristics for the respective color components are set using the pixel data of the respective color components so that an input level ($D_R$-5, $D_G$-5, $D_B$-5) becomes the white saturation level assuming a margin value of the level is "5". For example, in the example of the γ-characteristic shown in FIG. 25, the γ-characteristics for the color components R, G, B are set so that the input level of the respective color components R, G, B (125, 135, 120) becomes the white saturation level 255 as shown in FIGS. 26A to 26C.

Since the γ-correction is performed so as to make the colored white portion white, the color portion has a different color than from its original one. However, it is more important in the character image to reproduce the representation than to reproduce the colors. Thus, the color difference of a certain degree is thought to be permissible.

In the above description, the histogram of level-frequency distribution of the pixel data included in the block is generated and the white saturation level W is determined (i.e., the γ-characteristic is set) based on this histogram of level-frequency distribution. However, instead of using the histogram of level-frequency distribution, the γ-characteristic may be set by calculating the pixel data.

If the γ-characteristic for the illuminance nonuniformity correction is set for each block B(I, J) according to the aforementioned method and the γ-correction is applied to the image block by block using these γ-characteristics, the image quality suddenly changes at the boundaries of the blocks since the γ-characteristic for the illuminance nonuniformity correction differs every block. This may create boundary lines (pseudo lines). In other words, the white level suddenly changes at the boundaries of the blocks and this discontinuity of the white level may turn out as boundary lines.

Accordingly, in this embodiment, the γ-characteristic for the illuminance nonuniformity correction set for each block B(I, J) is the γ-characteristic of the pixel data in the center position of the block B(I, J). γ-characteristics for the illuminance nonuniformity correction of the pixel data between the center positions of the neighboring blocks are linearly interpolated using the γ-characteristics for the illuminance nonuniformity correction of the two blocks. By applying the γ-correction to the pixel data in positions other than the center positions using the linearly interpolated γ-characteristics, the discontinuity of the image quality caused by the different γ-characteristics of the blocks is moderated.

Specifically, if A, B, C, D are the center positions of blocks B(I, J), B(I, J+1), B(I+1, J) and B(I+1, J+1) as shown in FIG. 27, a γ-characteristic for the illuminance nonuniformity correction corresponding to an arbitrary point P in an area AR1 enclosed by ABCD is linearly interpolated using the γ-characteristics for the illuminance nonuniformity correction set for the blocks B(I, J), B(J, J+1), B(I+1, J) and B(I+1, J+1). The γ-correction is applied to the pixel data in the position P using this interpolated γ-characteristic.

Since the white saturation levels $W_A$, $W_B$, $W_C$, $W_D$ calculated for the respective blocks B(I, J), B(J, J+1), B(I+1, J) and B(I+1, J+1) are so dealt as to correspond to positions A, B, C, D, a value $W_P$ of the white saturation level in position P is calculated by internally dividing the white saturation levels $W_A$, $W_B$, $W_C$, $W_D$ in positions A, B, C, D in accordance with Equation (7). The interpolated γ-characteristic for the illuminance nonuniformity correction in position P is set using this value $W_P$.

$$W_P=(1-m)\times\{(1-n)\times W_A+n\times W_C\}+m\times\{(1-n)\times W_B+n\times W_D\} \qquad (7)$$

According to the above interior division method, the γ-characteristics are not interpolated in the portions of the respective blocks outside their center positions in the blocks B(1, 1) to B(1, L), B(2, L) to B(k, L), B(K, L−1) to B(K, 1), B(k−1, 1) to B(2, 1) which are located around the picked image. For these portions, the γ-characteristics may be linearly interpolated by an exterior division method.

The γ-characteristics may be interpolated in all positions except the center positions of the respective blocks B(I, J). However, a time required for the interpolation calculation may be shortened by dividing the portion of each block B(I, J) except the center position into sub-blocks each including a plurality of pixel data (e.g., 4×4 to 6×6 pixels) and linearly interpolating the γ-characteristic every sub-block.

The above interpolation of the γ-characteristics for the illuminance nonuniformity correction may be performed as follows. Since the γ-characteristics are set for the respective pixel positions, similar results can be obtained if a block is set centering each pixel position and the γ-characteristic is set using the histogram of level-frequency distribution of the pixel data included in this block. However, according to this method, it disadvantageously takes a long time for the calculation of the γ-characteristics because a huge number of blocks are set in the picked image G. Further, there is hardly any difference in the generated histogram of level-frequency distributions between neighboring blocks because most of the pixel data are repeated in neighboring blocks. Thus, it is not practical to generate the histogram of level-frequency distribution for both blocks. Therefore, this embodiment adopts the linear interpolation of the γ-characteristics which enables a high speed calculation and allows a reduced memory capacity.

Figure 14:
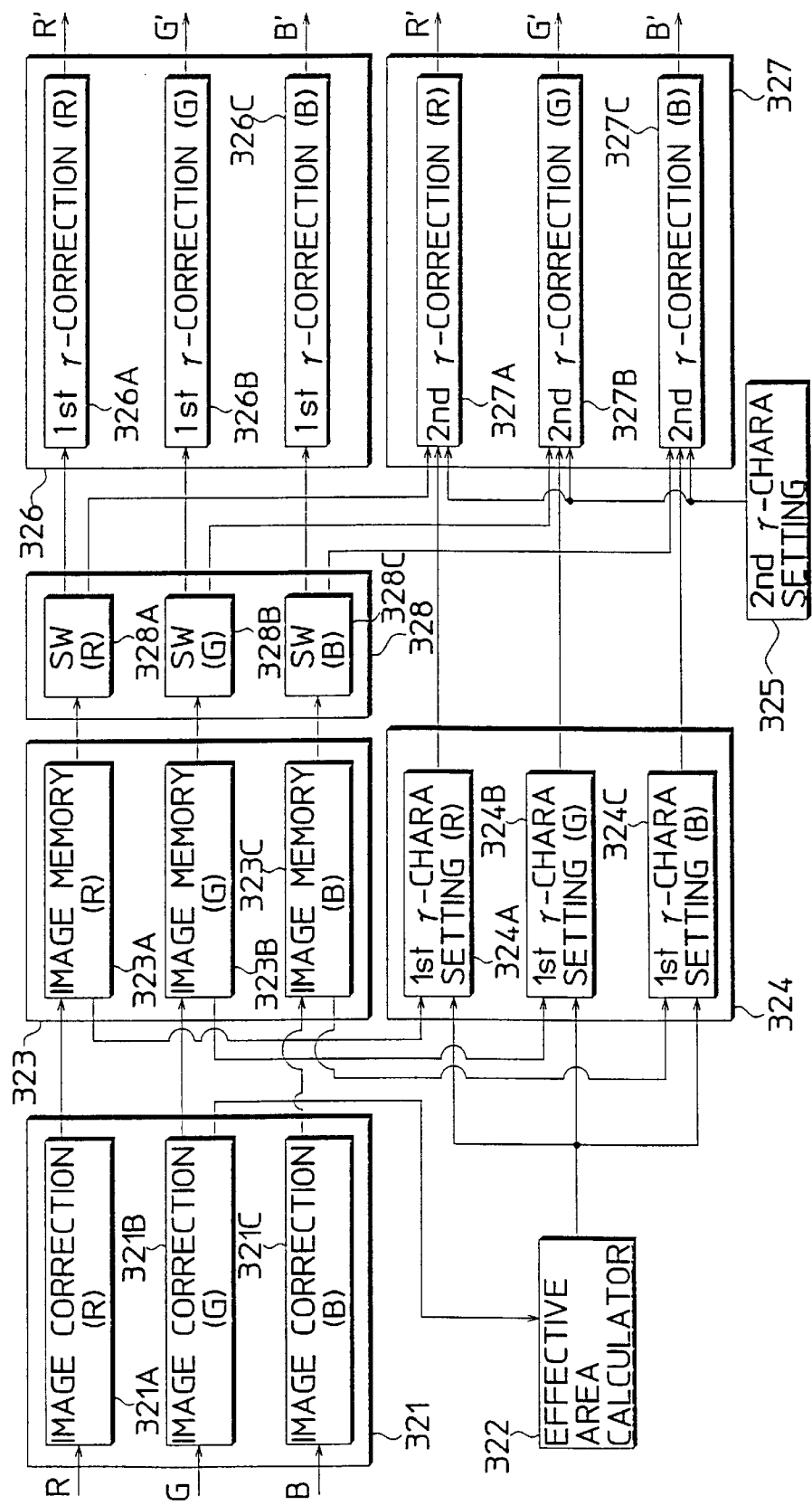
FIG. 14 is a block diagram showing a construction of a portion for applying an image processing to a color image from an oblique image correction device to first and second γ-correction devices.

FIG. 14 is a block diagram showing the construction for applying an image processing to a color image from the oblique image correction device 321 to the first and second γ-correction devices 326, 32.

The oblique image correction device 321, the image memory 323, the first γ-characteristic setting device 324, the first and second γ-correction device 326, 327 and the switch circuit 328 have each three processing circuits of identical construction in correspondence with the pixel data of the respective color components R, G, B.

For example, the pixel signals of red components are temporarily stored in the image memory 323A after having an image distortion corrected in the oblique image correction device 321A. In the natural image mode, the pixel data of red components stored in the image memory 323A are transferred via the switch circuit 328A to the first γ-correction device 326A, where the γ-correction is performed using a predetermined γ-characteristic for the natural images.

On the other hand, in the character image mode, the first γ-characteristic setting device 324A sets a γ-characteristic for the illuminance nonuniformity correction block by block based on the histogram of level-frequency distribution of the pixel data of R included in each block, and the second γ-characteristic setting device 325 sets a γ-characteristic for the black intensification based on an adjustment value of the black density adjustment switch 18. The pixel data of red components stored in the image memory 323A are transferred via the switch circuit 328 to the second γ-characteristic correction device 327A, where the γ-correction is performed using the γ-characteristic for the black intensification for each block after the γ-correction is performed using the γ-characteristic for the illuminance nonuniformity correction.

The pixel signals of green and blue components are processed in a manner similar to those of red components.

Figure 15:
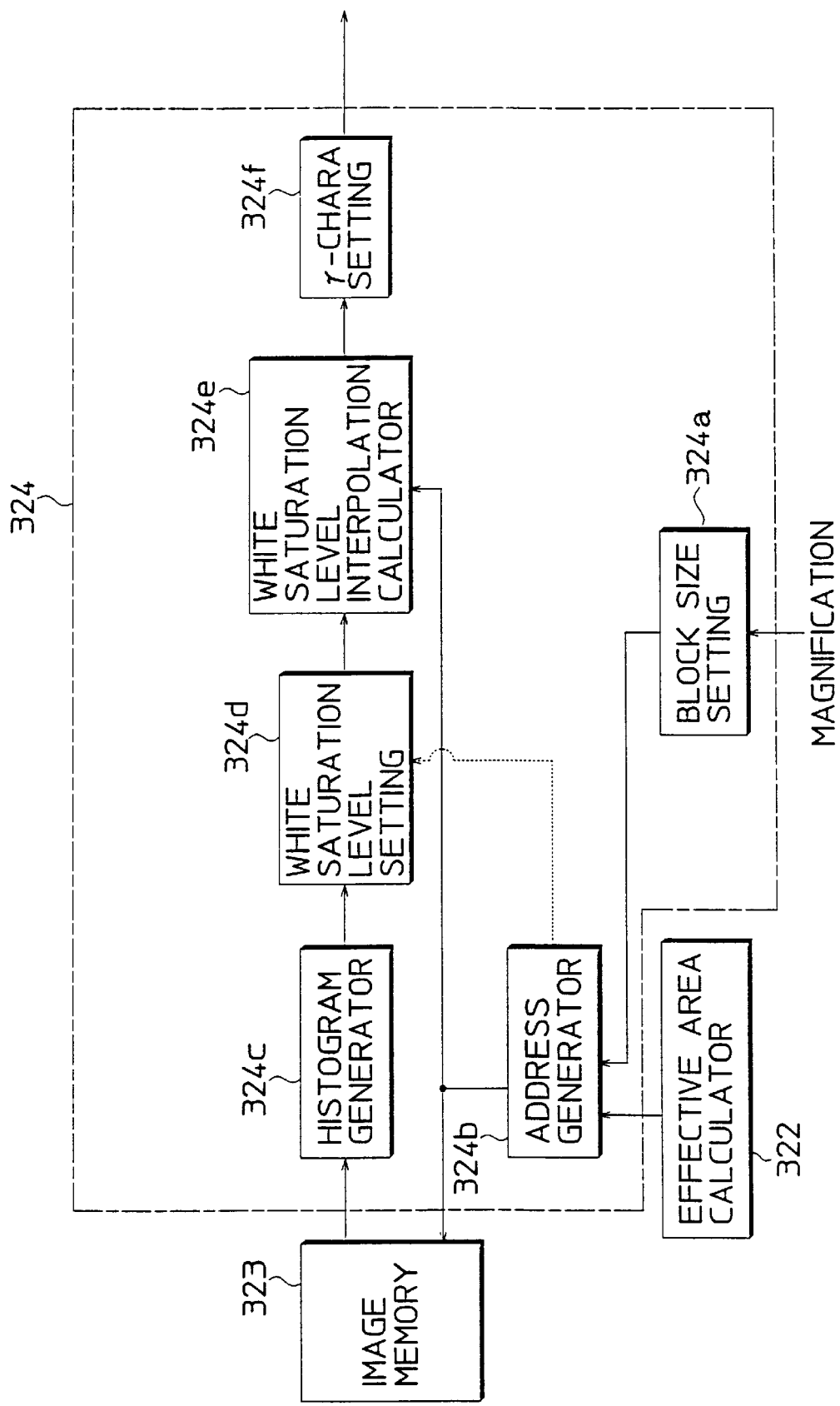
FIG. 15 is a block diagram showing an internal construction of a first γ-characteristic setting device.

FIG. 15 is a block diagram showing the internal construction of the first γ-characteristic setting device 324.

In FIG. 15, a block size setting device 324a is adapted to set the size of the blocks for dividing the picked image into small images in the blocks B(I, J). The block size setting device 324a sets a block size S using the image capturing magnification m inputted from the CPU 30, the predetermined reference size S0 and the reference image capturing magnification m0.

An address generator 324b is adapted to generate addresses of the pixel data included in each block B(I, J) based on the block size S0 set by the block size setting device 324a. This address data is used for the read control of the pixel data from the image memory 323 and the interpolation calculation in a white saturation level interpolation calculator 324e.

A histogram generator 324c is adapted to generate, for each block B(I, J), the histogram of level-frequency distribution (see FIG. 23) of the pixel data included in the block. A white saturation level setting device 324d is adapted to set the white saturation level W (see FIG. 24) of the γ-characteristic corresponding to the center position of each block B(I, J) using the histogram of level-frequency distribution generated by the histogram generator 324c. The white saturation level interpolation calculator 324e is adapted to interpolate the white saturation levels W of the γ-characteristics corresponding to the positions of each block B(I, J) except the center position thereof using the white saturation level W set for each block B(I, J).

A γ-characteristic setting device 324f is adapted to set the γ-characteristics for the illuminance nonuniformity correction corresponding to the respective pixel data of the picked image using the white saturation levels W set by the white saturation level setting device 324d and the white saturation level interpolation calculator 324e.

Referring back to FIG. 13, a card driver 33 controls the driving of the HD card 13 to store the image data. An emission controller 34 controls the firing of the flash 7.

An LCD driver 35 controls the display of the picked image on the LCD device 19 in accordance with a control signal from the CPU 30. A memory 36 stores a data (object distance Di and image capturing magnification mi in each pixel position of the CCD 22) necessary for the oblique image correction calculated by the CPU 30.

A lens driver 37 controls the focusing of the taking lens 2 in accordance with an AF control value inputted from the CPU 30. A zoom driver 38 controls the zooming of the taking lens 2 in accordance with a drive signal inputted from the CPU 30. A diaphragm driver 39 controls the aperture of the diaphragm 21 in accordance with the aperture value Av of the exposure control values inputted from the CPU 30.

The light meter 40 include light receiving elements such as SPCs provided behind the light meter window 3 and is adapted to measure the brightness of an object. The distance meter 41 detects an object distance and include a light emitting portion 411 provided behind the light emission window 4 for emitting infrared rays and a light receiving portion 412 provided behind the light receiving window 5 for receiving the infrared rays reflected by the object.

The CPU 30 centrally controls the image capturing operation of the camera 1. The CPU 30 includes an image capturing magnification calculator 301 for calculating an object distance $D_A$ at a metering point (center position A of the sensing surface of the CCD 22) detected by the distance meter 41 and an image capturing magnification $m_A$ at this metering point, and image capturing magnifications mi, mi' in other pixel positions in the oblique image correction mode. The CPU 30 also includes an exposure control value calculator 302 for calculating exposure control values (aperture value Av and shutter speed Tv) based on the brightness information of the object detected by the light meter 40, and outputs the calculation result to the diaphragm driver 39 and the CCD driver 31. The CPU 30 also includes an AF control value calculator 303 for calculating a lens drive amount by which the taking lens 2 is driven to attain an in-focus condition based on the object distance $D_A$ detected by the distance meter 41 and outputs the calculation result to the lens driver 37 as an AF control value.

Next, an image capturing control of the electronic camera 1 is described with reference to flowcharts of FIGS. 28 to 32. It is assumed that the image capturing/reproduction switch 12 is set at the image capturing side.

When the electronic camera 1 is activated by turning the main switch 14 on, the image capturing operation is enabled.

When the zoom switch 11 is operated in this state (YES in Step #2), the zoom lens of the taking lens 2 is driven according to the operating direction and the operating amount of the zoom switch 11, thereby changing the zooming ratio (Step #4). Thereafter, when the shutter release button 10 is partly pressed to turn the ST1 switch on (YES in Step #6), this routine proceeds to Step #8 to start the image capturing preparation processing.

Specifically, it is first judged based on the set position of the operation button 16c of the mode setting switch 16 whether the oblique image capturing mode is set (Step #8). If the oblique image capturing mode is set (YES in Step #8), the angle of inclination θ is obtained based on the set position of the operation button 16c (Step #10) and a correction calculation is instructed to the oblique image correction device 321 (Step #12). On the other hand, if the oblique image capturing mode is not set (N0 in Step #8), Steps #10, #12 are skipped.

Subsequently, it is judged whether the illuminance nonuniformity correction has been designated (the illuminance nonuniformity correction switch 11 is set "on") (Step #14). If the illuminance nonuniformity correction has been designated (YES in Step #14), the density information on the character portion is obtained based on the set position of the black density adjustment switch 18 (Step #16). Then, the first γ-characteristic setting device 324 is set ready for the processing; the density information is inputted to the second γ-characteristic setting device 325; the γ-characteristic for the black intensification is set based on the density information; and the γ-characteristic for the black intensification is inputted to the second γ-correction device 327 (Step #18). The first γ-correction device 326 is then switched to the second γ-correction device 327 (Step #20). On the other hand, if the illuminance nonuniformity correction has not been designated (N0 in Step #14), Steps #16 to #20 are skipped.

Subsequently, infrared rays for the distance metering are projected toward an object from the light emitting portion 411 of the distance meter 41 (Step #22). A distance meter data is obtained by receiving the infrared rays reflected by the object by the light receiving portion 412 of the distance meter 41 (Steps #24, #26).

Figure 29:
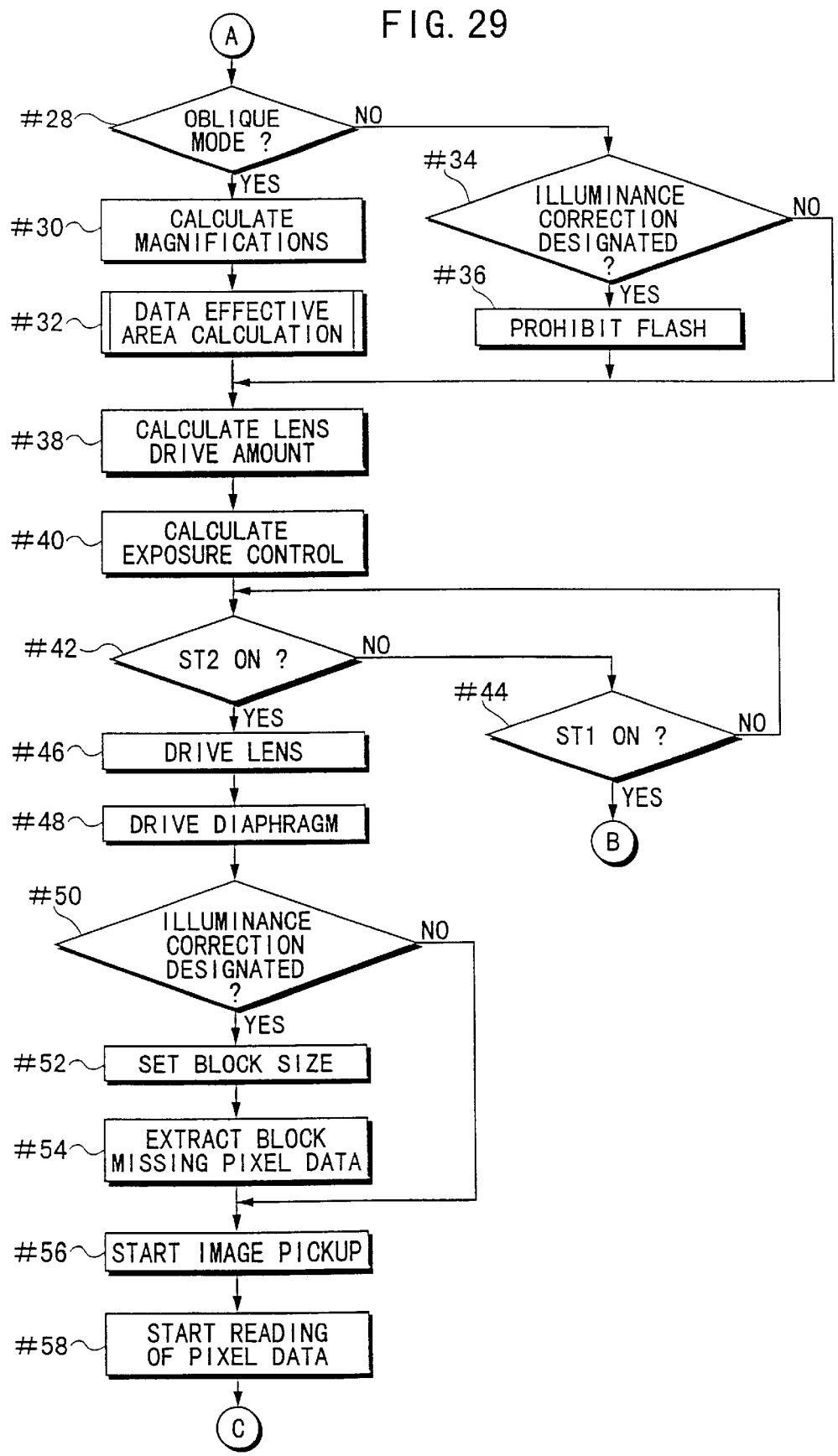

It is then judged whether the oblique image correction mode is set (Step #28 in FIG. 29). If the oblique image correction mode is set (YES in Step #28), a distance $D_A$ from the sensing surface in the center of the field to the object (distance OP in FIG. 8) is calculated based on the obtained distance meter data and angles of view αi, βi in each pixel position of the CCD 22 are calculated.

An object distance Di in each pixel position (i.e., a distribution of object distance within the field) is calculated based on the angles of view αi, βi, the object distance $D_A$ and the angle of inclination θ, and the image capturing magnification $m_A$ at the distance metering point is calculated based on the focal length f and the object dance $D_A$. The image capturing magnifications mi, mi' in each pixel position (i.e., a distribution of image capturing magnifications within the field) are calculated based on the image capturing magnification $m_A$, the angle of inclination θ and the angles of view αi, βi in accordance with Equations (1), (2). Further, magnifications ki, ki' are calculated in accordance with Equations (4) and (6) (Step #30).

Figure 31:
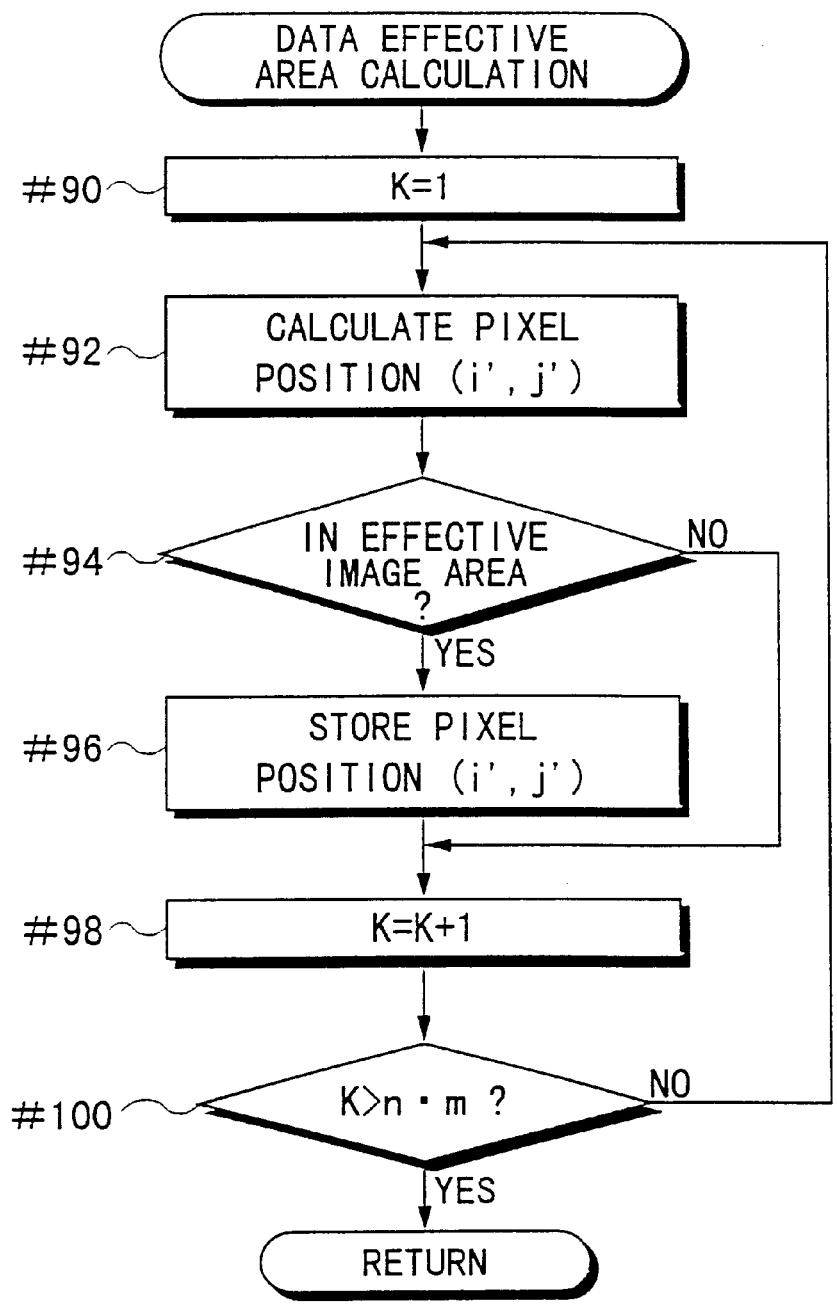
FIG. 31 is a flowchart showing a subroutine "Data Effective Area Calculation"
Figure 32:
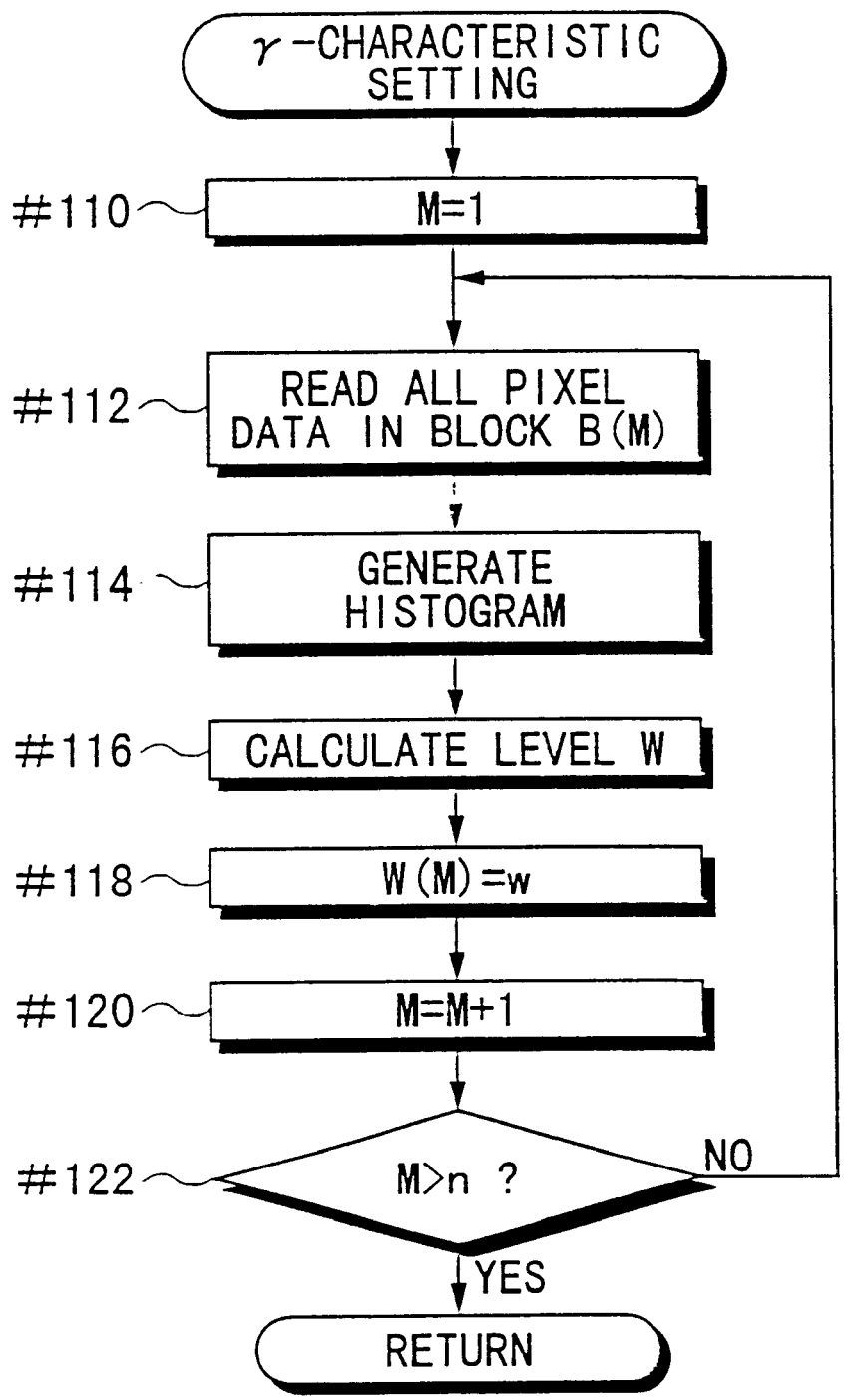
FIG. 32 is a flowchart showing a subroutine "γ-characteristic Setting"

Subsequently, an area of effective pixel data in the image after the oblique image correction (an area except the pixel positions of the dummy data, hereinafter, "data effective area") is calculated with reference to a subroutine "Data Effective Area Calculation" shown in FIG. 31 (Step #32).

Figure 33:
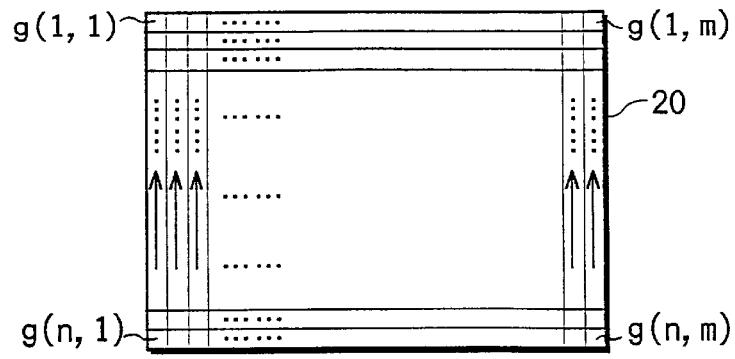
FIG. 33 is a diagram showing a reading direction of the pixel data of the CCD.

The data effective area is calculated as follows. First, a counter K for counting the pixel position is set at "1" (Step #90). A pixel position (i', j') of the image in a pixel position at K=1 after the correction is calculated based on the object distance Di, the angle of inclination θ, and the focal length f of the taking lens 2 at K=1 (Step #92). As shown in FIG. 33, if g(i, j) denotes a pixel data in a pixel position (i, j), since the data effective area calculation is conducted along raster direction from the pixel position (1, 1), K=L·(I−1)+J. Thus, the pixel data g(I, J) corresponds to the pixel data g(L·(I−1)+J).

It is then judged whether the calculated pixel position (i', j') after the correction is located in an effective image area (Step #94). This judgment is made by judging whether the pixel position (i', j') falls within a range of (1 to n, 1 to m) since the effective image area is (1 to n, 1 to m). If the pixel position (i', j') after the correction falls within the effective image area (YES in Step #94), the data in this pixel position (i', j') is stored in the memory 36 (Step #96). Step #96 is skipped unless the pixel position (i', j') after the correction is in the effective image area.

After the count value of the counter K is incremented by "1" (Step #98), it is judged whether the count value K is larger than a total pixel number n·m (Step #100). If K≦n·m (NO in Step #100), this subroutine returns to Step #90 to judge whether the pixel position of a next pixel data g(K) after the correction is in the effective image area. If K>n·m (YES in Step #100), this subroutine returns on the judgment that the judgment has been made for all pixel data.

Referring back to the flowchart of FIG. 29, if the usual image capturing mode is set in Step #28 (NO in Step #28), it is judged whether the illuminance nonuniformity correction has been designated (Step #34). If the illuminance nonuniformity correction has not been designated (NO in Step #34), Steps #30, #32 are skipped. If the illuminance nonuniformity correction has been designated (YES in Step #34), Steps #30, #32 are skipped and a control signal representing the prohibition of the flash firing is outputted to the emission controller 34 to prohibit the firing of the flash 7 (Step #36). The firing of the flash 7 is prohibited when the usual image capturing mode is set and the illuminance nonuniformity correction has been designated for the following reason. For example, there is a possibility that the flash 7 is automatically fired in a scene where the white board 20 is captured from front. In this scene, the flash light may be fully reflected by the white board 20, making the characters in the picked image unreadable. In order to prevent such an error image capturing, the firing of the flash 7 is prohibited.

Subsequently, the lens drive amount for driving the taking lens 2 to attain an in-focus condition is calculated based on the object distance $D_A$ (Step #38), and the exposure control values are calculated based on the light meter data detected by the light meter 40 (Step #40). In this way, the image capturing preparation is completed and the electronic camera 1 waits on standby for the exposure.

In this standby state, when the shutter release button 10 is fully pressed to turn the ST2 switch on (YES in Step #42), this routine proceeds to Step #46 to perform the exposure. On the other hand, if the shutter release button 10 is kept partly pressed, i.e., the ST1 switch is on, the camera 1 continues to wait on standby for the exposure (a loop of Steps #42, #44). When the ST1 switch is turned off by releasing the shutter release button 10 (NO in Step #44), this routine returns to Step #2.

Upon starting the exposure, a data on the lens drive amount is outputted to the lens driver 38 and the taking lens 2 is focused (Step #46). Thereafter, the aperture value data Av of the exposure control values is outputted to the diaphragm driver 39 and the aperture of the diaphragm 21 is adjusted (Step #48).

Subsequently, it is judged whether the illuminance nonuniformity correction has been designated (Step #50). If the illuminance nonuniformity correction has been designated (YES in Step #50), the size of the blocks for dividing the picked image into a plurality of small images is set (Step #52). The block size is set as follows. The block size S (=S0·$m_A$/m0) in the center of the field is set using the image capturing magnification $m_A$ calculated for the center of the field, the predetermined reference image capturing magnification m0 and the block size S0, and this block size is applied as the block size in other positions. In other words, the picked image is divided by blocks of the size set in the center of the field without changing the block size depending on the position in the field.

Figure 34A:
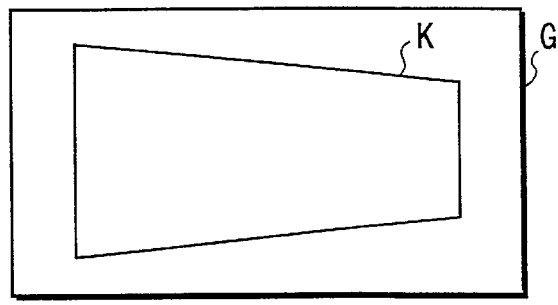

Further, the blocks missing the pixel data (blocks including the dummy data after the correction) within an area where the reduction processing is performed in the oblique image correction mode are extracted based on the distribution of image capturing magnifications mi and the set block size (Step #54). Specifically, in the case that an oblique image G of FIG. 34A is corrected into a front image G' of FIG. 34B and this front image G' is divided into 45 (=5×9) blocks, eleven blocks B(1, 1) to B(1, 4), B(5, 1) to B(5, 4), B(5, 1) to B(5, 4) within a left half area of the image G' having been subjected to the reduction processing are extracted as blocks missing the pixel data. On the other hand, unless the illuminance nonuniformity correction has been designated (NO in Step #50), the image processing is not performed block by block. Accordingly, Steps #52, #54 are skipped.

Subsequently, the shutter speed data calculated in Step #40 is outputted to the CCD driver 31 to start the image pickup operation (integration) by the CCD 22 (Step #56). The CCD 22 picks up an object image by storing electric charges (electric charge integration) in a photosensitive portion for a predetermined time after discharging the electric charges in the photosensitive portion in accordance with a drive control signal from the CCD driver 31.

Upon the completion of the image pickup operation by the CCD 22, the reading of the electric charges (pixel data) stored in the respective pixels of the photosensitive portion to the image processor 32 is started (Step #58). The pixel data in the CCD 22 are successively read along a direction of arrow every vertical line as shown in FIG. 33 and inputted to the image processor 32.

Figure 35A:
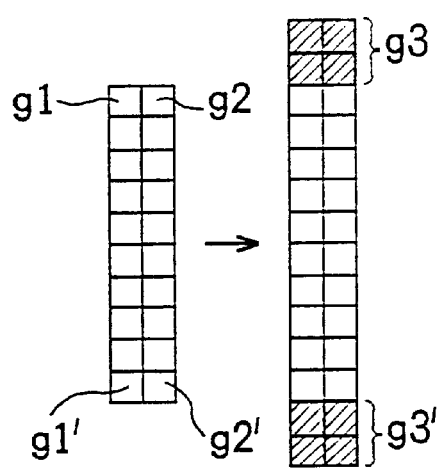
Figure 35B:
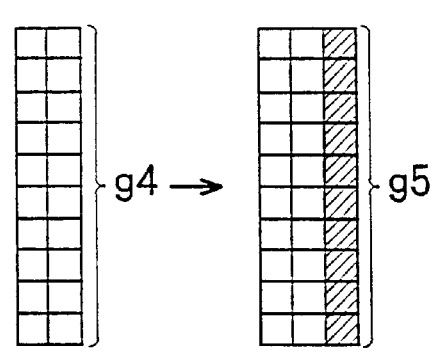

Subsequently, it is judged whether the oblique image correction mode is set (Step #60 in FIG. 30). If the oblique image correction mode is set (YES in Step #60), the oblique image correction device 321 applies the oblique image correction to the pixel data read from the CCD 22 (Step #62). The oblique image correction is performed every vertical line. In the region where the reduction processing is to be performed, there is an area where the pixel data are going to be lost. The oblique image correction is performed by filling this area with predetermined dummy data (e.g., white data). As shown in FIGS. 35A and 35B, pixel data g1, g1', g2, g2' at the opposite ends of the lines may be, for example, interpolated as dummy data g3, g3' in the pixel positions (hatched positions in FIG. 35A) where pixel data are missing along vertical direction, the entire pixel data g4 of a known line may be, for example, interpolated as dummy data g5 in the pixel positions (hatched positions in FIG. 35B) where pixel data are missing along row direction. The pixel data after the oblique image correction are stored in the image memory 323.

If the blocks missing the pixel data have been extracted in Step #54, the data effective area is calculated every block (Step #64).

It is then judged whether the illuminance nonuniformity correction has been designated (Step #66). Unless the illuminance nonuniformity correction has been designated (YES in Step #66), the first γ-characteristic setting device 324 sets the γ-characteristic for the illuminance nonuniformity correction every block in accordance with a subroutine "γ-characteristic Setting" shown in FIG. 32 (Step #68).

The γ-characteristic for the illuminance nonuniformity correction is set for each block as follows. First, a count value of a counter M for counting the block number is set at "1" (Step #110). Since the order of the blocks in the γ-characteristic setting is along raster direction in the block division shown in FIG. 20, M=L·(I−1)+J. Thus, the block B(I, J) corresponds to the block B(L·(I−1)+J).

Subsequently, all pixel data in the data effective areas included in the block B(M) are read (Step #112), and a histogram of level-frequency distribution as shown in FIG. 23 is generated using the pixel data except X % of pixel data at the high level side (Step #114). Then, the level w corresponding to the peak value of the convex portion U corresponding to the white portion of the histogram of level-frequency distribution is calculated (Step #116) and is stored as a white saturation level W(M) of the γ-characteristic for the block B(M) (Step #118).

After the count value of the counter M is incremented by "1" (Step #120), it is judged whether the count value M is larger than the total block number n (=K·L) (Step #122). If M≧n (NO in Step #122), this subroutine returns to Step #110 to set a white saturation level W(I) for a next block B(M) (Steps #112 to #120). If M>n (YES in Step #122), this subroutine returns upon the judgment that the setting of the white saturation level W(M) of the γ-characteristic has been completed for all blocks B(M).

Figure 30:
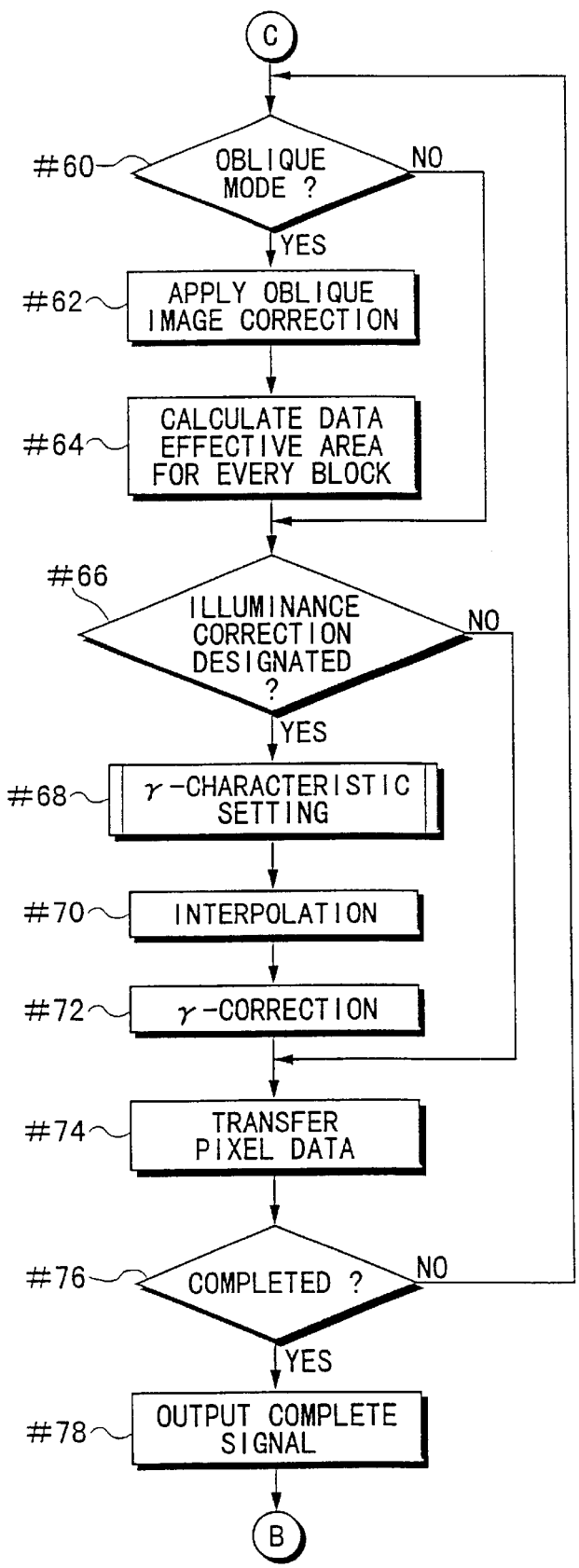

Referring back to the flowchart of FIG. 30, the white saturation level W(I) of the γ-characteristic for the illuminance nonuniformity correction set for each block B(I) is interpolated to set the γ-characteristics for the illuminance nonuniformity correction in the pixel positions except the center position of each block B(I) (Step #70). While the set γ-characteristics are inputted to the second γ-correction device 327, the pixel data are transferred from the image memory 323 to the second γ-correction device 327. After being subjected to the γ-correction using the γ-characteristic for the illuminance nonuniformity correction corresponding to the pixel position, the pixel data is subjected to the γ-correction using the γ-characteristic for the black intensification (Step #72).

On the other hand, if the illuminance nonuniformity correction has been designated in Step #66 (NO in Step #66), the pixel data are transferred from the image memory 323 to the first γ-correction device 326 and are subjected to the γ-correction using a predetermined γ-characteristic for the natural images (Step #74).

The pixel data having been subjected to the image processing such as the γ-correction are successively written in the HD card 13 (a loop of Steps #66 to #76). Upon the completion of the writing of all pixel data in the HD card 13 (YES in Step #76), a control signal representative of the completion of the reading of the pixel data is outputted to the CCD driver 31 and a control signal representative of the completion of the writing of the pixel data is outputted to the card driver 33 (Step #78). In this way, the image pickup operation of one frame of image is completed and this routine returns to Step #2 to perform the next image pickup operation.

In the first embodiment, the histogram of level-frequency distribution is generated using only the effective pixel data in the blocks including the dummy data in the illuminance nonuniformity correction for the image after the oblique image correction, and the γ-characteristics for the illuminance nonuniformity correction for these blocks are set using the white saturation levels W determined by the histogram of level-frequency distributions. However, for such blocks, instead of setting the γ-characteristics for the illuminance nonuniformity correction based on the level distribution of the pixel data included in the blocks, the γ-characteristic for the illuminance nonuniformity correction set for the neighboring blocks including no dummy data may be applied.

Figure 34B:
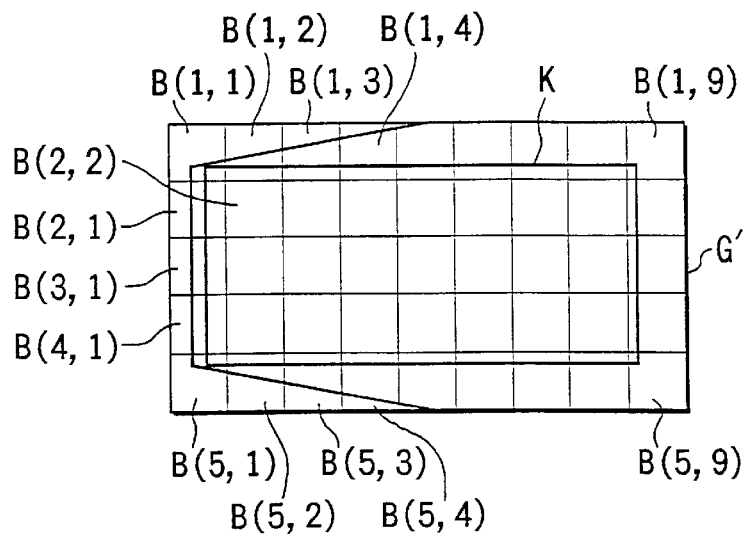

Specifically, since the dummy data is included in, for example, the blocks B(1, 1), B(1, 2), B(2, 1) in FIG. 34B, the γ-characteristic for the illuminance nonuniformity correction set for the more adjacent block B(2, 2) is applied for these blocks B(1, 1), B(1, 2), B(2, 1). Likewise, the γ-characteristic for the illuminance nonuniformity correction set for the most adjacent block B(2, 3) including no dummy data is applied for the block B(1, 3) and the γ-characteristic for the illuminance nonuniformity correction set for the most adjacent block B(3, 23) including no dummy data is applied for the block B(3, 1).

In this case, the pixel data are processed as follows in FIG. 15. Specifically, the address generator 324b divides the picked image into a plurality of blocks B(I, J) based on the block size inputted from the block size setting device 324a, extracts the blocks B(I, J) including the dummy data based on the information on the data effective areas inputted from the data effective area calculator 322, and calculates the most adjacent blocks B(I, J) including no dummy data for the respective extracted blocks B(I, J). The calculation result is inputted from the address generator 324b to the white saturation level setting device 324d as indicated by dotted line in FIG. 15.

The pixel data are read from the image memory 323 block by block for only the blocks B(I, J) including no dummy data, and the histogram of level-frequency distribution of all pixel data included in each such block is generated in the histogram generator 324c to set the white saturation level W. The white saturation level setting device 324d allocates the white saturation level W set for the corresponding most adjacent block B(I, J) to each block B(I, J) including the dummy data based on the information of the most adjacent block B(I, J) including no dummy data for the block B(I, J) including the dummy data inputted from the address generator 324b.

In the case that the area of the white portion in the data effective areas in the block is small, the convex portion U corresponding to the white portion may not be clearly shown in the histogram of level-frequency distribution of the pixel data within the data effective areas. Thus, the reliability of the white saturation level W of the γ-characteristic for the illuminance nonuniformity correction set based on this histogram of level-frequency distribution is questionable. The method for applying the γ-characteristic set for the most adjacent block including no dummy data has an advantage of solving the problem of the reliability of the γ-characteristic. Further, since the γ-characteristic of the most adjacent block is applied, there is no likelihood that a pseudo boundary line is created due to the discontinuous image quality caused by a sudden change of the γ-characteristic between the blocks.

Figure 36:
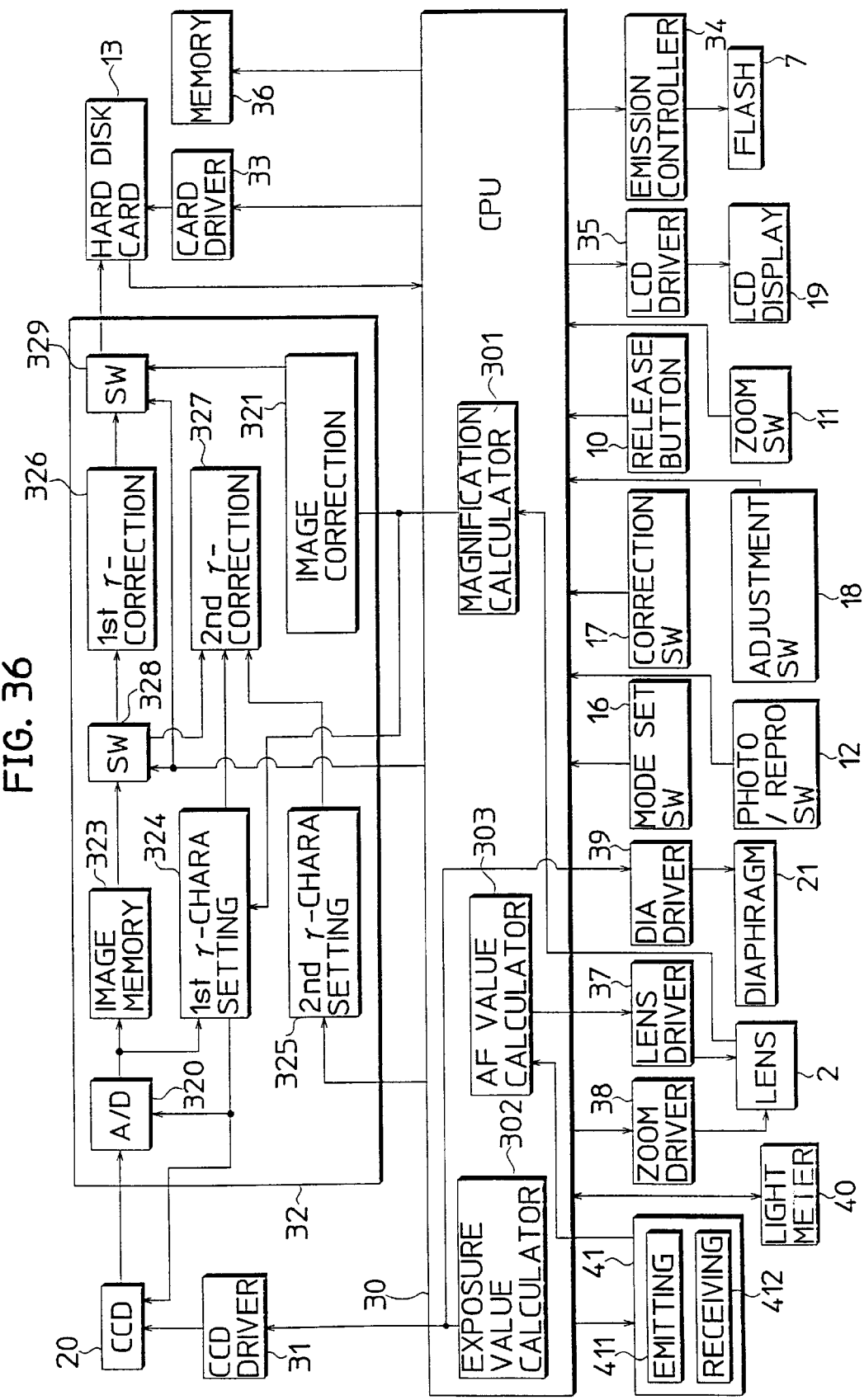
FIG. 36 is a block diagram showing a construction of an electronic camera according to a second embodiment of the invention.
Figure 37:
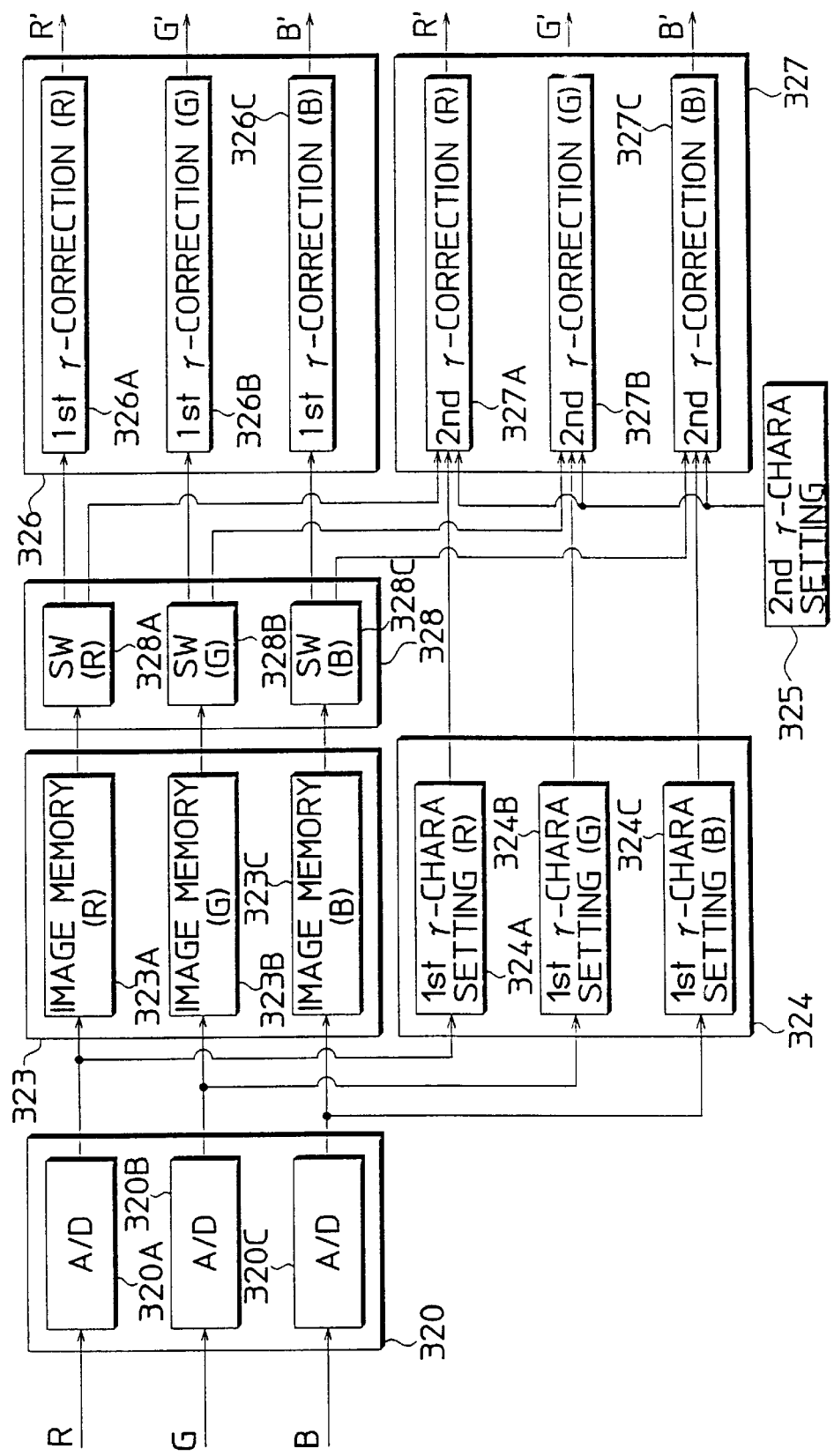
FIG. 37 is a block diagram showing an arrangement of an A/D converter to first and second γ-correction devices of the electronic camera of the second embodiment.
Figure 38:
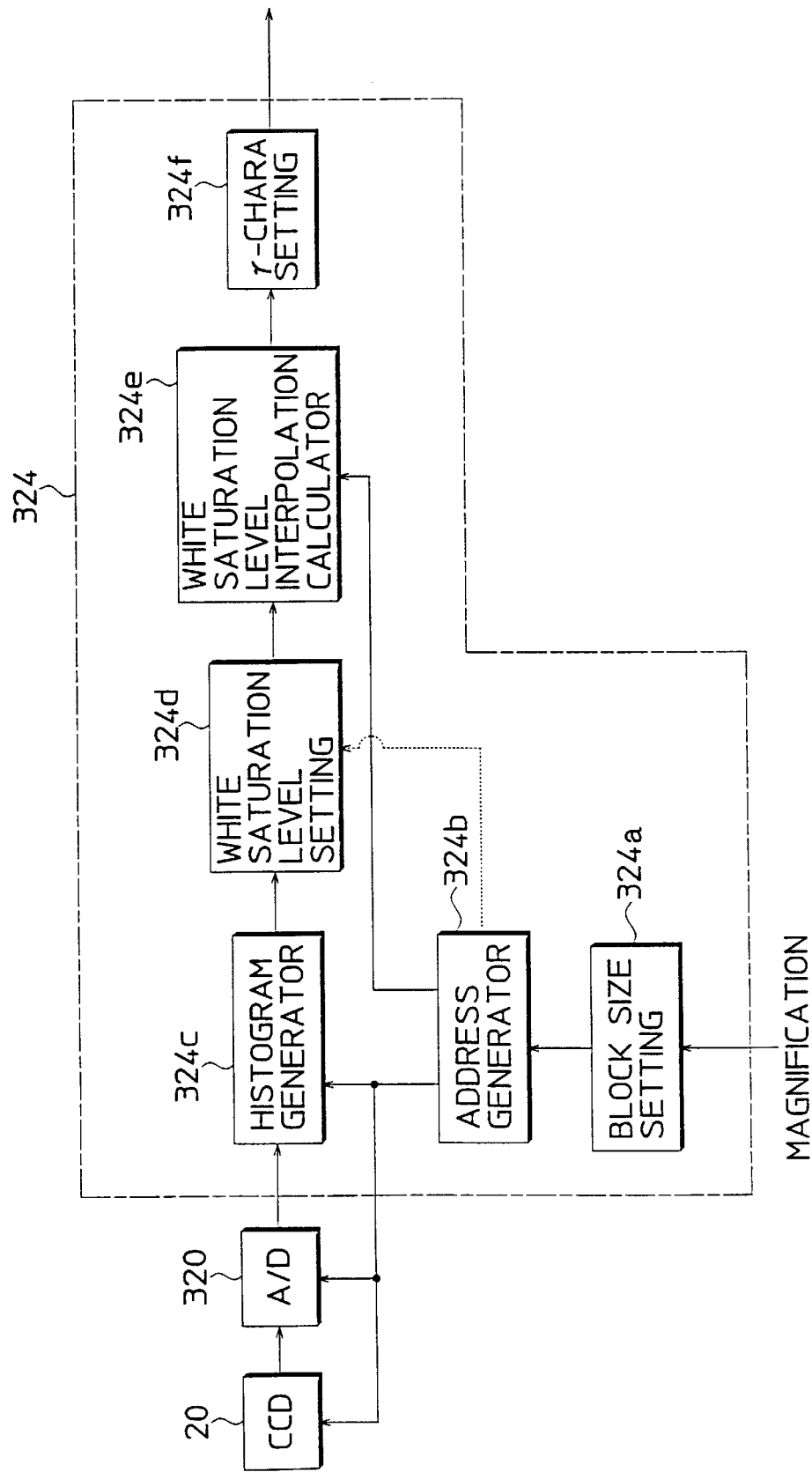
FIG. 38 is a block diagram showing an internal construction of a first γ-characteristic setting device of the electronic camera according to the second embodiment.

FIG. 36 is a block construction diagram of an electronic camera 1 according to a second embodiment, FIG. 37 is a detailed block diagram of the construction for applying an image processing to a color image from the A/D convert 320 to the first and second γ-correction devices 326, 327, and FIG. 38 is a block diagram showing the internal construction of the first γ-characteristic setting device 324 according to the second embodiment.

The electronic camera 1 according to the second embodiment is constructed such that the oblique image correction is performed after the illuminance nonuniformity correction is performed. In other words, the processing order of the illuminance nonuniformity correction and the oblique image correction is opposite from that of the electronic camera 1 according to the first embodiment.

The methods according to the second embodiment for performing the illuminance nonuniformity correction and the oblique image correction are basically identical to those described in the first embodiment. Accordingly, description is supplementarily given on processings which are differed by reversing the processing order of the illuminance nonuniformity correction and the oblique image correction.

The block construction diagram of FIG. 36 differs from that of FIG. 13 only in the internal construction of an image processor 32. Specifically, the image processor 32 shown in FIG. 36 differs from that shown in FIG. 13 in that the data effective area calculator 322 is deleted, the oblique image correction device 321 provided between the A/D converter 320 and the image memory 323 is provided after the second γ-correction device 327, and a switch circuit 329 is added after the first and second γ-correction devices 326, 327.

In FIG. 36, the switch circuit 328 switches the connection of the image memory 323 with the first and second γ-correction devices 326, 327, and the switch circuit 329 switches the connection of the first γ-correction device 326 and the oblique image correction device 321 with the HD card 13. The switching of the switch circuits 328, 329 is controlled in accordance with a control signal outputted from the CPU 30 in conformity with the set state of the illuminance nonuniformity correction switch 17. If the illuminance nonuniformity correction switch 17 is set "OFF" (if the natural image mode is set), the image memory 323 and the first γ-correction device 326 are connected and the first γ-correction device 326 and the HD card 13 are connected. If the illuminance nonuniformity correction switch 17 is set "ON" (if the character image mode is set), the image memory 323 and the second γ-correction device 327 are connected and the oblique image correction device 321 and the HD card 13 are connected.

Figure 39A:
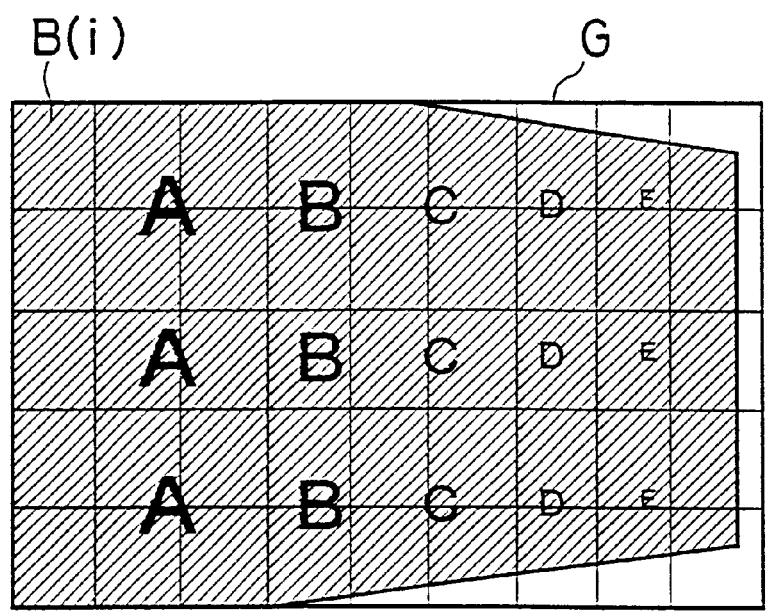
Figure 39B:
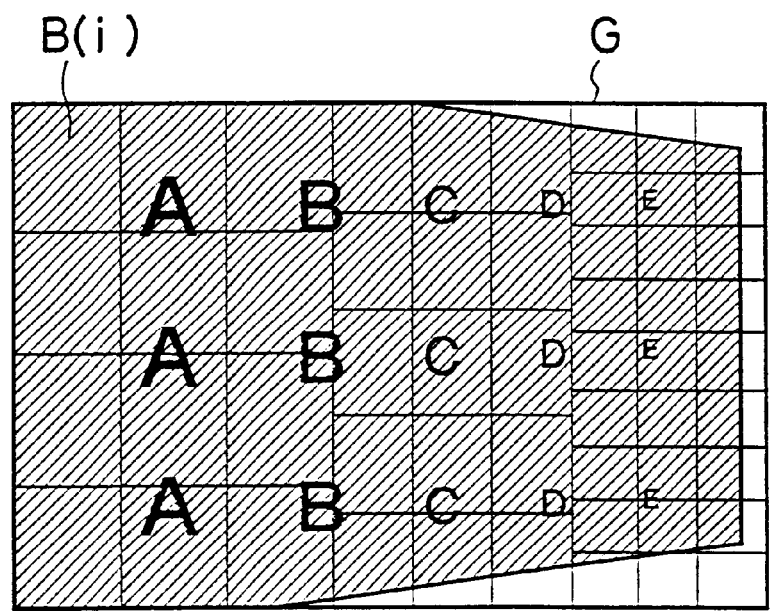

In the above construction, the illuminance nonuniformity correcting method in the usual image capturing mode is same as the one described above with reference to FIGS. 19 to 21. However, in the oblique image correction mode, the block size in the illuminance nonuniformity correction is changed within a field as shown in FIG. 39B since the oblique image correction is performed after the illuminance nonuniformity correction is performed. In the oblique image capturing, the image capturing magnification mi differs within the field. As shown in FIG. 39A, the character size is small in positions where the image capturing magnification mi is small while being large in positions where the image capturing magnification mi is large. Accordingly, if the field is divided by blocks of the same size, the number of characters included in the blocks changes and, therefore, all blocks cannot be set in proper size. Thus, the size of the respective blocks is determined according the image capturing magnification mi in the oblique image correction mode.

Specifically, the proper size S of the block is calculated from the image capturing magnification m in the center of the field according to the aforementioned method, and the size Si of the block in a position other than the center of the field is calculated based on the proper size S, the image capturing magnification mi (or mi') in this position calculated from the angle of inclination θ, the angle of view α (or β) and the image capturing magnification m in the center of the field in accordance with Equations (1) and (2): Si=S·mi/m. Since the image capturing magnification varies only along row direction in an example of FIG. 39B, the block size is changed along horizontal direction. Further, in FIG. 39B, the field is divided into three areas: a central area, a left area and a right area, and a block size in conformity with the image capturing magnification is set for each area. This division is only an example, and the field may be divided into four or more areas in the case where the angle of inclination θ is considerably large. Although a case where the sensing surface is not inclined with respect to the object surface along vertical direction is described in this embodiment, the block size is changed also according to the image capturing magnification along vertical direction in the case that the sensing surface is inclined along vertical direction.

The block construction diagram of FIG. 37 differs from that of FIG. 14 in that the data effective area calculator 323 is deleted and the oblique image correction device 321 is replaced by the A/D converter 320.

In FIG. 37, the image memory 323, the first γ-characteristic setting device 324, the first and second γ-correction devices 326, 327 and the switch circuit 328 are each provided with three processing circuits of identical construction so as to correspond to the pixel data of the respective color components R, G, B.

For example, the pixel signal of R is temporarily stored in the image memory 323A after being A/D converted into an image data in the A/D converter 320A. In the natural image mode, the pixel data of R stored in the image memory 323A is transferred to the first γ-correction device 326A via the switch circuit 328, and γ-correction is applied thereto using a specified γ-characteristic for the natural images.

On the other hand, in the character image mode, a γ-characteristic for the illuminance nonuniformity correction is set every block by the first γ-characteristic setting device 324A based on the histogram of level-frequency distribution of the pixel data of R included in each block, and a γ-characteristic is set by the second γ-characteristic setting device 325 based on the adjustment value of the black density adjustment switch 18. The pixel data of R stored in the image memory 323A is transferred to the second γ-correction device 327A via the switch circuit 328, and γ-correction is applied thereto every block using the γ-characteristic for the black density adjustment after γ-correction is applied using the γ-characteristic for the illuminance nonuniformity correction.

The pixel signals of G and B are processed in the similar manner as the pixel signal of R.

The block construction diagram of FIG. 38 differs from that of FIG. 15 in that the data effective area calculator 323 is deleted and the image memory 323 is replaced by the CCD 22 and the A/D converter 320.

In FIG. 38, the histogram generator 324c to the γ-characteristic setting device 324f perform the same operation as those shown in FIG. 15. The block size setting device 324a is adapted to set the sizes of the blocks B(I, J) for dividing the picked image into small images. In the usual image capturing mode, the block size setting device 324a sets the block size S based on the image capturing magnification m in the center of the field, the preset reference size S0 and the reference image capturing magnification m0 which are inputted from the CPU 30 in order to divide the picked image into blocks of the same size. In the oblique image correction mode, the block size setting device 324a sets the block size S in the center of the field and the block sizes Si in positions other than the center of the field based on the image capturing magnifications mi (or mi') other than the center of the field, the image capturing magnification m in the center of the field and the block size S in order to divide the picked image into blocks of different sizes.

The address generator 324b generates the addresses of the pixel data included in each block B(I, J) in accordance with the block size S (or Si) set by the block size setting device 324a. This address data are used for the reading of the pixel signals from the CCD 22 and for the A/D conversion in the A/D converter 320 as well as for the interpolation calculation in the white saturation level interpolation calculator 324e.

Next, an image capturing control of the electronic camera 1 according to the second embodiment is described with reference to flowcharts of FIGS. 40 to 43.

Figure 41:
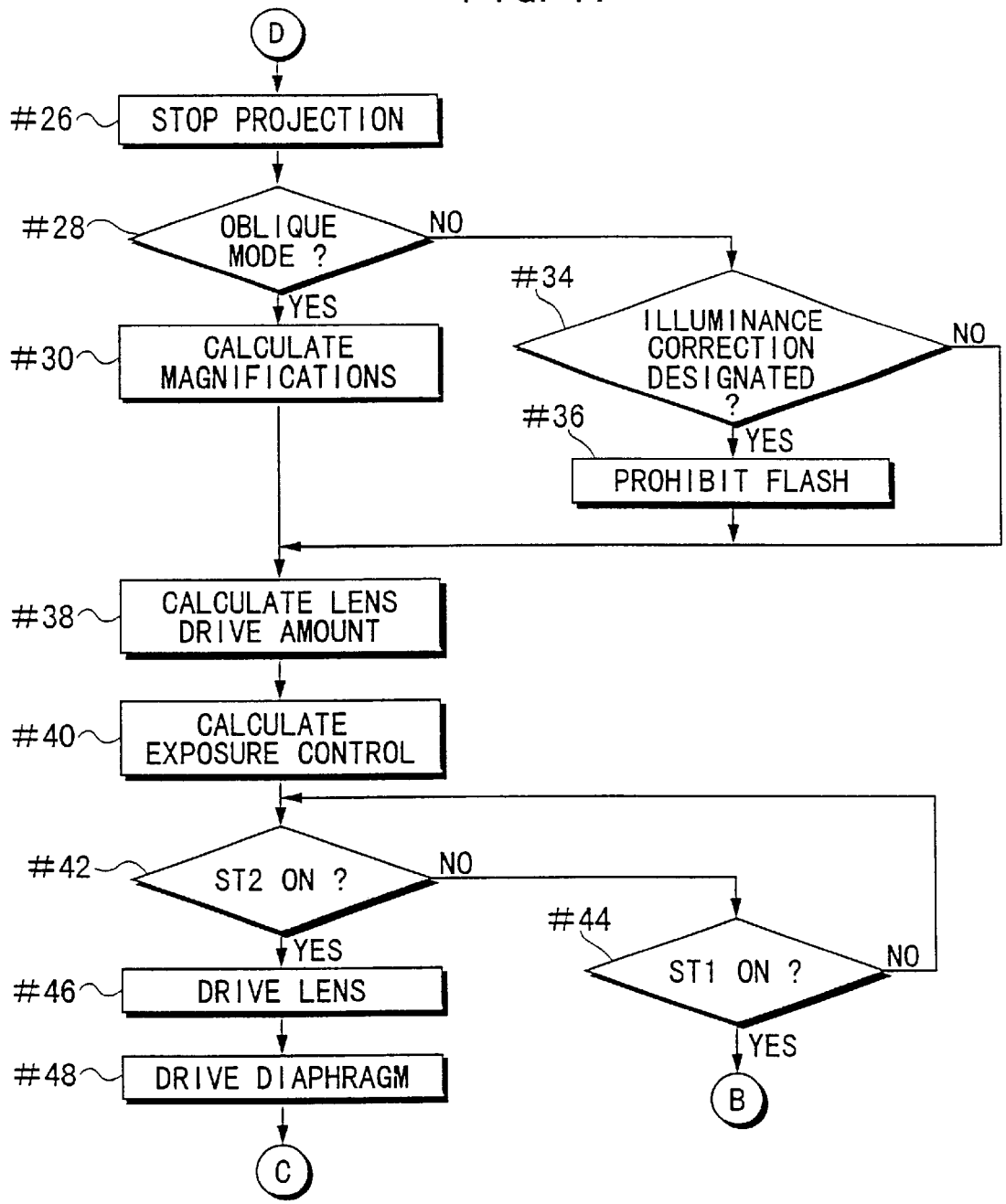
Figure 42:
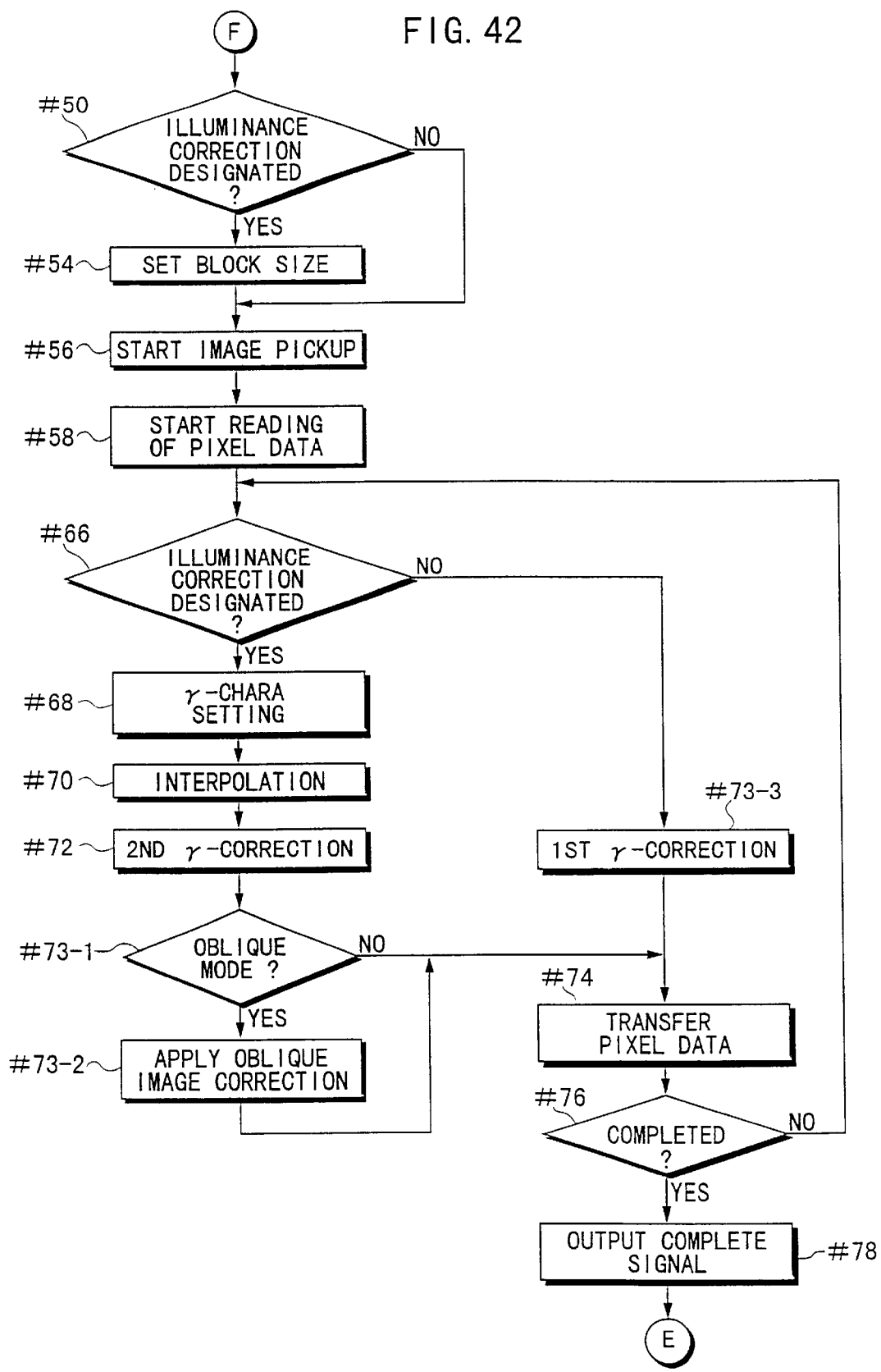

FIGS. 40 to 42 are a main routine of the image capturing control. The image capturing procedure of the electronic camera 1 of the second embodiment is mostly common to that of the electronic camera 1 of the first embodiment. Specifically, the flowchart shown in FIGS. 40 to 42 differ from that of FIGS. 28 to 30 in that Steps #32, #54 are deleted and a processing of Steps #73-1 to 73-3 is inserted between Steps #72 and #74 instead of Steps #60 to #64.

The processing of Step #32 is deleted because it concerns the data effective area calculator 322 which is not provided in the second embodiment. The processing of Step #54 is deleted because it concerns the oblique image correction and is, accordingly, not necessary before the illuminance nonuniformity correction in the second embodiment in which the oblique image correction is performed after the illuminance nonuniformity correction. The addition of Steps #73-1 to #73-3 instead of Steps #60 to #64 is made to perform the oblique image correction after the illuminance nonuniformity correction.

Figure 43:
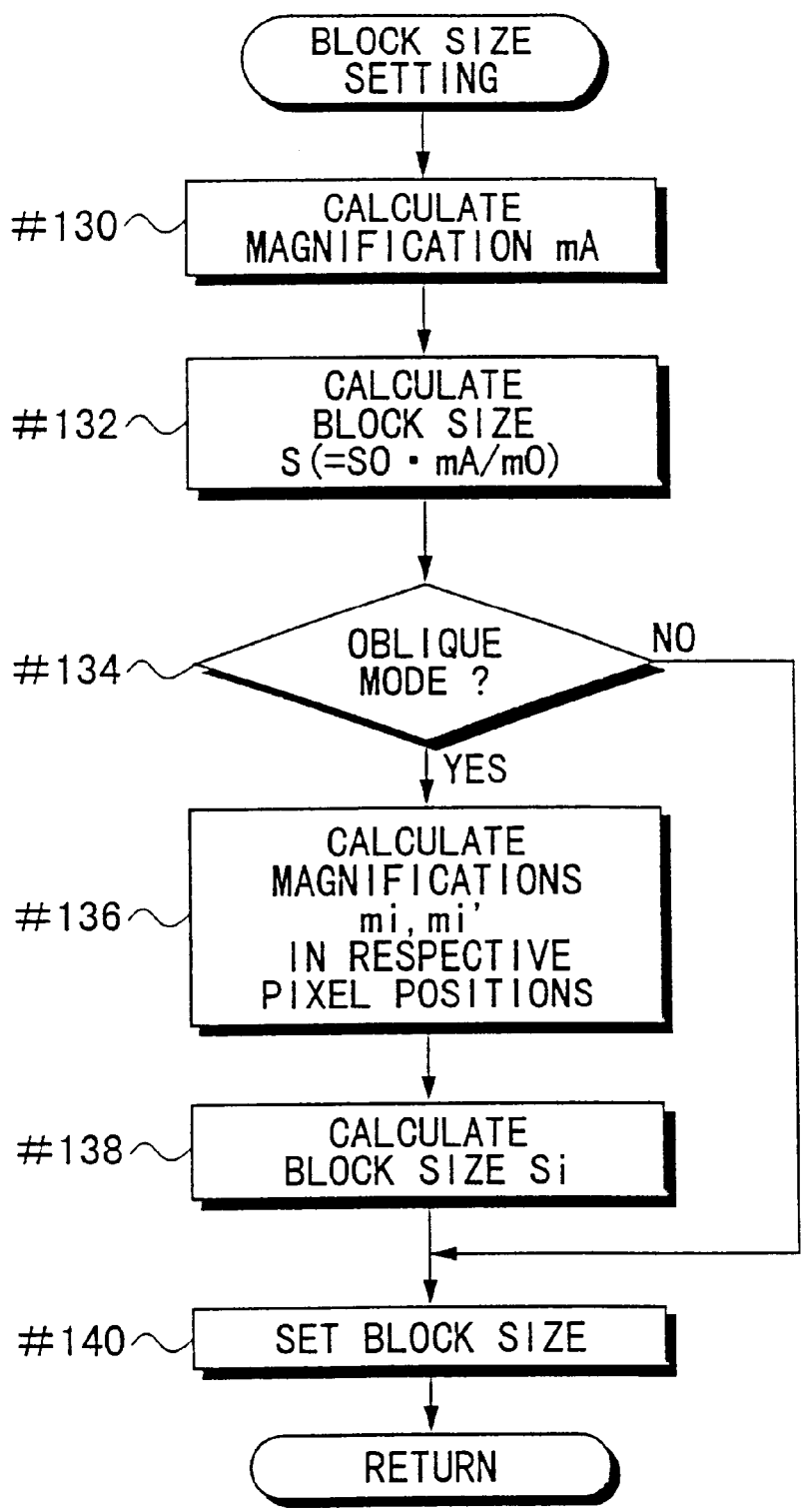
FIG. 43 is a flowchart showing a subroutine "Block Size Setting"
Figure 46:
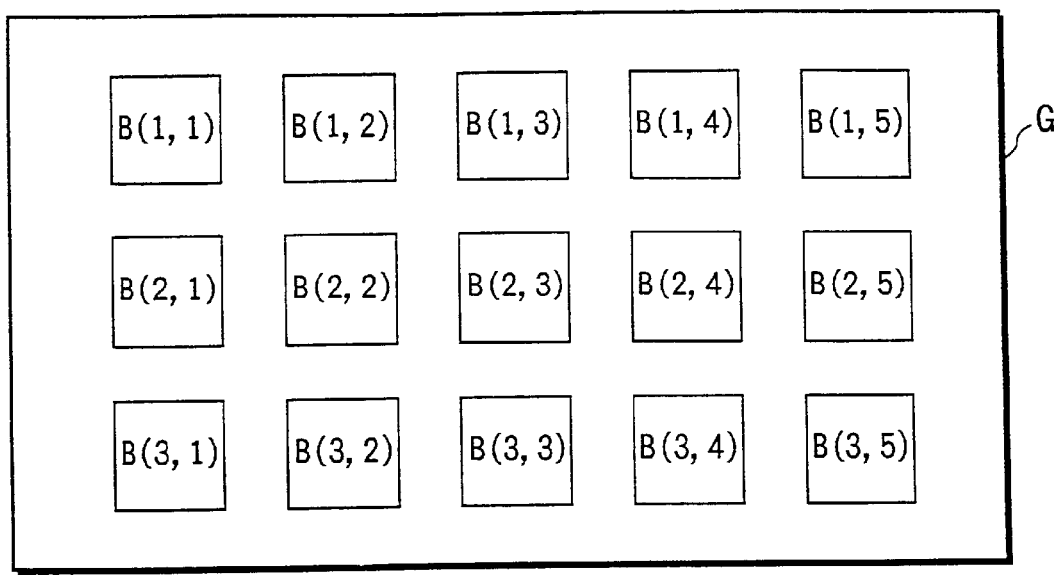
FIG. 46 is a diagram showing another method for dividing a picked image by blocks to perform the illuminance nonuniformity correction.

FIG. 43 is a flowchart showing a subroutine "Block Size Setting" executed in Step #52. Since the block size changes according to the image capturing magnification within the field in the second embodiment, this processing is added.

Figure 28:
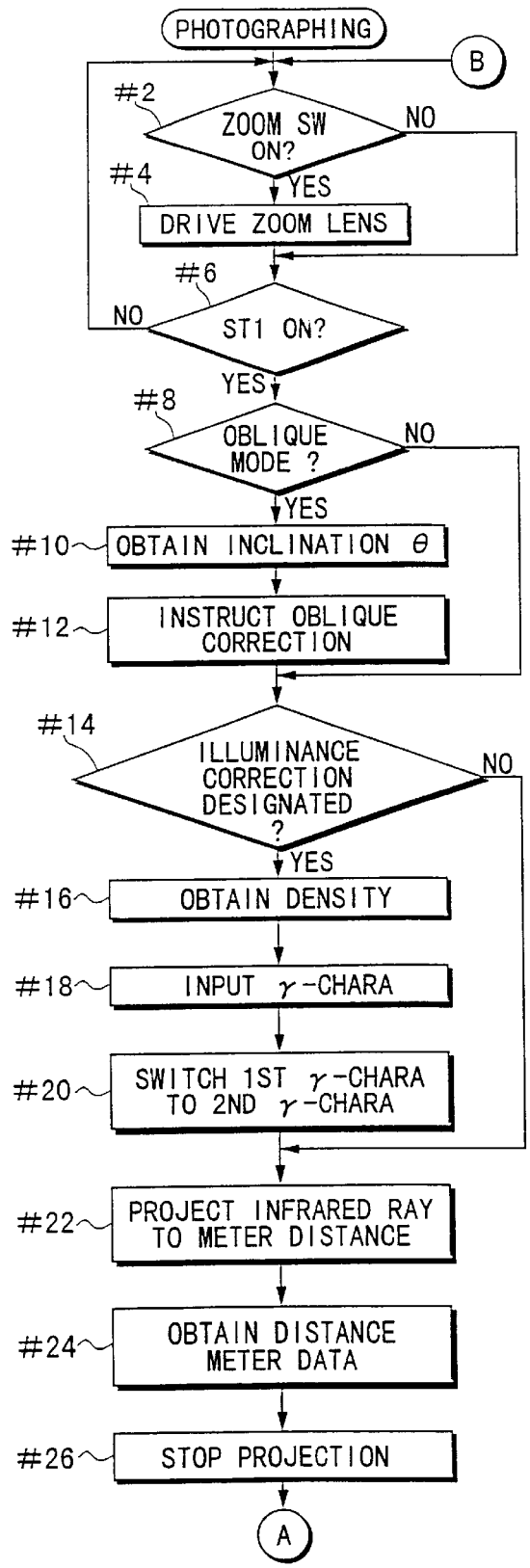
FIGS. 28 to 30 are flowcharts showing an image capturing control of the electronic camera according to the first embodiment.

The flowcharts shown in FIGS. 40 to 42 are a modification to the flowcharts shown in FIGS. 28 and 30 as described above, and a substantially amended part is Step #52 and Step #58 and subsequent steps. Accordingly, description is centered on the content concerning the amended part here.

After the electronic camera 1 is activated (a loop of Steps #2 to #6), the shutter release button 10 is partly pressed to turn the ST1 switch on (YES in Step #6). Then, a processing for the image capturing preparation is performed in Steps #8 to #40.

In this image capturing preparation processing, after the setting of the oblique image correction mode and preparation according to whether or not the illuminance nonuniformity correction is to be performed (reading of the angle of inclination θ, calculation of the distribution of image capturing magnifications, reading of the density information, switch of the γ-correction device of the image processor 32), the exposure control values and AF control value are calculated. In the processing of Step #20 for switching the γ-correction device, the switch circuits 328, 329 switch the signal processing from the one performed by the first γ-correction device 326 to the one performed by the second γ-correction device 327 and the oblique image correction device 321. Since the oblique image correction is not performed before the illuminance nonuniformity correction, the data effective area calculation for the illuminance nonuniformity correction is not performed.

When the shutter release button 10 is fully pressed to turn the ST2 switch on after the image capturing preparation processing is completed and the camera 1 waits on standby for an exposure operation (a loop of Steps #2 to #44), this routine proceeds to Step #46 to perform the exposure operation.

Upon starting the exposure operation, a data on the lens drive amount is outputted to the lens driver 37 and the taking lens 2 is driven to attain an in-focus condition (Step #46). Thereafter, the aperture value data Av of the exposure control values is outputted to the diaphragm driver 39 to adjust the aperture of the diaphragm 21.

Subsequently, it is judged whether the illuminance nonuniformity correction has been designated (Step #50 in FIG. 42). If the illuminance nonuniformity correction has been designated (YES in Step #50), the sizes of a plurality of blocks for dividing the image are set in accordance with the subroutine "Block Size Setting" shown in FIG. 43 (Step #52).

The block size is set as follows. First, the image capturing magnification $m_A$ in the center position of the field is calculated based on the focal length f and the object distance $D_A$ measured for the center of the field (Step #130). Subsequently, the block size S (=$S0 \cdot m_A/m0$) for the center position of the field is calculated based on the image capturing magnification $m_A$, the reference image capturing magnification m0 and the block size S0 (Step #132).

Subsequently, it is judged whether the oblique image correction mode is set (Step #134). Unless the oblique image correction mode is set (NO in Step #134), the block size of the center of the field calculated in Step #132 is set as a block size for regularly dividing the picked image by the blocks (Step #140) and this subroutine returns.

On the other hand, if the oblique image correction mode is set (YES in Step #134), the image capturing magnifications mi, mi' in the respective pixel positions (i.e., distribution of image capturing magnifications within the field) are calculated based on the image capturing magnification $m_A$ calculated in Step #130, the angle of inclination θ set by the mode setting switch 16 and the angles of view αi, βi in the respective pixel positions calculated in Step #30 in accordance with Equations (1) and (2) (Step #136). Subsequently, the block sizes Si for the illuminance nonuniformity correction in the respective pixel positions are calculated based on the distribution of image capturing magnifications and the block size S in the center of the field (Step #138). The block sizes for dividing the field by the blocks of sizes which differ according to the image capturing magnification are set based on the above calculation result (Step #140) and this subroutine returns.

Upon the completion of the setting of the block sizes, the data on the shutter speed calculated in Step #40 is outputted to the CCD driver 31 to start the image pickup operation (integration) by the CCD 22 (Step #56). After resetting the electric charges in the photosensitive portion in accordance with a drive control signal from the CCD driver 31, the CCD 22 picks up an object image by storing electric charges (electric charge integration) in the photosensitive portion for a predetermined time.

Upon the completion of the image pickup operation by the CCD 22, the reading of the electric charges stored in the respective pixels of the photosensitive portion (pixel data) to the image processor 32 is started (Step #58). The pixel data of the CCD 22 are successively read in arrow direction every vertical line and inputted to the image processor 32. After being converted into pixel data in the A/D converter 320, the pixel signals inputted to the image processor 32 are stored in the image memory 323 and inputted to the first γ-characteristic setting device 324.

It is then judged whether the illuminance nonuniformity correction has been designated (Step #66). If the illuminance nonuniformity correction has been designated (YES in Step #66), the first γ-characteristic setting device 324 sets a γ-characteristic for the illuminance nonuniformity correction block after block in accordance with the subroutine "γ-Characteristic Setting" shown in FIG. 32 (Step #68). Since this γ-characteristic setting is same as the aforementioned one, no description is given here.

Subsequently, the white saturation level W(I) of the γ-characteristic for the illuminance nonuniformity correction set for each block B(I) is interpolated, and γ-characteristics for the illuminance nonuniformity correction in the pixel positions of each block B(I) other than the center position thereof are set (Step #70). While the set γ-characteristics are inputted to the second γ-correction device 327, the pixel data are transferred from the image memory 323 to the second γ-correction device 327 via the switch circuit 328. After γ-correction is applied to the pixel data using the γ-characteristics for the illuminance nonuniformity correction corresponding to the respective pixel positions, γ-correction is further applied using the γ-characteristics for the black intensification.

It is then judged whether the oblique image correction mode is set (Step #73-1). If the oblique image mode is set (YES in Step #73-1), the oblique image correction is applied to the pixel data outputted from the second γ-correction device 327 by the oblique image correction device 321 (Step #73-2). The oblique image correction is performed every vertical line. In an area where the reduction processing is to be performed, the oblique image correction is performed by filling a pixel data missing area with the preset dummy data (e.g., white data).

On the other hand, if the natural image mode is set in Step #66 (NO in Step #66), the pixel data are transferred from the image memory 323 to the first γ-correction device 326 via the switch circuit 328, and γ-correction is applied thereto using the preset γ-characteristic for the natural images (Step #73-3). The pixel data after the γ-correction is written in the HD card 13 via the switch circuit 329 (Step #74).

The pixel data having been subjected to the oblique image correction in the character image mode or those having been subjected to the γ-correction in the natural image mode are successively written in the HD card 13 via the switch circuit 328 (a loop of Steps #66 to #76). Upon the completion of the writing of all pixel data in the HD card 13 (YES in Step #76), a control signal indicative of the completion of the reading of the pixel data is outputted to the CCD driver 31 and a control signal indicative of the completion of the writing of the pixel data is outputted to the card driver 33 (Step #78). In this way, the image pickup operation of one frame of image is completed and this routine returns to Step #2 to perform a next image pickup operation.

Since the oblique image correction is performed after the illuminance nonuniformity correction in the second embodiment, processings such as the one to generate a histogram of level-frequency distribution by deleting the dummy data are not necessary unlike the first embodiment. Accordingly, the second embodiment has an advantage of securely performing the suitable illuminance nonuniformity correction without complicating the processings.

In the first and second embodiments, histogram of level-frequency distributions are generated for all set blocks B(I, J) and the white saturation levels W of the γ characteristics for the illuminance nonuniformity correction are set based on these histogram of level-frequency distributions. However, in the case that illuminance is relatively uniform along vertical direction, but considerably varying only along horizontal direction, the histogram of level-frequency distributions may be generated only for a row of blocks B(3, 1), B(3, 2), ... B(3, 9) located in the middle of the picked image G as shown in FIG. 44 and the white saturation levels W of the γ-characteristics may be set based on these histogram of level-frequency distributions. For the other blocks B(I, J) (I=1, 2, 4, 5, J=1, 2, ... 9), the γ-characteristics set for the block B(3, r) in the columns including these blocks may be used. For example, the γ-characteristic set for the block B(3, 1) is used for the blocks B(1, 1), B(2, 1), B(4, 1), B(5, 1) in the first column.

Conversely, in the case that illuminance is relatively uniform along horizontal direction, but considerably varying only along vertical direction, the histogram of level-frequency distributions may be generated only for a column of blocks B(1, 5), B(2, 5), ... B(5, 5) located in the middle of the picked image G as shown in FIG. 45 and the white saturation levels W of the γ-characteristics may be set based on these histogram of level-frequency distributions. For the other blocks B(I, J) (I=1, 2, ... 5, J=1 to 4, 6 to 9), the γ-characteristics set for the block B(r, 5) in the rows including these blocks may be used. For example, the γ-characteristic set for the block B(1, 5) is used for the blocks B(1, 1), B(1, 2), B(1, 3), B(1, 4), B(1, 6), B(1, 7), B(1, 8), B(1, 9) in the first row. By doing so, the calculation time for γ-characteristics can be shortened and the capacity of the memory for storing the set γ-characteristics can be reduced.

Although the entire picked image G is divided in columns and rows into a matrix form, thereby continuously setting the blocks B(I, J) in the foregoing embodiments, a plurality of blocks B(I, J) may be discretely set in the picked image G. By doing so, the number of the blocks can be reduced. Therefore, similar to the above example, the calculation time for γ-characteristics can be shortened and the capacity of the memory for storing the set γ-characteristics can be reduced.

In the first and second embodiments, the case where the image distortion correcting function of correcting a perspective geometric distortion in oblique image capturing and the illuminance nonuniformity correcting function are combined is described. However, the present invention is not limited to the above case, but may be applicable to a case where an image distortion correcting function of correction a geometric distortion caused by the optical characteristic of the optical image pickup system and a geometric distortion caused by the characteristic of the signal processing system and the illuminance nonuniformity correcting function are combined.

As described above, according to the method for dividing the picked image into blocks and detecting the level of the base portion (white portion) of each block based on the histogram of level-frequency distribution of the pixel data included in each block, if the white portion (e.g., a background portion such as a white wall standing behind the white board 20) except the white board portion is included in the block, the histogram of level-frequency distribution is not a typical two-peak distribution as shown in FIG. 19. Accordingly, it is difficult to accurately detect the white level of the white board 20.

Thus, if the illuminance nonuniformity correction is performed in the case of, e.g., monochromatic image capturing, the white board portion turns blackish particularly in the blocks including the white board portion and the background portion. Such a false coloring phenomenon occurs because the white saturation level set by the histogram of level-frequency distribution is improper.

Figure 47:
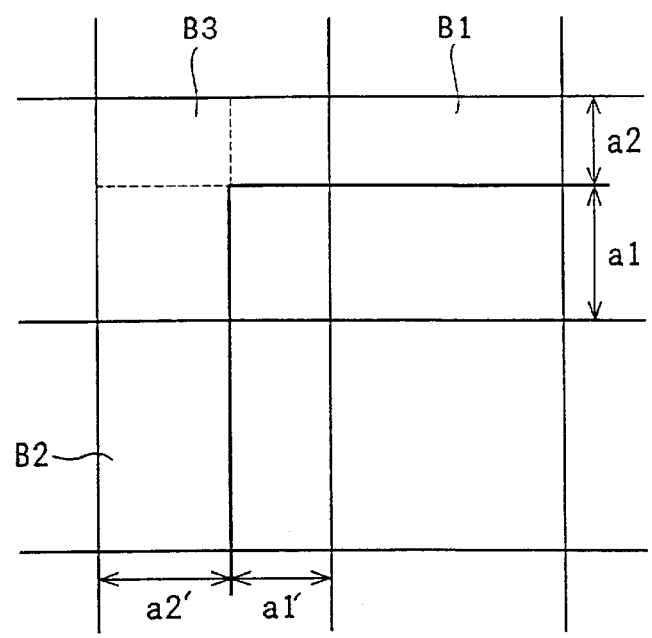
FIG. 47 is a diagram showing blocks including a boundary line between a white board image and a background image.
Figure 48:
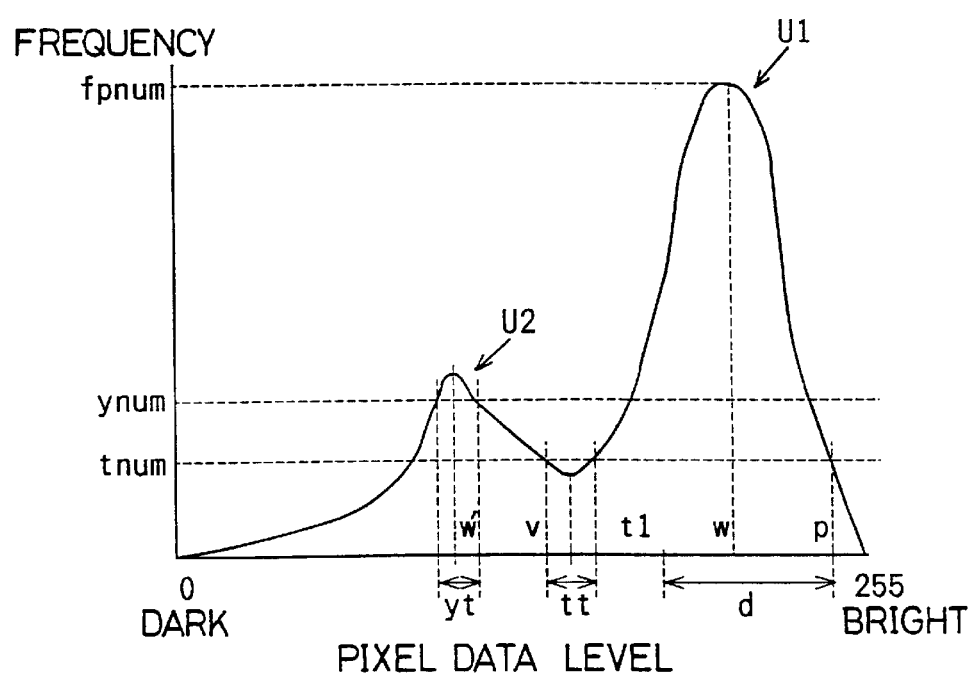
FIG. 48 is a graph showing an exemplary histogram of level-frequency distribution generated for the block including the white board image and the background image.

Specifically, in the blocks including the white board portion and the background portion as shown in FIG. 47, the histogram of level-frequency distribution of the pixel data has two convex portions U1, U2 in gray to white areas in correspondence with the white board portion and the background portion as shown in FIG. 48. Since the histogram of level-frequency distribution of FIG. 48 is for the block at the periphery of the white board 20 where no characters are drawn, the convex portion C corresponding to the character portion shown in FIG. 19 is not seen there.

For example, if the brightness of the background portion is higher than that of the white board portion as in the case where the white board 20 is placed before a white wall having high index of reflection, the convex portion U1 corresponds to the background portion and the convex portion U2 corresponds to the white board portion. Accordingly, if the γ-correction is performed using the γ-characteristic set using the level w corresponding to the peak value of the convex portion U1 as the white saturation level W, a part of the background portion above the white saturation level W is uniformly converted into a specific white portion, whereas a part of the white board portion below the white saturation level W is a gray area and is converted into a specific gray portion.

Thus, if the γ-correction is performed using the γ-characteristic for the black intensification thereafter, a portion of the white board portion below the black saturation level B is converted into black and turns to be a black portion in the white board portion.

Figure 49A:
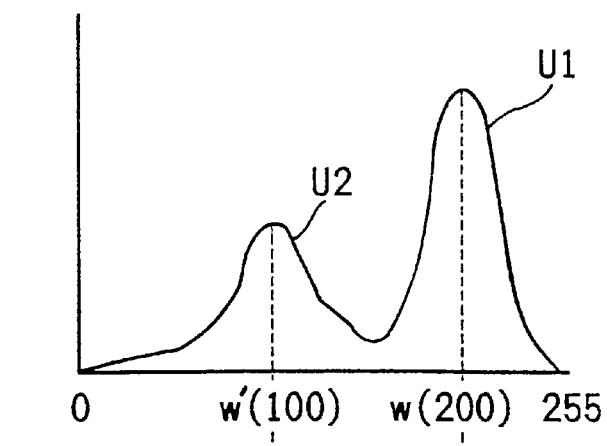
Figure 49B:
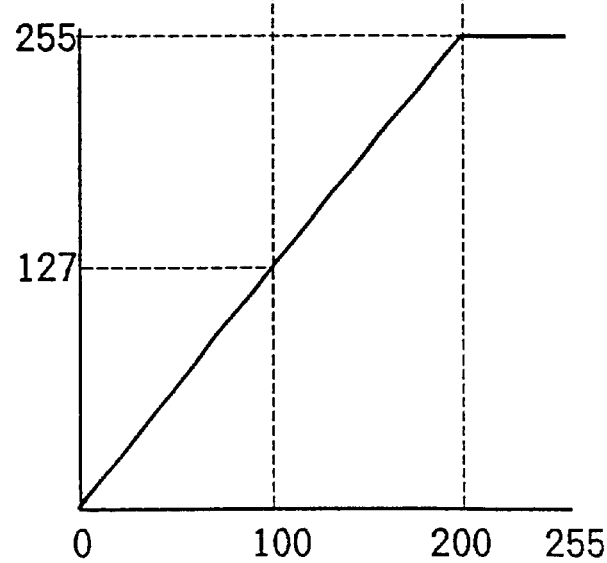
Figure 49C:
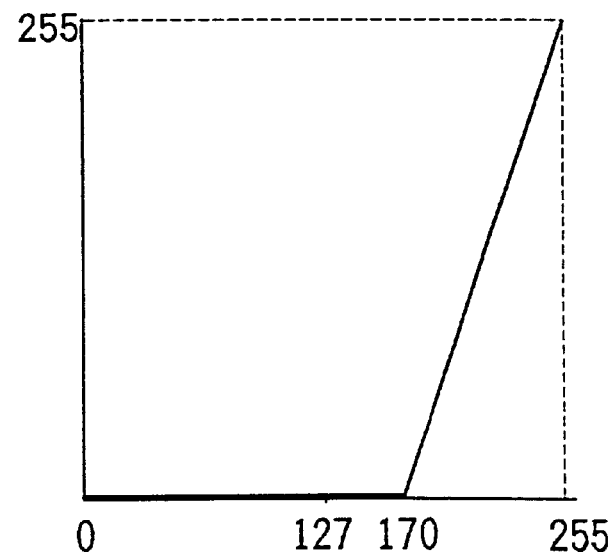

FIGS. 49A to 49C are graphs for explaining why black coloring occurs due to the aforementioned γ-correction for the black intensification and γ-correction for the illuminance nonuniformity correction, wherein FIG. 49A shows a histogram of level-frequency distribution, FIG. 49B shows a γ-characteristic for the illuminance nonuniformity correction set based on the histogram of level-frequency distribution, and FIG. 49C shows a γ-characteristic for the black intensification.

The white saturation level W of the γ-characteristic shown in FIG. 49B is set at a level w (=200) corresponding to the peak value of a convex portion U1 corresponding to the background portion of the histogram of level-frequency distribution shown in FIG. 49A. Accordingly, if a level w' corresponding to the peak value of a convex portion U2 corresponding to the white board portion is assumed as a white level representing the white board portion, the white board portion having the level value "100" is converted into a level value "127" by the γ-characteristic shown in FIG. 49 after the γ-correction. Thereafter, when the γ-correction is performed using the γ-characteristic for the black intensification in which the black saturation level B is set at "170", a part of the white board portion below the black saturation level B is converted into a level value "0", i.e., converted into a black color.

Figure 50A:
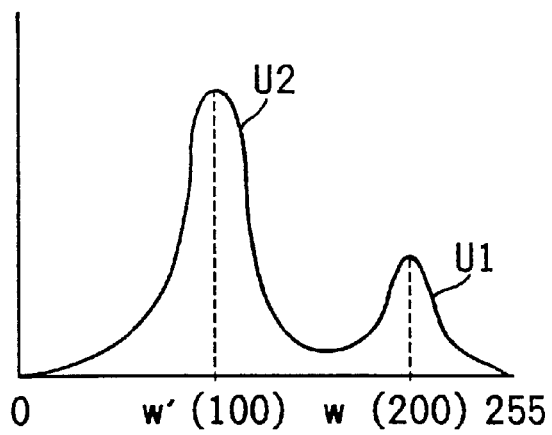
FIG. 50A shows a histogram of level-frequency distribution.
Figure 50B:
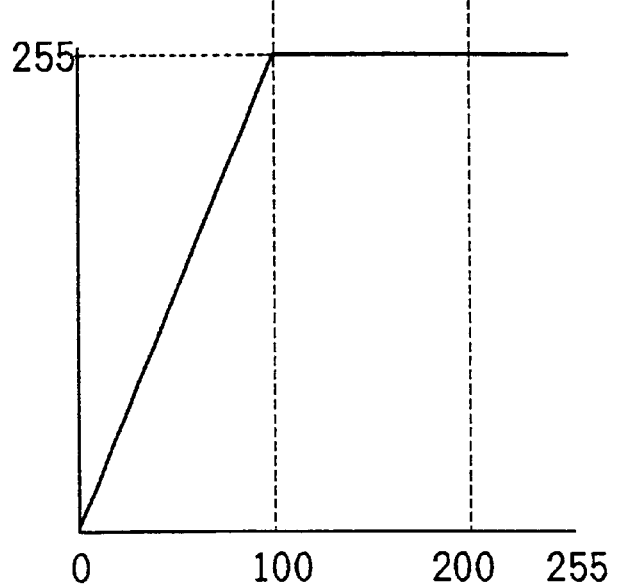
FIG. 50B shows a γ-characteristic for the illuminance nonuniformity correction and FIG. 50C shows a γ-characteristic for the black intensification.

On the other hand, in the case that the level of the white board portion is lower than that of the background portion as shown in FIG. 50A and the area of the white board portion in the block is larger than that of the background portion, and a level w' (=100) corresponding to the peak value of a convex portion U2 corresponding to the white board portion is set as the white saturation level W as shown in FIG. 50B, even if the black intensification is performed using the same γ-characteristic as the one of FIG. 49C, the level value of the white board portion converted into "255" by the γ-characteristic for the illuminance nonuniformity correction is kept "255" without being converted to "0". Thus, the white board portion can be properly made white.

In color image capturing, the γ-characteristic is set for the illuminance nonuniformity correction for each of the color components R, G, B. If the white saturation level is determined by the level of the background portion in the setting of the γ-characteristic of any of the color components, false coloring occurs in the white board portion after the γ-corrections for the illuminance nonuniformity correction and the black intensification.

Figure 50C:
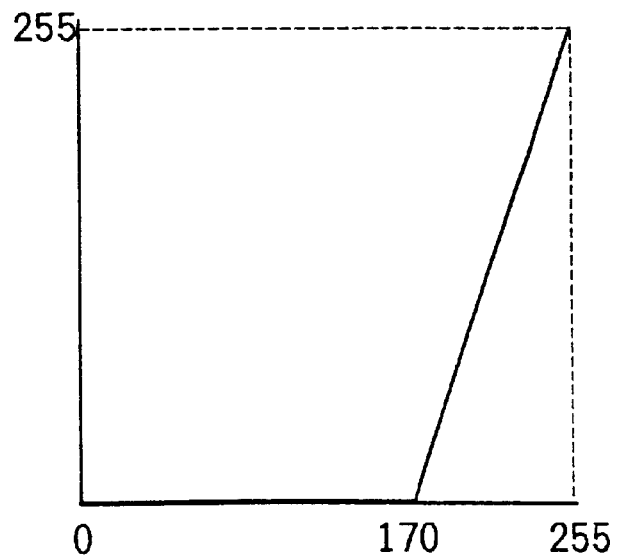

Let it be assumed that $W_R$, $W_G$, $W_B$ denote the white saturation levels of the γ-characteristics of the color components R, G, B, respectively. If the white saturation level $W_R$ is set as in the example of FIG. 50 and the white saturation levels $W_G$, $W_B$ are set as in the example of FIG. 49, the red components of the white board portion DR is converted to 255 as described in the example of FIG. 50 and the green and blue components $D_G$, $D_B$ thereof are converted to 0 as described in the example of FIG. 49 when the γ-correction is applied to the white board portion where, for example, the color components $D_R$, $D_G$, $D_B$ are: $D_R=200$, $D_G=D_B=100$. Accordingly, the white board portion is colored in red.

In the case of color-image capturing the white board 20 as well as the background, the image quality is considerably reduced if coloring phenomenon occurs during the image processing in the white board portion in a boundary area between the white board portion and the background portion of the picked image, making the image difficult to see. Thus, it is desirable to prevent the above coloring phenomenon as much as possible.

In order to securely prevent the above coloring phenomenon, an image capture person may frame such that the entire image of the white board 20 falls within the field. However, since a desired angle of view may not be necessarily constantly obtained, it is better to reduce the coloring phenomenon during the image processing.

As a method for reducing the coloring phenomenon during the image processing, there can be considered a method for generating a histogram of level-frequency distribution excluding the pixel data of a portion (background portion) of the block except the white board portion. According to this method, only the white board portion in the picked image needs to be recognized. For example, the picked image may be displayed on the LCD device 19 in the exposure standby state, and an area designation member may be provided to designate an area on the monitor display, so that an image capture person can designate and input only the white board portion by this area designation member. Alternatively, the white board portion may be automatically extracted taking advantage of a difference in brightness since the white board 20 is generally white which is brighter than the background portion and has often a higher brightness than the background portion. According to this method, since the white board portion is normally placed in the center of the field, the brightness value of the white board portion is set based on, for example, the pixel data of high brightness in the center of the field, and an area including only the white board portion can be extracted by comparing this brightness value with the brightness value in each pixel position (level of the pixel data).

Another method for reducing the coloring phenomenon during the image processing may be as follows. As a γ-characteristic for the block including the white board portion and the background portion, a γ-characteristic for a block which is most adjacent to this block and does not include both the white board portion and the background portion is used, so as to eliminate the influence of the pixel data of the background portion in the illuminance nonuniformity correction.

Figure 51:
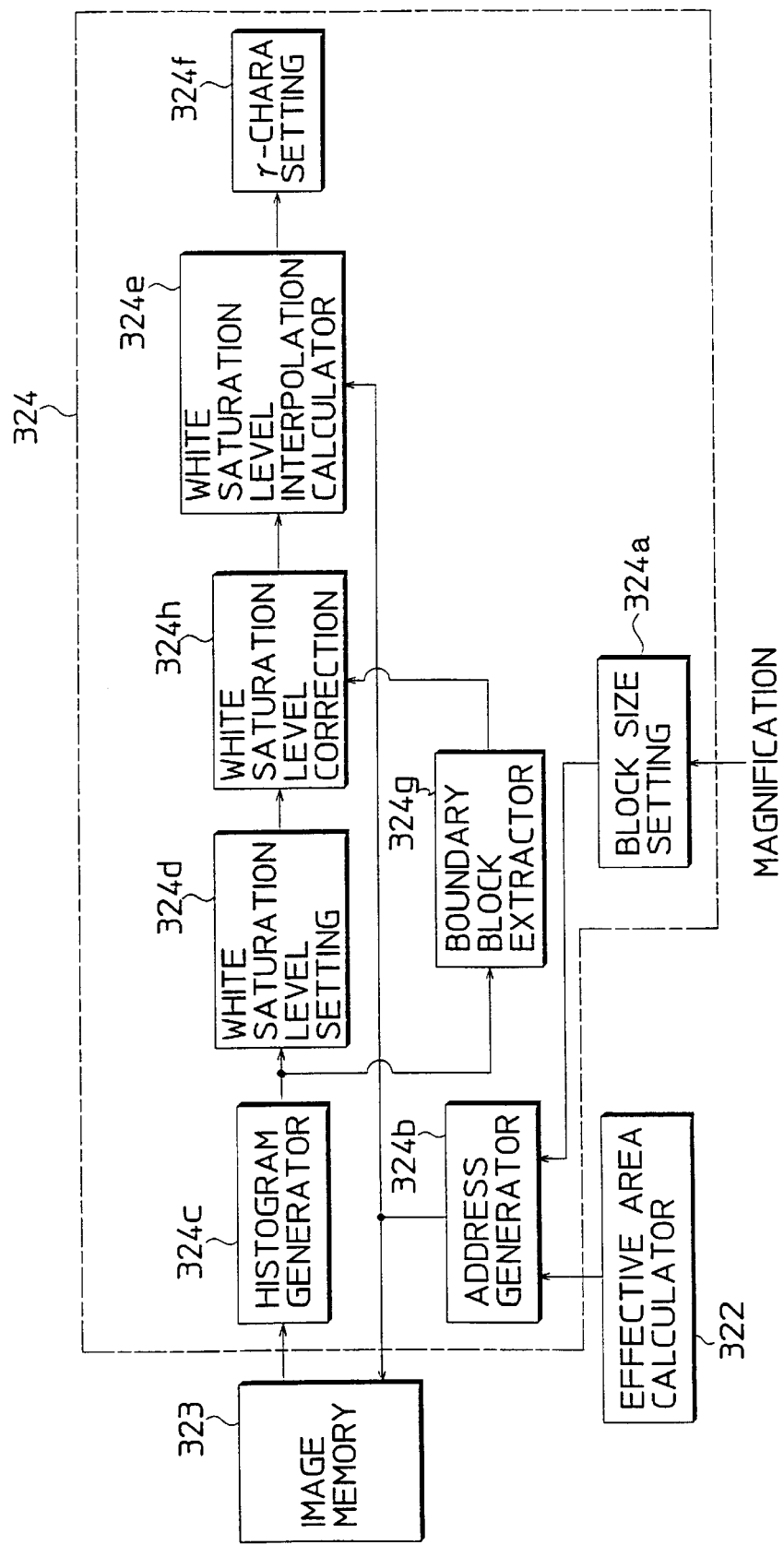
FIG. 51 is a block diagram showing an internal construction of the first γ-characteristic setting device for reducing the occurrence of the coloring phenomenon during the illuminance nonuniformity correction and the black intensification.

FIG. 51 is a diagram showing a block construction in which a processing block for reducing the coloring phenomenon is added to the first γ-characteristic setting device 324 of the first embodiment. FIG. 51 differs from FIG. 15 in that a white saturation level correction device 324h is added between the white saturation level setting device 324d and the white saturation level interpolation calculator 324e, and a boundary block extractor 324g is added between the white saturation level correction device 324h and the histogram generator 324c.

If a similar modification is introduced to the block diagram of FIG. 38, the first γ-characteristic setting device 324 according to the second embodiment can also reduce the coloring phenomenon.

In FIG. 51, the boundary block extractor 324g extracts blocks including the white board portion and the background portion based on the histogram of level-frequency distribution generated for each block. In other words, the extractor 324g extracts the blocks whose histogram of level-frequency distributions have two convex portions in the white area as shown in FIG. 49A or 50A, and designates the blocks having γ-characteristics to be used for these extracted blocks.

The white saturation level correction device 324h changes the white saturation level of each block extracted by the boundary block extractor 324g to that of the block designated by the boundary block extractor 324g. This change is made to use the white saturation level set for the block which does not include both the white board portion and the background portion and is adjacent to the extracted block as the white saturation level for the extracted block.

Figure 52:
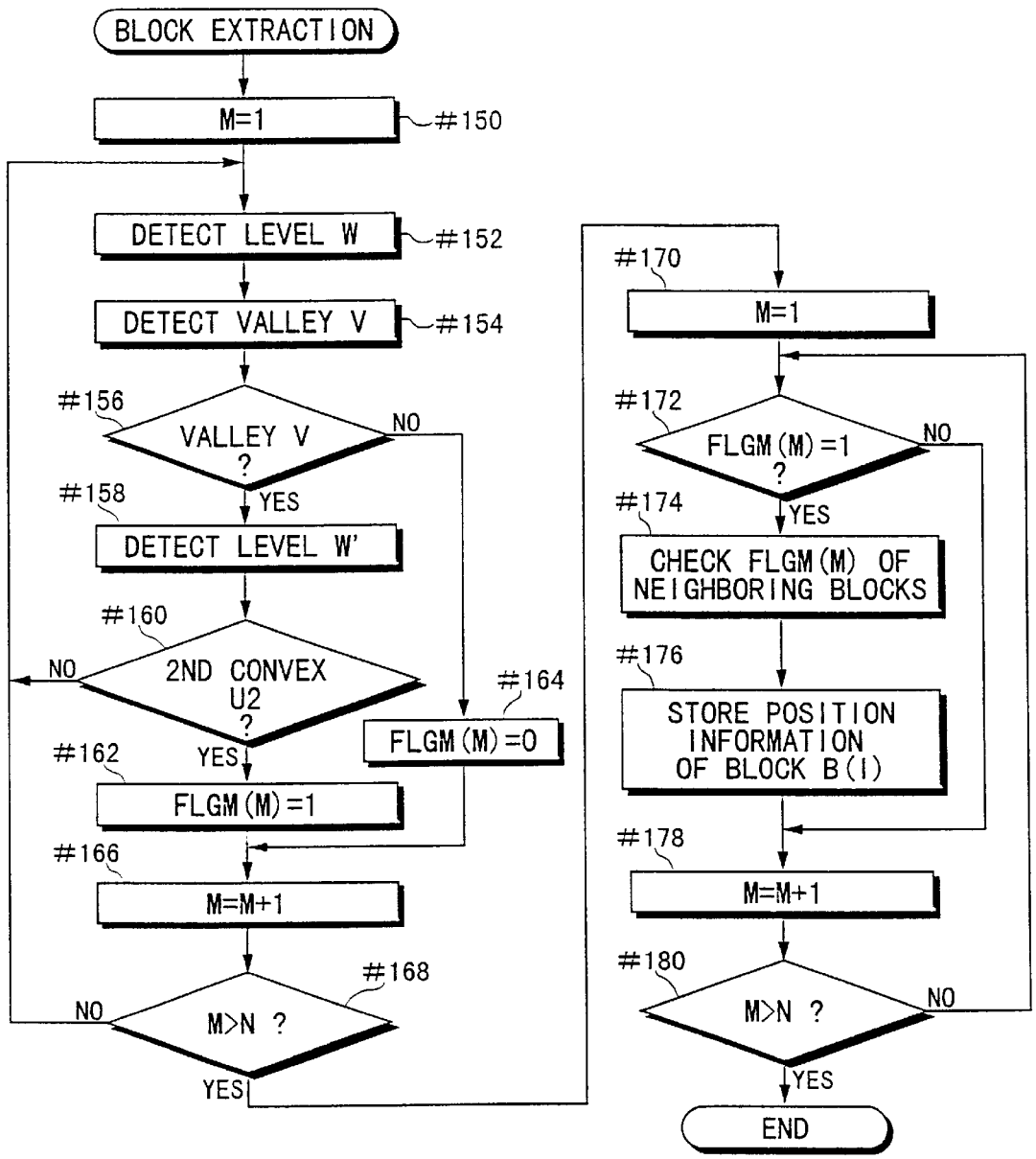
FIG. 52 is a flowchart showing a control "Block Extraction" for extracting the blocks including the background image.

The extraction of the blocks including the white board portion and the background portion by the boundary block extractor 324g is performed as follows in accordance with a flowchart of FIG. 52.

First, the counter M for counting the block number is set at "1" (Step #150). Since the extraction order of the blocks is along raster direction of the block division shown in FIG. 20, M=L·(I−1)+J and the block B(I, J) corresponds to the block B(L·(I−1)+j).

Subsequently, the level w corresponding to the peak value of the first convex portion of the histogram of level-frequency distribution generated for the block B(1) is detected. Taking the histogram of level-frequency distribution shown in FIG. 48 as an example, the level w corresponding to the peak value of the convex portion U1 is detected (Step #152). This level w is detected in the similar manner as the level w used to set the white saturation level W of the γ-characteristic for the illuminance nonuniformity correction is calculated. Specifically, the most frequent level W of a distribution in a range d lower than the maximum level p is calculated. In FIG. 48, the level p and the range d correspond to the maximum level of the pixel data included in the block B(i) and the range for detecting the level w.

Subsequently, a valley V between the convex portions U1 and U2 is detected (Step #154). This detection is made by calculating a level having a frequency lower than a predetermined threshold value tnum (e.g., frequency of 20% of a peak value fpnum of the convex portion U1) in a range below the level w and judging whether the calculation result continues a predetermined number of times tt (e.g., 3 to 5)

or more. In the case that the levels lower than the threshold value tnum continue the predetermined number of times tt or more, its level range is detected as a valley V.

It is then judged whether the valley V has been detected (Step #156). Unless the valley V has been detected (NO in Step #156), this routine proceeds to Step #164 in which a flag FLGM(M) is reset to "0". The flag FLGM(M) indicates the block including the white board portion and the background portion.

On the other hand, if the valley V is detected (YES in Step #156), a level w' corresponding to the peak value of the second convex portion U2 is detected (Step #158). This detection is made by calculating a level having a frequency lower than a predetermined threshold value ynum (e.g., frequency of 30% of a peak value fpnum) in a range below the level w and judging whether the calculation result continues a predetermined number of times yt (e.g., 3 to 5) or more. In the case that the levels lower than the threshold value tnum continue the predetermined number of times yt or more, its level range is detected as the second convex portion U2.

It is then judged whether the second convex portion U2 has been detected (Step #160). Upon the detection of the second convex portion U2 (YES in Step #160), the flag FLGM(M) is set at "1" (Step #162). Unless the second convex portion U2 has been detected (NO in Step #160), this routine proceeds to Step #164, in which the flag FLGM(M) is reset to "0".

After the count value of the counter M is incremented only by "1" (Step #166), it is judged whether the count value M is larger than the total block number N (=k×L) (Step #168). If M≦N (NO in Step #168), this routine returns to Step #152 and a processing similar to the above is performed for the next block B(2) (Steps #152 to #168). Hereafter, the similar processing is performed in the similar manner for the respective blocks B(M). If M>N (YES in Step #168), the judgment as to whether or not the block includes the white board portion and the background portion has been made for all blocks. Subsequently, the blocks including both the white board portion and the background portion are extracted by checking the flags FLGM(M) set for the respective blocks (Steps #150 to #180).

This extraction of the blocks is performed as follows. First, the counter M for counting the block number is set at "1" (Step #170) and it is judged whether the flag FLGM(1) for the block B(1) is set at "1" (Step #172). If the flag FLGM(1) is reset (NO in Step #172), this routine proceeds to Step #178.

Figures 53, 54A, 54B, 54C, 54D:
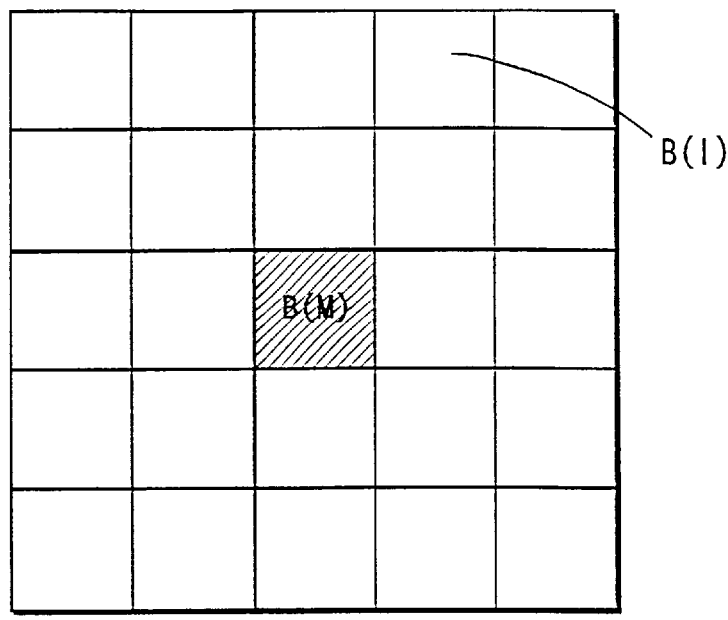

If the flag FLGM(1) is set at "1" (YES in Step #172), the blocks which do not include both the white board portion and the background portion are searched by checking the flags FLGM(I) of the blocks B(I) neighboring the block B(1) (Step #174). This search is performed for 5×5 blocks centered on the block B(M) as shown in FIG. 53. The search method is such that 5×5 block is divided into four small blocks of 3×3 in which the block B(M) is located at a lower right corner, an upper left corner, an upper right corer and a lower left corner, respectively, and the search is performed for the respective small blocks.

In each small block, the flags FLGM(I) are checked in an order numbered in the blocks of FIGS. 54A to 54D. The block B(I) whose FLGM(I) is first confirmed to be "0" is extracted as a block whose γ-characteristic should be used as that of the block B(M).

In the case of the block B(1), it is located at an upper left corner of the picked image. Accordingly, the flags FLGM(I) are checked for the neighboring blocks of the case shown in FIG. 54D. For example, if FLGM(I)=0 for the first time in the third block (block obliquely downward from the block B(1) to the left), this block B(I) is extracted as a block whose γ-characteristic should be used as that of the block B(M).

When the block B(I) is extracted, the position information of this block B(I) is so stored as to correspond to the block B(I) (Step #176).

Subsequently, after the count value of the counter M is incremented by "1" (Step #178), it is judged whether the count value M is larger than the total block number N (Step #180). If M≦N (NO in Step #180), this routine returns to Step #172 and a processing similar to the above is performed for the next block B(2) (Steps #172 to #180).

Thereafter, the similar processing is performed in the similar manner for the respective blocks B(M). If M>N (YES in Step #180), this routine ends upon the judgment that the designation of the blocks whose γ-characteristic should be used as that of the block including both the white board portion and the background portion has been completed for all such blocks.

The blocks extracted by the boundary block extractor 324g and the information on the blocks whose γ-characteristics should be used for the extracted blocks are inputted to the white saturation level correction device 324h. Out of the white saturation levels set for the respective blocks by the white saturation level setting device 324d, those set for the blocks including both the white board portion and the background portion are replaced by the white saturation levels set for the designated blocks not including both the white board portion and the background portion.

As described above, in the first γ-characteristic setting device 324 for reducing the coloring phenomenon, for the blocks including both the white board portion and the background portion, the white saturation level of the white board portion is not detected based on the histogram of level-frequency distribution of the pixel data included in these blocks, but the γ-characteristic is set using the white saturation level of the white board portion detected in the blocks not including both the white board portion and the background portion. Accordingly, the coloring at the boundary portion between the white board portion and the background portion caused by the setting of an improper γ-characteristic can be securely prevented.

In the first γ-characteristic setting device 324 for reducing the coloring phenomenon, whether or not the block includes both the white board portion and the background portion is detected using the histogram of level-frequency distribution of each block. The boundary position between the white board portion and the background portion can be detected using the above detection result.

Specifically, since the flag FLGM indicative of the presence or absence of the boundary between the white board portion and the background is set for each block, the blocks including the boundary between the white board portion and the background portion (hereinafter, "boundary blocks") can be extracted by extracting the blocks where FLGM=1.

Figure 55:
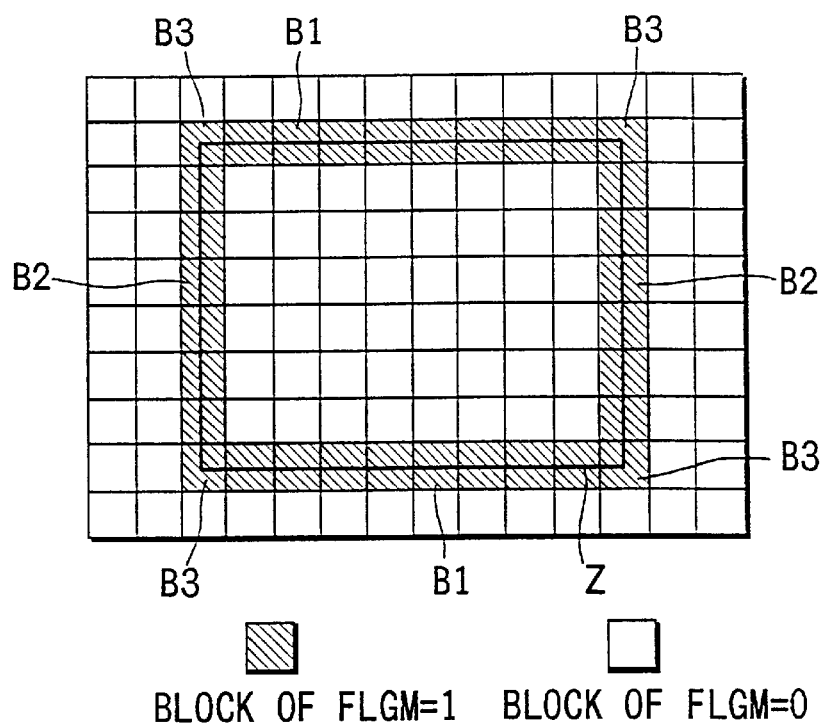
FIG. 55 is a diagram showing a method for detecting the blocks including the boundary between the white board image and the background image.

By connecting the extracted boundary blocks, the shape of the boundary and the outline of the boundary positions can be known. In the case that a picked image in which a white board image is located in the center is divided by rectangular blocks, for example, as shown in FIG. 55, boundary blocks including a boundary Z indicated by a sketch in FIG. 55 are extracted by extracting the blocks where FLGM=1, and the schematic shape of the boundary Z (laterally long rectangle) can be judged by connecting the boundary blocks.

If the boundary positions in each boundary block can be presumed pixel by pixel, the boundary positions in the field, i.e., the area of the white board image can be accurately known. If the γ-characteristic is differed in the white board portion and the background portion, a more suitable image for the character representation in the white board image can be obtained even if the background image is included in the field. Further, in the case that the contrast between the base portion (white portion) and the character portion is made clear by applying a binary processing to the picked image, a suitable binary processing can be performed by changing a binary threshold value in the white board portion and the background portion.

Next, a method for presuming the boundary positions in each boundary block pixel by pixel is described.

Figure 56:
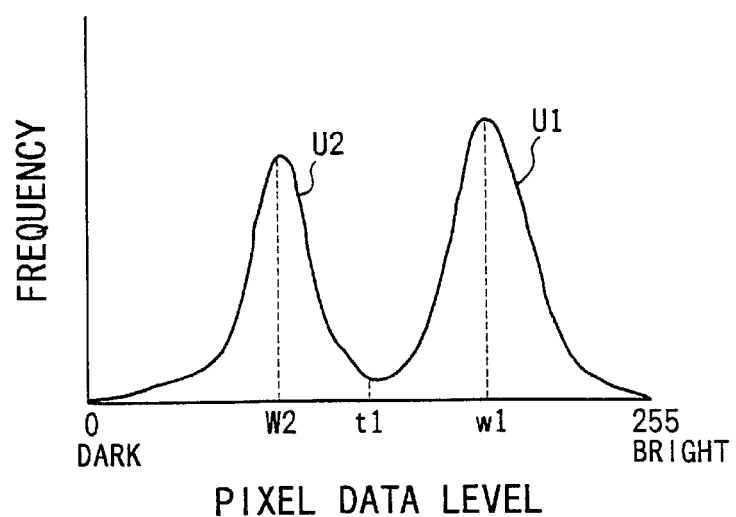
FIG. 56 is a graph showing an exemplary histogram of level-frequency distribution generated for the blocks including the white board image and the background image.

In the case that the image in the block is mostly constituted by the white image of the white board portion and the white image of the background portion (having a lower brightness than the white board portion) and there is a fixed difference in brightness between the white board portion and the background portion, the level distribution is a two-peak distribution having a convex portion U1 corresponding to the white board portion and a convex portion U2 corresponding to the background portion as shown in FIG. 56. The convex portions U1, U2 are relatively pointed.

In such a case, since the pixel data of the white board portion in the block gather around the convex portion U1 and those of the background portion gather around the convex portion U2, the domain of brightness is divided into ranges A1, A2 above and below a valley value t1 between the convex portions U1 and U2. Assuming a1, a2 denote frequencies included in the respective ranges A1, A2, a ratio of a1 to a2 approximates to a ratio of S1 (area of the white board portion in the block) to S2 (area of the background portion in the block).

If the histogram of level-frequency distribution generated, for example, for the boundary block B1 including the transversely extending boundary Z in FIG. 55 is assumed to be the one of FIG. 56, since the boundary Z is substantially horizontal in the boundary block B1, the boundary Z is presumed to be located in a position where the boundary block B1 is divided at a1:a2 along vertical direction. The boundary position in the boundary block B2 can be presumed according to a similar method.

Accordingly, if the frequency ratios a1:a2 are compared to be substantially or about the same between the neighboring boundary blocks B1 along horizontal direction, these blocks B1 are presumed to be blocks including only the horizontal portion of the boundary Z. Likewise, if the frequency ratios a1':a2' are compared to be substantially or about the same between the neighboring boundary blocks B2 along vertical direction, these blocks B2 are presumed to be blocks including only the vertical portion of the boundary Z.

On the other hand, in the blocks B3 including the corners of the white board image, frequency ratio a1":a2" is absolutely different from the frequency ratio a1:a2 of the blocks B1 neighboring along horizontal direction and the frequency ratio a1':a2' of the boundary blocks B2 neighboring along vertical direction. Accordingly, the blocks B3 having such a frequency ratio a1":a2" are presumed to be blocks at the corners of the white board image. As shown in FIG. 47, the boundary Z is presumed to be located in a position where the blocks B3 are divided in L-shape using the frequency ratio a1:a2 of the blocks B1 neighboring along horizontal direction and the frequency ratio a1':a2' of the boundary blocks B2 neighboring along vertical direction.

Since the blocks B3 including the corners of the white board image can be judged based on the connected state of the boundary blocks, the position of the boundary Z in the blocks B3 may be presumed by dividing them in L-shape using the frequency ratio a1:a2 of the blocks B1 neighboring along horizontal direction and the frequency ratio a1':a2' of the boundary blocks B2 neighboring along vertical direction.

According to the method for detecting the white level of the white board 20 based on the histogram of level-frequency distribution of the pixel data, it is difficult to accurately detect it also in the case where materials of intermediate gradation such as pictures or graphs are adhered to the white board 20.

Figure 57:
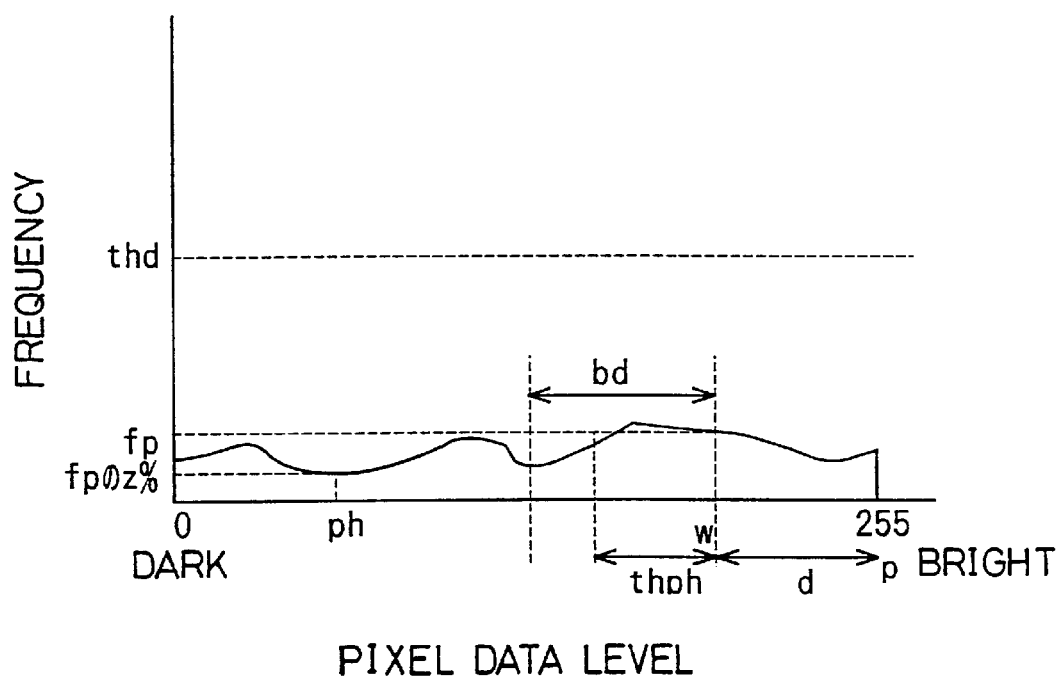
FIG. 57 is a graph showing an exemplary histogram of level-frequency distribution generated for the block including only an image of intermediate gradation such as a picture.

This is because of the following reason. In the case that the image in the block has intermediate gradation such as a picture, most pixel data spread in the gray area. Accordingly, a convex portion U corresponding to the white portion and a convex portion C corresponding to the character portion cannot be clearly seen in the histogram of level-frequency distribution set for this block as shown in FIG. 57. Thus, even if the method for detecting the level w corresponding to the peak value of the convex portion U of the white portion of the histogram of level-frequency distribution shown in FIG. 19 is applied to the block having the histogram of level-frequency distribution shown in FIG. 57, the level w can be neither accurately nor securely detected.

On the other hand, if a γ-correction similar to a binary processing is applied in the block including an image of intermediate gradation such as a picture, the image quality of the picture or the like is reduced, making it an unnatural image. Thus, it is desirable to perform a γ-correction similar to the one for natural images for this block.

Accordingly, the blocks having an image of intermediate gradation are extracted based on the shape of the histogram of level-frequency distributions generated for the respective blocks, and a γ-correction is performed for the extracted blocks using a predetermined γ-characteristic for intermediate gradation (e.g., γ-characteristic used in the first γ-correction device).

The following two methods can be adopted to judge whether the block includes an image of intermediate gradation based on the shape of the histogram of level-frequency distribution.

The first method is applied in the case that a maximum frequency fp of the histogram of level-frequency distribution is lower than a predetermined threshold value thd and the convex portions of the histogram of level-frequency distribution are flat. Dispersion is calculated for a distribution within a predetermined range bd below a level w having the maximum frequency fp, and the judgment is made by comparing the calculation result with the predetermined threshold value thb. Only the pixel data in the range bd are used in the calculation of dispersion to reduce the influence of the pixel data corresponding to the character representation. It should be noted that the threshold value thb is a threshold value of dispersion which can be presumed to be in the white board portion and is empirically obtained in advance.

Accordingly, if the calculated dispersion is larger than the predetermined threshold value thb, the image in the block is judged not to be an image of the white board portion.

The second method is applied in the case that a variation of the histogram of level-frequency distribution is relatively large. In a range below a level w having a maximum frequency fp, a level ph having a frequency lower than Z % (e.g., 50%) of the maximum frequency fp and closest to the level w is calculated. The judgment is made by comparing a difference Δw(=w−ph) between the level ph and the level w with a predetermined threshold value thph. It should be noted that the predetermined threshold value thph is a threshold value of the level difference which can be presumed to be the white board portion and is empirically obtained in advance.

Accordingly, when the calculated level difference Δw is larger than the predetermined threshold value thph, the image in this block is judged not to be an image of the white board portion.

In the first and second embodiments, the γ-correction is applied to the image after the illuminance nonuniformity correction using the γ-characteristic for the black intensification whose black saturation level B is variably set by the black density adjustment switch 18. However, the γ-correction for the black intensification may be performed as follows without using the γ-characteristic for the black intensification. After such a γ-correction as to make the base portion of the picked image white is performed using the γ-characteristic for the illuminance nonuniformity correction, a minimum level h' of the pixel data is calculated, and the γ-correction is performed using a γ-characteristic for level-converting the pixel data level between the minimum level h' and the white saturation level w by 256 gradation levels.

Figure 58A:
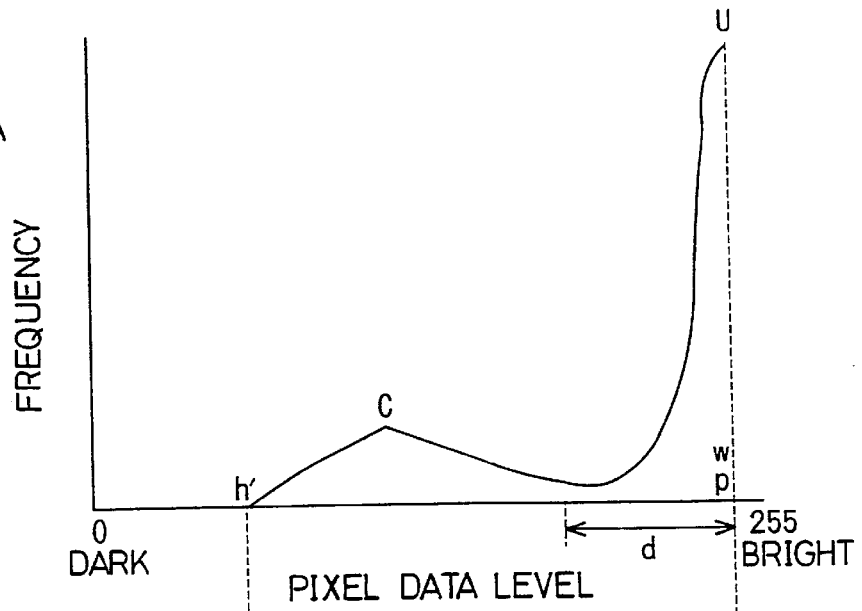
Figure 58B:
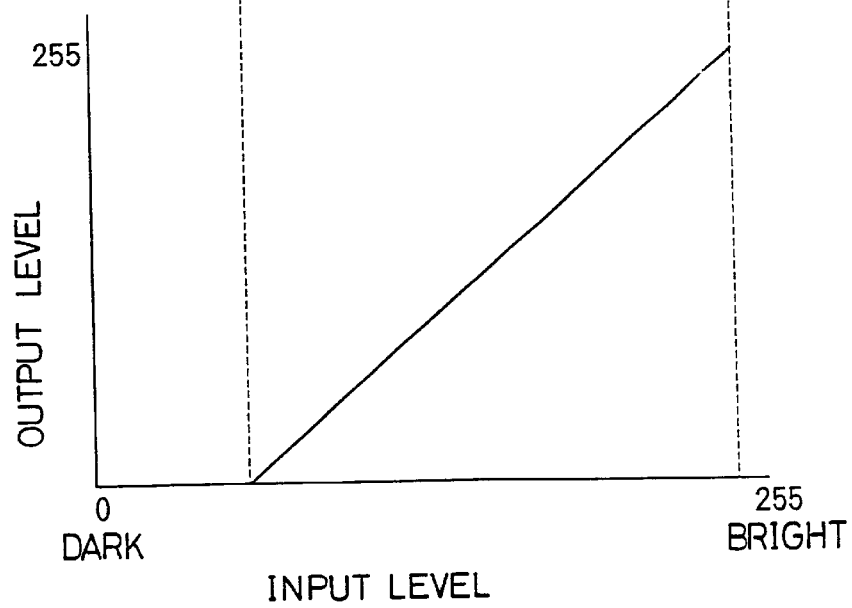

Specifically, if a histogram of level-frequency distribution as shown in FIG. 58A is obtained for the image after the illuminance nonuniformity correction, a level h' having a lowest brightness of the black area is calculated from this histogram of level-frequency distribution, and a γ-characteristic shown in FIG. 58B is set using this level h' and the white saturation level w. The γ-correction may be applied to the image after the illuminance nonuniformity correction using this γ-characteristic. According to this method, since the γ-correction is so performed as to extend the brightness range of the image after the illuminance nonuniformity correction to a range of 256 gradation levels, the dynamic range is extended and the quality of the picked image can be improved.

Figure 59:
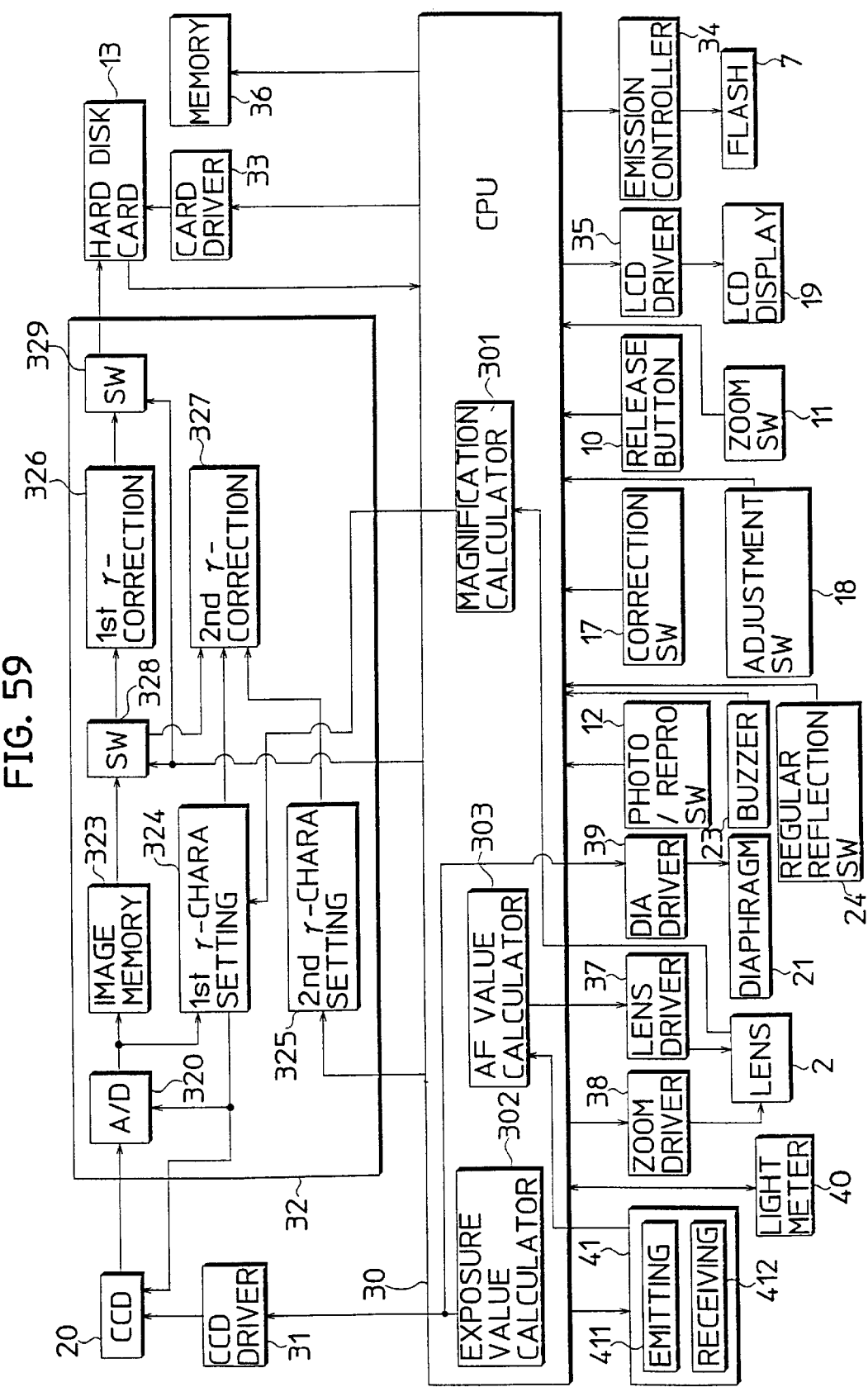
FIG. 59 is a block diagram showing a construction of an electronic camera according to a third embodiment of the invention.
Figure 60:
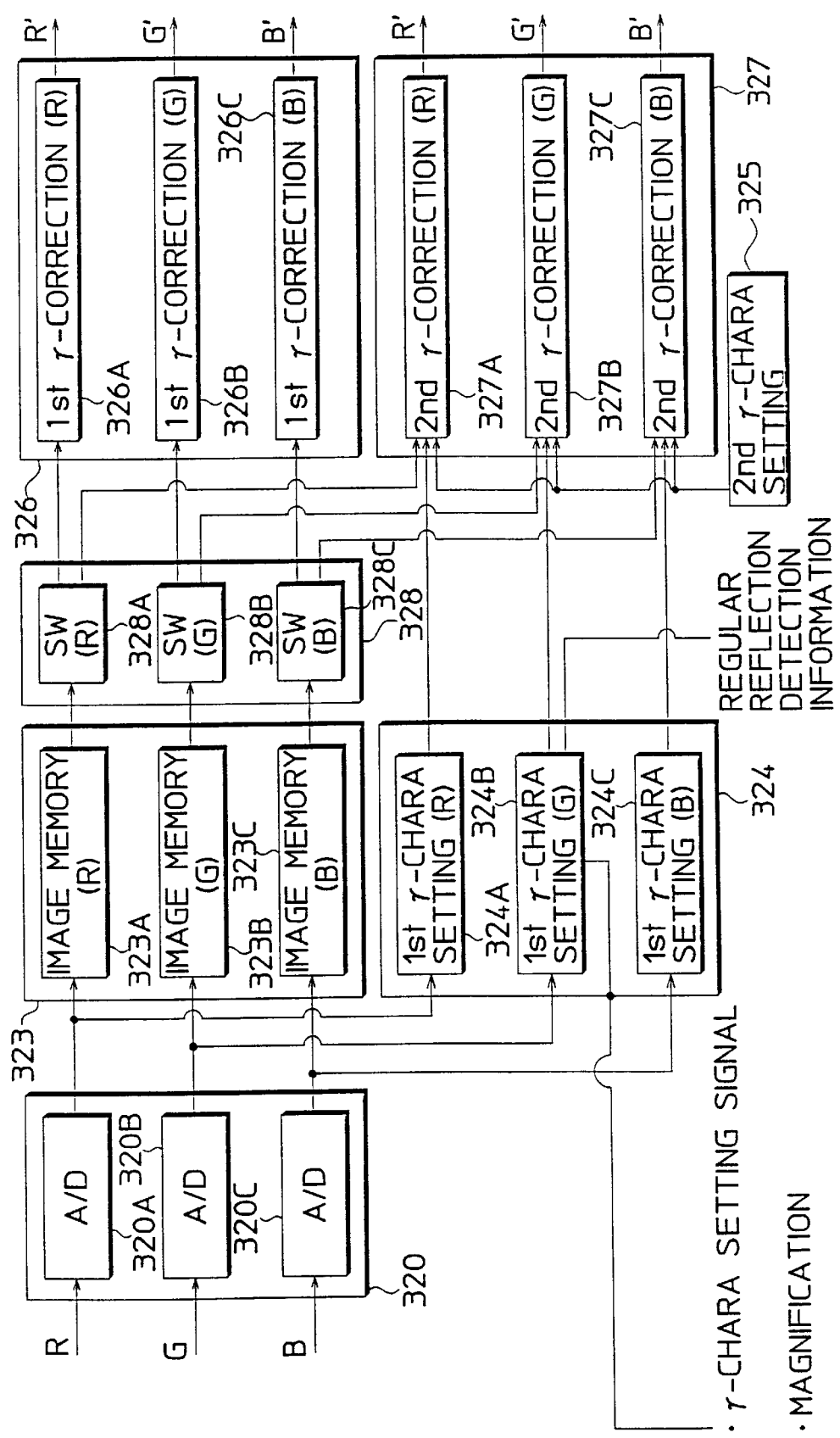
FIG. 60 is a block diagram showing a construction of an arrangement of an A/D converter to first and second γ-correction devices of the electronic camera of the third embodiment.
Figure 61:
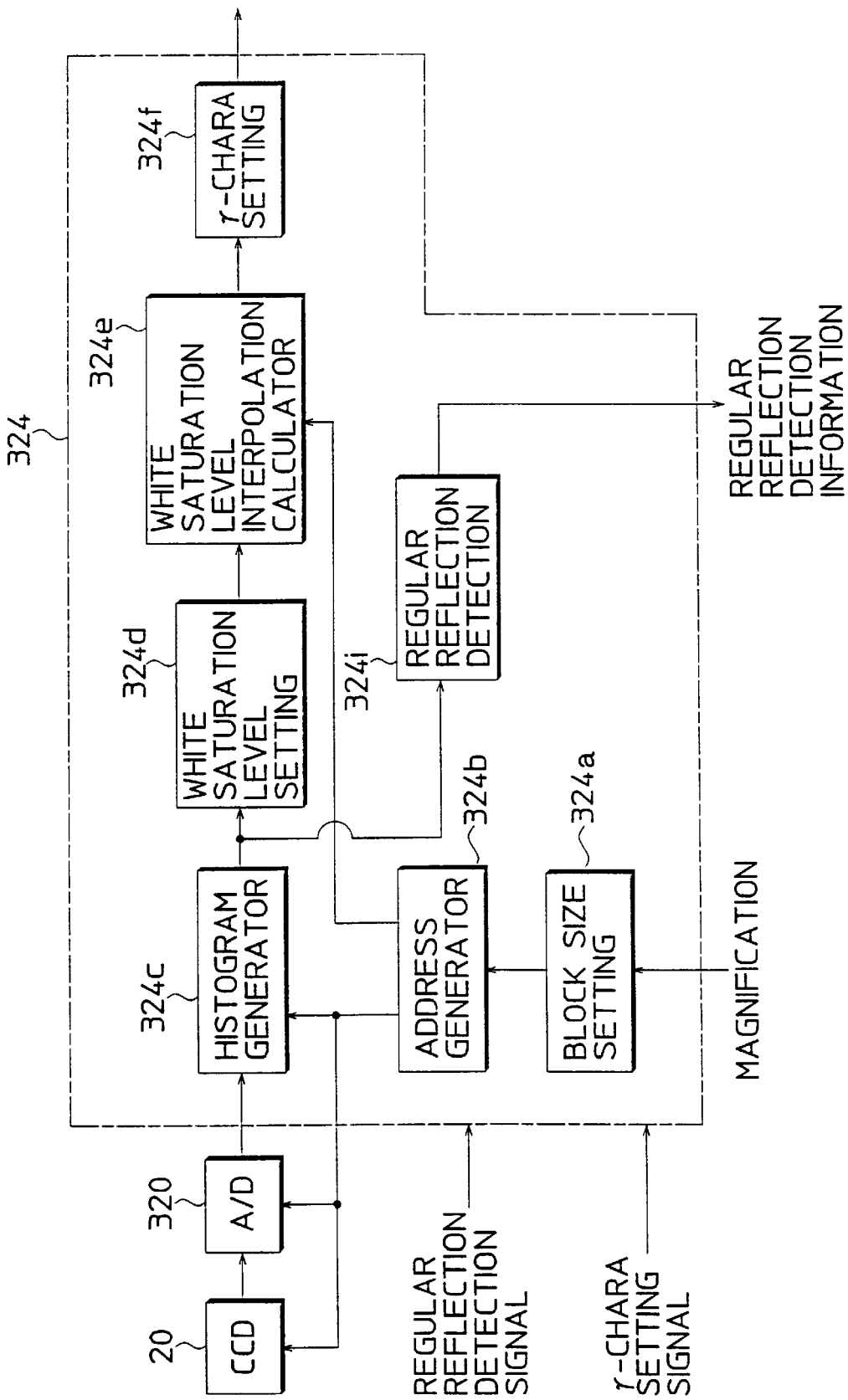
FIG. 61 is a block diagram showing an internal construction of a first γ-characteristic setting device of green components of the electronic camera according to the third embodiment.

FIG. 59 is a block construction diagram of the electronic camera 1 according to a third embodiment; FIG. 60 is a detailed block diagram of a construction for applying an image processing to a color image from the A/D converter 320 to the first and second γ-correction devices 326, 327; and FIG. 61 is a block diagram showing the internal construction of the first γ-characteristic setting device 324 according to the third embodiment.

The electronic camera 1 of the third embodiment is provided with a function of preventing an occurrence of an undesired event where a character representation having become unclear due to the regular reflection of the illumination light (including both natural light and flash light) becomes even more unclear when the illuminance nonuniformity correction is applied to a picked image including a light image regularly reflected by an object. Since this function concerns the illuminance nonuniformity correcting function, but not the oblique image correcting function, the elements relating to the oblique image correcting function are deleted from FIGS. 59 to 61 in order to simplified the description.

The method according to the third embodiment for the illuminance nonuniformity correction is basically same as the one described in the first embodiment. Accordingly, description is supplementarily given on the construction relating to a newly added function in the description below.

The block construction diagram shown in FIG. 56 differs from the one shown in FIG. 36 in that the oblique image correction device 321 and the mode setting switch 16 are deleted and a warning buzzer 23 and a regular reflection warning switch 24 are added. Since the oblique image correcting function is deleted in the electronic camera 1 according to the third embodiment, the oblique image correction device 321 and the mode setting switch 16 which relate to this function are deleted from the block construction of FIG. 59.

In FIG. 59, the switch circuit 328 switches the connection of the image memory 323 with the first and second γ-correction devices 326, 327, and the switch circuit 329 switches the connection of the first and second γ-correction devices 326, 327 with the HD card 13. The switching of the switch circuits 328, 329 is controlled in accordance with a control signal outputted from the CPU 30 in conformity with the set state of the illuminance nonuniformity correction switch 17. If the illuminance nonuniformity correction switch 17 is set "OFF" (if the natural image mode is set), the image memory 323 and the first γ-correction device 326 are connected and the first γ-correction device 326 and the HD card 13 are connected. If the illuminance nonuniformity correction switch 17 is set "ON" (if the character image mode is set), the image memory 323 and the second γ-correction device 327 are connected and the second γ-correction device 327 and the HD card 13 are connected.

Figure 62:
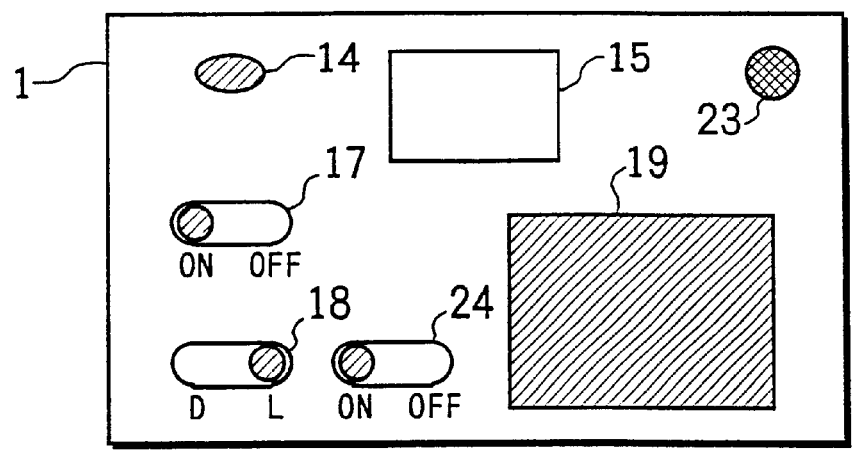
FIG. 62 is a rear view of the electronic camera of the third embodiment.

Further, the buzzer 23 is provided at an upper right corner of the rear surface of the electronic camera 1 as shown in FIG. 62 and is adapted to notify an image capture person that, when a character image drawn on the white board 20 is captured, it becomes unclear due to the regular reflection of the illumination light by the white board 20. Hereinafter, this warning is referred to as a "regular reflection warning".

Figure 63:
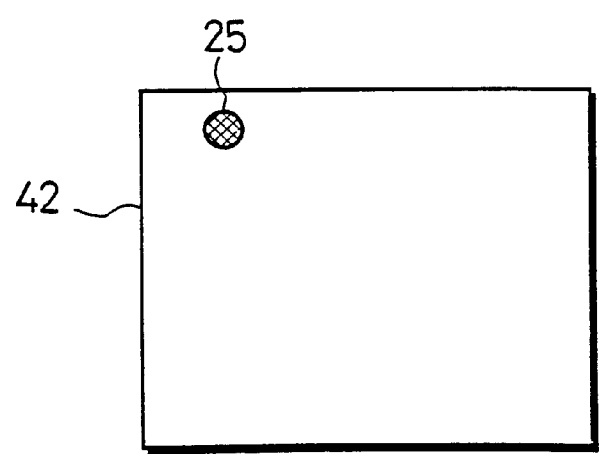
FIG. 63 is a diagram showing an LED device for warning a regularly reflected light in a viewfinder.

The regular reflection warning switch 24 is provided at the right side of the black density adjustment switch 18 on the rear surface of the electronic camera 1 as shown in FIG. 62 and is adapted to designate the regular reflection warning. The regular reflection warning switch 24 is an ON/OFF switch whose operation button is slidable along transverse direction. If the "regular reflection warning" is designated by the regular reflection warning switch 24, a captured image is divided into a plurality of blocks (small images) and the presence of the regularly reflected light is judged for each block using the histogram of level-frequency distribution of the pixel data included in the block. A warning sound is given from the buzzer 23 if the regularly reflected light is detected in any of the blocks. The electronic camera 1 also warns the image capture person of a possibility that the quality of the captured image is reduced due to the regularly reflected light by turning a LED indicator 25 for the regular reflection warning provided in the viewfinder frame 42 as shown in FIG. 63. On the other hand, when the regular reflection warning switch 24 is "OFF", neither the detection of the regularly reflected light nor the regular reflection warning is made.

The choice as to whether the regular reflection warning is to be given is left to the image capture person as described above for the following reason. The regularly reflected light is problematic in the image capturing operation when the character image mode is set. Conversely, the regularly reflected light may be effectively utilized as an image capturing effect in the natural image mode where image capturing similar to usual picture taking is performed. Accordingly, the regular reflection warning can be made if necessary according to the image capturing purpose, scene, etc. Thus, the regular reflection warning may be constantly made without providing the regular reflection warning switch 24.

The block diagram shown in FIG. 60 differs from that shown in FIG. 37 only in that the first γ-characteristic setting device 324B for green components judges whether the captured image includes an image of the regularly reflected illumination light and this judgment result is outputted as a detection information of the regularly reflected light. Further, the block construction shown in FIG. 61 differs from the one shown in FIG. 15 in that a regular reflection detector 324i is added. The detector 324i judges whether the captured image includes an image of the illumination light regularly reflected block by block when the regular reflection warning is designated by the regular reflection warning switch 24, thereby detecting the captured image including the image of the regularly reflected light. The detector 324i judges whether the image of the regularly reflected light is included in each block B(I, J) based on the shape of the histogram of level-frequency distribution generated for each block.

Specifically, if the illumination light such as ceiling light and sunlight coming through the windows is regularly reflected by the white board 20 when a character representation such as characters and figures drawn on the white board 20 is captured, the pixel data of saturation level are outputted from the pixels having received the regularly reflected light. Accordingly, most of the pixel data constituting the image of the white board 20 are pixel data of saturation level in the blocks including the image of the regularly reflected light. Thus, the histogram of level-frequency distribution for such a block is shaped such that a level w having a maximum frequency of a convex portion U corresponding to the white board 20 substantially agrees with a maximum level p.

The regular reflection detector 324i calculates the level w having the maximum frequency of the convex portion U of the histogram of level-frequency distribution corresponding to the white board 20 according to a method similar to the method for setting the white saturation level W of the γ-characteristic for the illuminance nonuniformity correction and compares this calculation result with the maximum level p. If the level w substantially agrees with the maximum level p, the detector 324i judges that the image of the regularly reflected light is included in this block and outputs this judgment result to the CPU 30.

The CPU 30 causes the buzzer 23 to give out a sound in accordance with the judgment result of the regular reflection detector 324i and turns the LED indicator 25 on to give an image capture person a warning that the captured image includes the regularly reflected light.

The first γ-characteristic setting devices 324A, 324B for red and blue components have the same internal construction as the first γ-characteristic setting device 324B for green components except the regular reflection detector 324i.

Next, an image capturing control of the electronic camera 1 according to the third embodiment is described with reference to a flowchart of FIGS. 65 to 68. It is assumed that the image capturing/reproduction switch 12 is set at the image capturing side. When the electronic camera 1 is activated and the ST1 switch is turned on by the shutter release button 10, an object image is picked up by the CCD 22 and an image processing is applied to the picked image in a specified cycle. When the switch S 2 is turned on, the image picked up after this is stored in the HD card 13 after a specified image processing is applied thereto.

When the main switch 14 is turned on to activate the electronic camera 1, the image capturing operation is enabled. If the zoom switch 11 is operated in this state (YES in Step #200), the zoom lens of the taking lens 2 is driven according to the operated direction and the operated amount to change a zooming ratio (Step #202). Thereafter, when the ST1 switch is turned on by partly pressing the shutter release button 10 (YES in Step #204), the image capturing preparation processing is performed in Step #206.

Specifically, an object distance $D_A$ is first detected by the light meter 41 (Step #206). The light meter 41 emits infrared rays for the light metering toward an object through the light emitting portion 411 and picks up a light meter data by receiving the light reflected by the object by the light receiving portion 412, and calculates the distance $D_A$ from the object to the sensing surface in the center of the field using the picked data. Then, a lens drive amount by which the taking lens 2 is driven to attain an in-focus condition is calculated based on the calculated object distance $D_A$ (Step #208).

Subsequently, it is judged whether the regular reflection warning has been designated by the regular reflection warning switch 24 (Step #210). A regular reflection warning processing is performed in Steps #212 to #218 if the regular reflection warning has been designated (YES in Step #210), whereas it is not performed by skipping Steps #212 to #218 unless otherwise (NO in Step #210).

In the regular reflection warning processing, an image capturing magnification $m_A$ (=a·f/$D_A$, a: proportion coefficient) in the center of the field is calculated based on the object distance $D_A$ and a focal length f of the taking lens 2 (Step #212). Whether the image of the regularly reflected light is included in the captured image is then detected in accordance with a subroutine "Regular Reflection Detection" shown in FIG. 68 (Step #214).

The detection as to whether the image of the regularly reflected light is included in the captured image is made as follows. First, a block size S0 (=S0·$m_A$/m0) for dividing the picked image is calculated using the image capturing magnification $m_A$, a predetermined reference image capturing magnification m0 and a block size S0 (Step #260). Further, a block number n is calculated based on the block size S and the size of the sensing surface (Step #262).

Subsequently, the counter M for counting the block number n is set at "1" (Step #264). Since the order of the blocks in the γ-characteristic setting is along raster direction in the block division shown in FIG. 20, M=L·(I−1)+J. Thus, the block B(I, J) corresponds to the block B(L·(I−1)+J).

Figure 64:
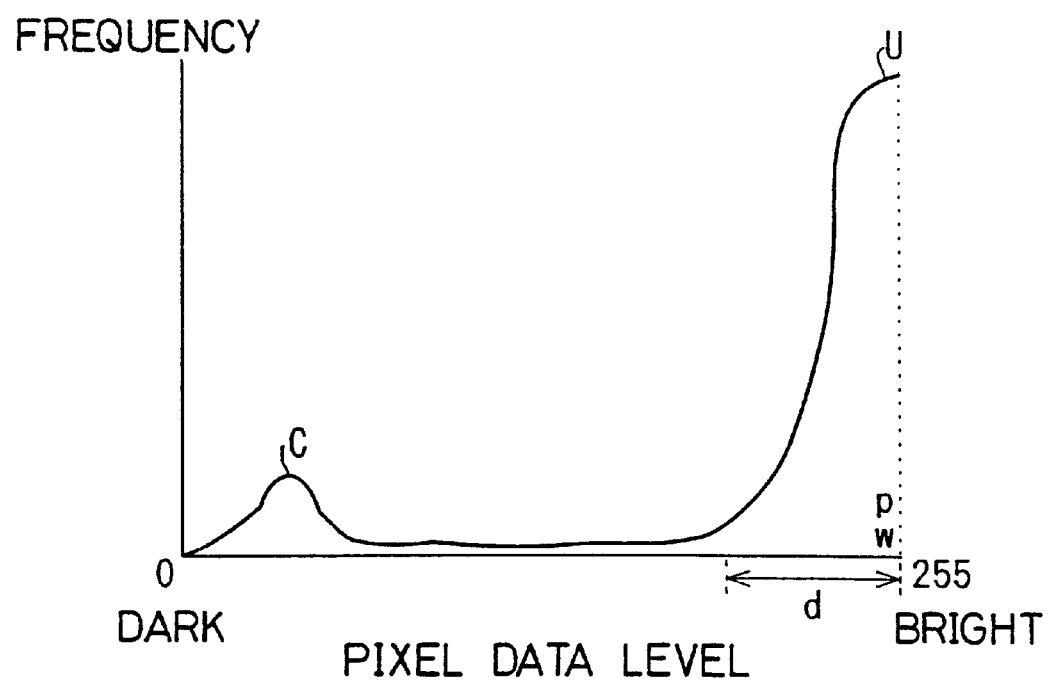
FIG. 64 is a graph showing a histogram of level-frequency distribution of pixel data of a block including an image represented by regularly reflected light.
Figure 65:
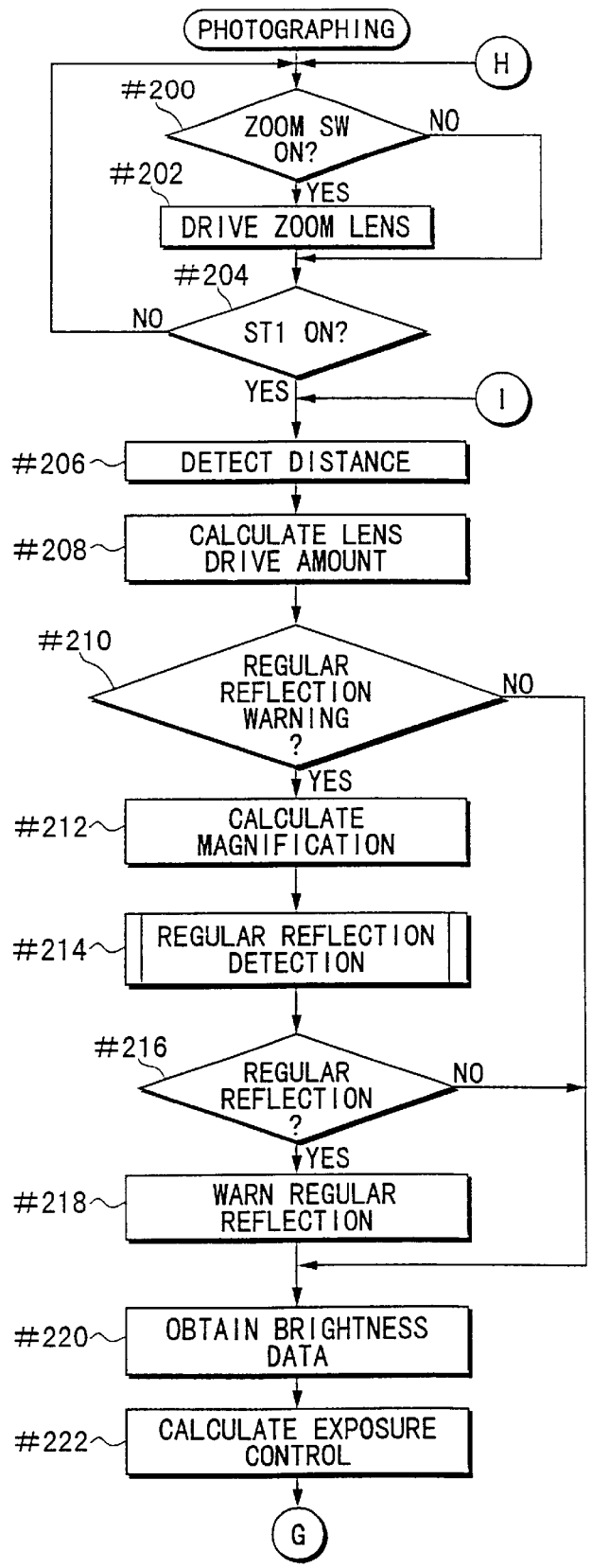
FIGS. 65 to 67 are flowcharts showing an image capturing control of the electronic camera according to the third embodiment.

All pixel data included in the block B(M) are read (Step #266), and a histogram of level-frequency distribution as shown in FIG. 23 or 64 is generated using the pixel data except X % of pixel data at the high level side (Step #268). Then, the level w corresponding to the peak value of the convex portion U corresponding to the white portion of the histogram of level-frequency distribution is calculated (Step #270) and it is judged whether this level w substantially agrees with the maximum level p (=255) of the histogram of level-frequency distribution (Step #272).

If the level w substantially agrees with the maximum level p (YES in Step #272), it is judged that the image of the regularly reflected light is included in the block and a flag FLAGH is set at "1" (Step #280) and this subroutine returns. The FLAGH is a detection flag of the regularly reflected light and indicates that an image of the regularly reflected image is included in a captured image when it is set at "1" while indicating that no image of the regularly reflected light is included in a captured image when it is reset at "0".

Unless the level w substantially agrees with the maximum level p in Step #272, the count value of the counter M is incremented by "1" (Step #274). Thereafter, it is judged whether the count value M is larger than the total block number n (Step #276). If M≦n (NO in Step #276), this subroutine returns to Step #266 to judge whether an image of the regularly reflected light is included in the next block B(M) (Steps #266 to #272).

If the image of the regularly reflected light has been detected in none of the blocks B(M) (YES in Step #276), it is judged that no image of the regularly reflected light is included in the captured image and this subroutine returns after the flag FLAGH is reset to "0" (Step #278).

Referring back to FIG. 65, upon the completion of the regularly reflected light detection, the presence or absence of the image of the regularly reflected light is judged based on the state of the flag FLAGH (Step #216). If the flag FLAGH is set at "1" (the image of the regularly reflected light is present) (YES in Step #216), the regular reflection warning is made by the buzzer 23 and the LED indicator 25 (Step #218). On the other hand, if the flag FLAGH is reset at "0" (the image of the regularly reflected light is absent) (NO in Step #216), Step #218 is skipped, so that the regular reflection warning by the buzzer 23 and the LED indicator 25 is not made.

Subsequently, a data on the object brightness (light meter data) is obtained by the light meter 40 (Step #220), and the exposure control values are calculated based on this light meter data (Step #222). It is then judged whether the illuminance nonuniformity correction has been designated by the illuminance nonuniformity correction switch 17 (Step #224 in FIG. 66). If the illuminance nonuniformity correction has been designated (YES in Step #224), a control signal representing the prohibition of the firing is outputted to the emission controller 34 to prohibit the flash 7 from firing (Step #226). Unless the illuminance nonuniformity correction has been designated (NO in Step #222), Step #226 is skipped, so that the firing of the flash 7 is not prohibited. In this way, the image capturing preparation processing is completed and the electronic camera 1 waits on standby for an exposure.

The firing of the flash 7 is prohibited when the illuminance nonuniformity correction is designated in order to avoid the following image capturing error. In the case that the flash 7 is, for example, automatically fired in a scene where the white board 20 is captured from front, characters in the picked image may be unreadable due to the flash light fully reflected by the white board 20.

When the shutter release button 10 is fully pressed to turn the ST2 switch on in the exposure standby state (YES in Step #228), this routine proceeds to Step #232 to start the exposure. On the other hand, if the shutter release button 10 is kept partly pressed, i.e., the ST1 switch is still on (YES in Step #230), this routine returns to Step #206 to repeat the aforementioned image capturing preparation processing (a loop of Steps #206 to #230). If the shutter release button 10 is released to thereby turn the ST1 switch off (NO in Step #230), this routine returns to Step #200.

Upon the start of the exposure, after the data on the lens drive amount is outputted to the lens driver 37 and the taking lens 2 is focused (Step #232), the aperture value data Av of the exposure control values is outputted to the diaphragm driver 39 to adjust the aperture of the diaphragm 21 (Step #234).

It is then judged whether the illuminance nonuniformity correction has been designated (Step #236). If the illuminance nonuniformity correction has been designated (YES in Step #236), the block size S used to divide the image into a plurality of blocks is calculated (Step #238). This calculation is made according to a method similar to the one adopted in Step #260 during the regularly reflected light detection processing.

When the setting of the block size is completed, the shutter speed data calculated in Step #222 is outputted to the CCD driver 31 to start an image pickup operation (integration) by the CCD 22 (Step #240). The CCD 22 picks up an object image by storing electric charges (electric charge integration) in a photosensitive portion thereof for a predetermined time after the electric charges in the photosensitive portion are reset in accordance with a drive control signal from the CCD driver 31.

Figure 67:
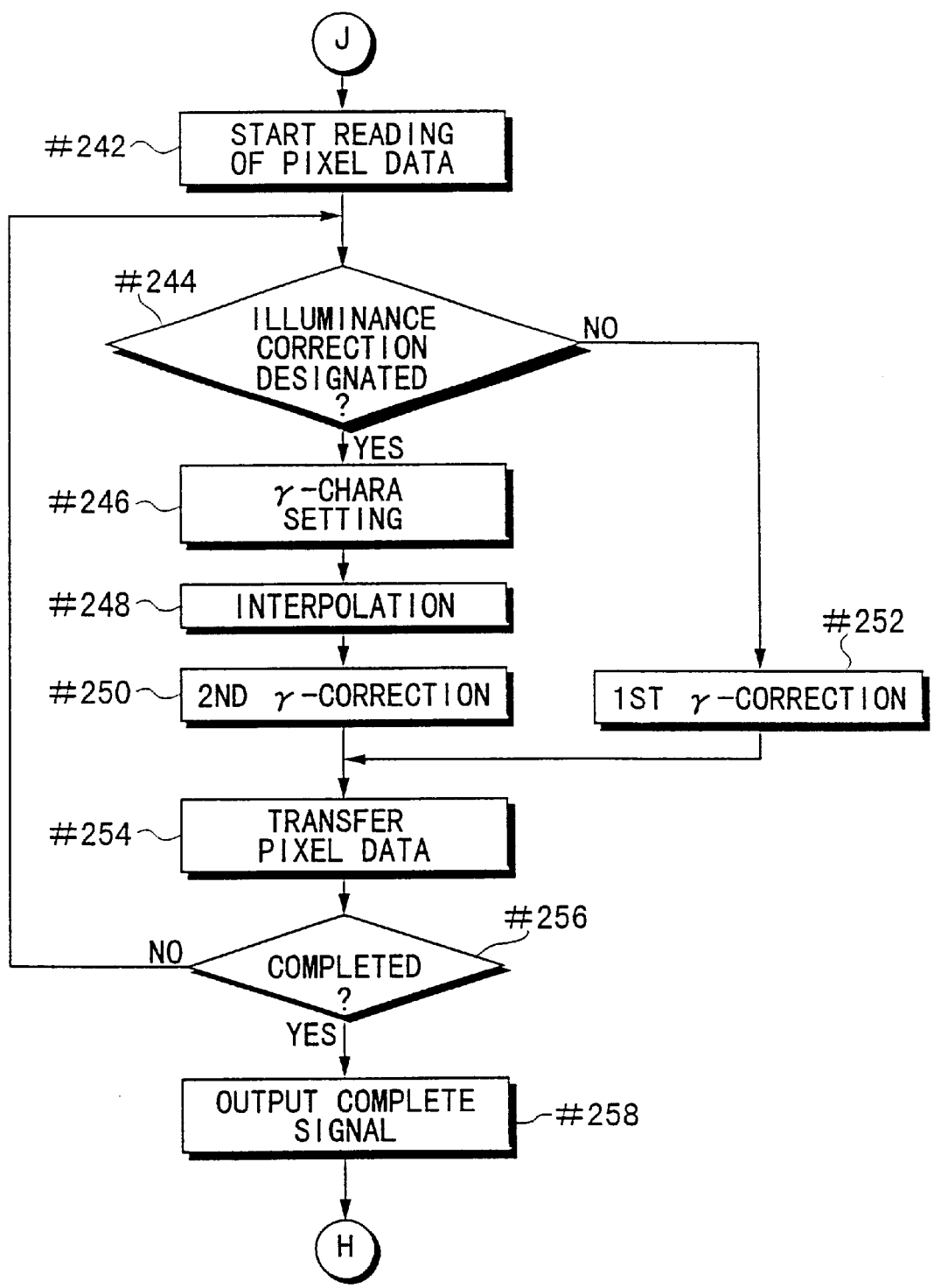
Figure 68:
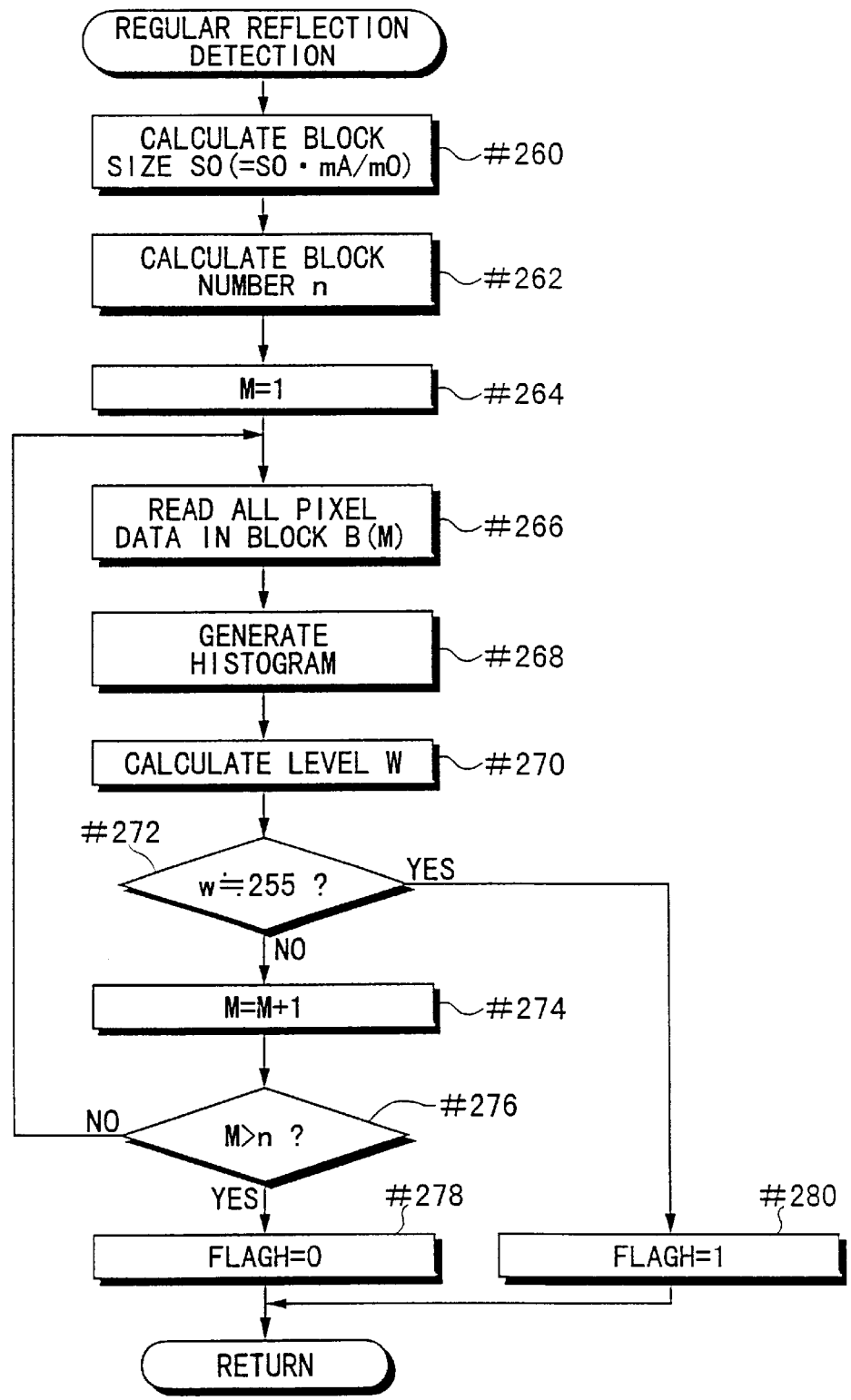
FIG. 68 is a flowchart showing a subroutine "Regularly Reflected Light Detection"

Upon the completion of the image pickup operation by the CCD 22, the reading of the electric charges (pixel data) stored in the respective pixels of the photosensitive portion is started (Step #242 in FIG. 67). The pixel data of the CCD 22 are successively read in arrow direction every vertical line as shown in FIG. 33 and inputted to the image processor 32. The pixel signals inputted to the image processor 32 are stored in the image memory 323 after being converted into pixel data in the A/D converter 320, and are inputted to the first γ-characteristic setting device 324.

Subsequently, it is judged whether the illuminance nonuniformity correction has been designated (Step #244). If the illuminance nonuniformity correction has been designated (YES in Step #244), the first γ-characteristic setting device 324 sets a γ-characteristic for the illuminance nonuniformity correction for each block in accordance with the subroutine "γ-Characteristic Setting" shown in FIG. 32 (Step #246). Here, no description is given on the setting of the γ-characteristic since it is identical to the aforementioned processing.

Subsequently, the white saturation level W(I) of the γ-characteristic for the illuminance nonuniformity correction set for each block B(I) is interpolated to set γ-characteristics for the illuminance nonuniformity correction in pixel positions other than the center position of each block B(I) (Step #248). While the set γ-characteristics are inputted to the second γ-correction device 327, the pixel data are transferred from the image memory 323 to the second γ-correction device 327 via the switch circuit 328. After the γ-correction is applied to the pixel data using the γ-characteristic for the illuminance nonuniformity correction corresponding to that pixel position, the γ-correction is performed using the γ-characteristic for the black intensification (Step #250).

On the other hand, if the illuminance nonuniformity correction has not been designated (NO in Step #244), the pixel data are transferred from the image memory 323 to the first γ-correction device 326 via the switch circuit 328 and the γ-correction is applied to the pixel data using the γ-characteristic after the γ-correction are written in the HD card 13 via the switch circuit 329 (Step #254).

The pixel data after the γ-correction are successively written in the HD card 13 via the switch circuit 329 (a loop of Steps #244 to #256). Upon the completion of the writing of all pixel data in the HD card 13 (YES in Step #256), a control signal representative of the completion of the reading of the pixel data is outputted to the CCD driver 31 and a control signal representative of the completion of the writing of the pixel data is outputted to the card driver 33, thereby completing one image pickup operation (Step #258). Then, this routine returns to Step #200 for the next image capturing operation.

As described above, during the image capturing preparation processing, the picked image is divided into a plurality of blocks; and the regularly reflected light is detected by judging every block whether the image of the light regularly reflected by the object (white board 20) is included in the block using the histogram of level-frequency distribution generated every block. Accordingly, even a spot regularly reflected light can be securely detected. Since the regular reflection warning is given to the image capture person based on the detection result, in the case that an object is characters and/or figures drawn on the white board 20 and such a representation becomes unclear due to the regular reflection of the illumination light by the white board 20, an erroneous operation of image capturing an image having a low representation value can be prevented by the regular reflection warning.

Figure 69:
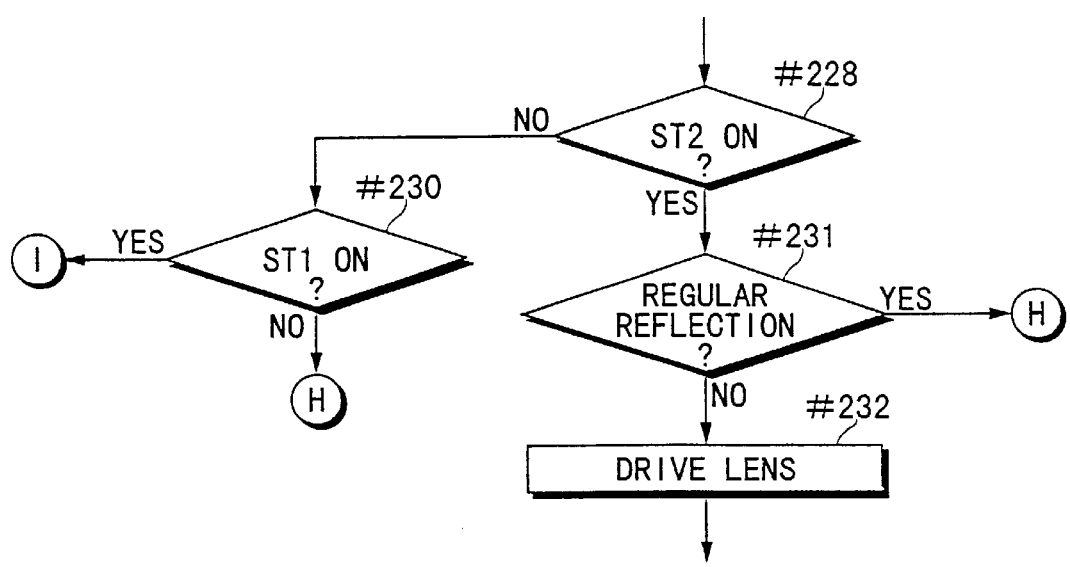
FIG. 69 is a flowchart showing a modification for prohibiting the storage of the picked image in a hard disk card when the regularly reflected light is detected.

Although only the regular reflection warning is made upon the detection of the regularly reflected light in the foregoing embodiments, the storage of the captured image in the HD card 13 may be prohibited in addition to the regular reflection warning in order to effectively use the memory capacity of the HD card 13 since the image representing the character image having become unclear due to the regular reflection of the illumination light has a low representation value. In such a case, as shown in FIG. 69, Step #231 of judging the set state of the flag FLAGH (judgment as to the presence or absence of the image of the regularly reflected light corresponding to Step #216) is inserted, for example, between Steps 228 and 232 in the flowchart of FIG. 66. If the flag FLAGH is set at "1" (YES in Step #231), this routine returns to Step #206 to perform the image capturing preparation processing. If the flag FLAGH is reset at "0" (NO in Step #231), this routine proceeds to Step #232. In other words, unless the flag FLAGH is reset at "0", the image capturing preparation processing may be repeated regardless of whether the ST2 switch is on or not.

In the foregoing embodiments, when the shutter release button 10 is fully pressed, a specified image processing corresponding to the designation by the illuminance nonuniformity correction switch 17 (illuminance nonuniformity correction) is applied to the picked image regardless of whether the regular reflection warning has been given or not and, then, the image data is stored in the HD card 13. However, when the regular reflection warning is given, an image processing for the usual image capturing operation is applied to the picked image (i.e., no illuminance nonuniformity correction is performed) regardless of the set state of the illuminance nonuniformity correction switch 17 and, then, the image data is stored in the HD card 13.

Figure 66:
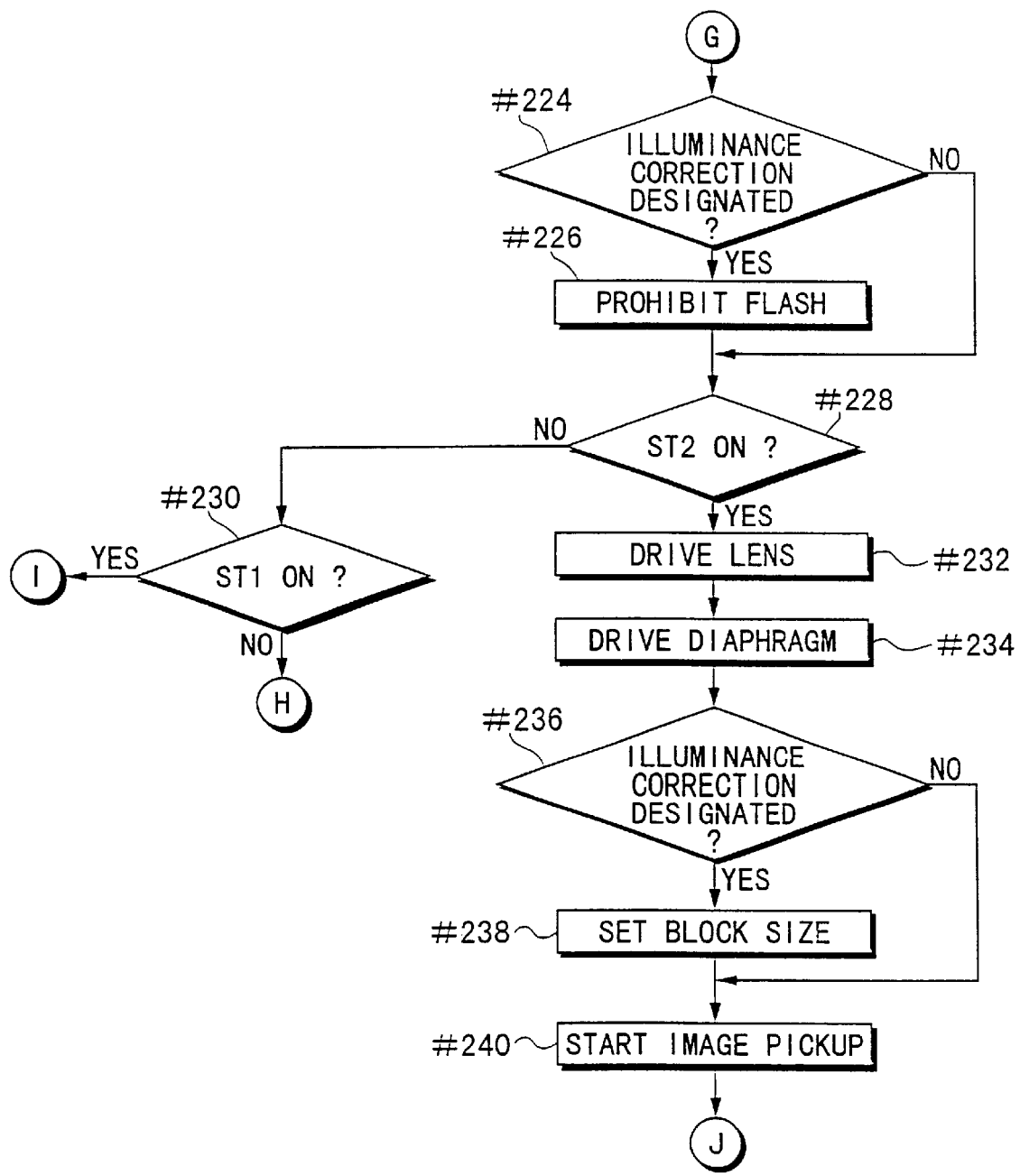
Figure 70:
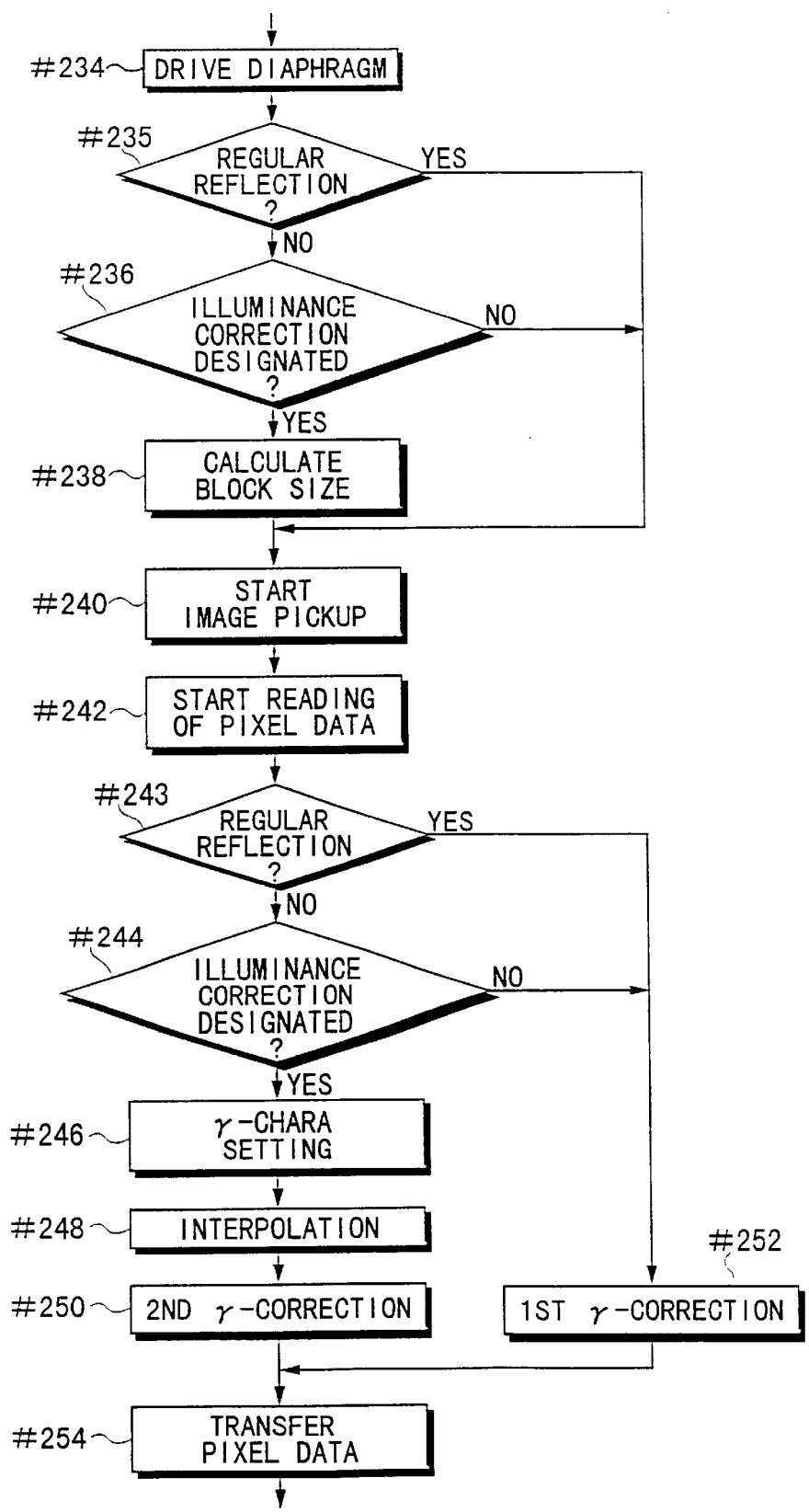
FIG. 70 is a flowchart showing a modification for forcibly switching a γ-correction to be applied to the picked image to a usual γ-correction when the regularly reflected light is detected.
Figure 71:
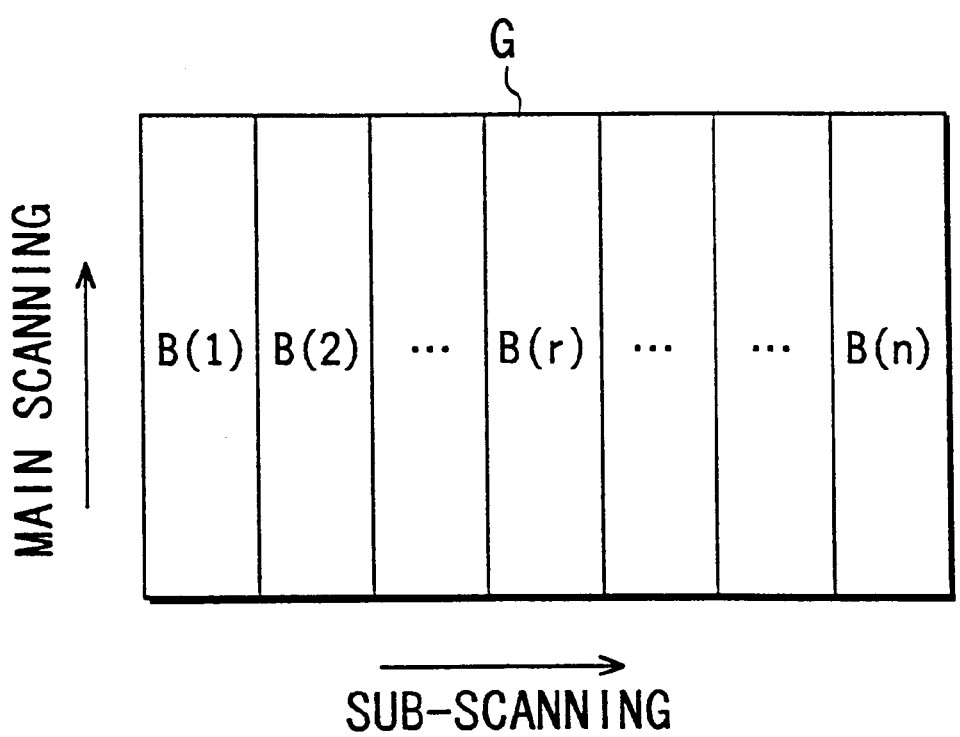
FIG. 71 is a diagram showing a method for dividing an image picked in a digital copying machine by blocks.

In this case, as shown in FIG. 70, Steps #235 and #243 of judging the presence or absence of the image of the regularly reflected light based on the state of the flag FLAGH is inserted between Steps #234 and #236 and between Steps #242 and #244 in the flowchart of FIGS. 66 and 67. If the flag FLAGH is set at "1" in Step #235 (YES in Step #235), Steps #236, #238 are skipped. If the flag FLAGH is set at "1" in Step #243 (YES in Step #243), this routine proceeds to Step #252.

As described above, when the image of regularly reflected light is included in the captured image, the image processing is performed by applying the γ-correction for the usual image capturing operation even if the illuminance nonuniformity correction has been designated. This prevents a problem that the character representation having become unclear due to the regularly reflected light becomes even more unclear due to the illuminance nonuniformity correction, thereby further reducing the image quality and representation value.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image capturing apparatus comprising:
   an image pickup device which photoelectrically picks up a light image of an object to generate image data including a number of pixel data;
   a block setter which sets a plurality of blocks over the number of pixel data;
   a first γ-characteristic setter which sets a first γ-characteristic for pixel data at a center position of each block based on pixel data included in its block;
   a second γ-characteristic setter which sets second γ-characteristics for pixel data at other positions than the center position of each block based on set first γ-characteristics; and
   a γ-characteristic corrector which corrects pixel data of each block in accordance with the set first and second γ-characteristics.

2. An image capturing apparatus according to claim 1, wherein the second γ-characteristic setter sets a second γ-characteristic for pixel data at a given position interpolating first γ-characteristics based on a positional relationship between the given position and the respective center positions of the given block including the given position and blocks neighboring the given block.

3. An image capturing apparatus according to claim 2, wherein the second γ-characteristic setter sets a second γ-characteristic for pixel data at each position excluding the center position.

4. An image capturing apparatus according to claim 2, wherein the second γ-characteristic setter sets:
   a plurality of sub-blocks over pixel data at positions other than the center positions, the sub-block being smaller than each block; and
   a second γ-characteristic for each sub-block interpolating first γ-characteristics.

5. An image capturing apparatus according to claim 1, wherein the second γ-characteristic setter sets a second γ-characteristic for pixel data at each position excluding the center position interpolating first γ-characteristics.

6. An image capturing apparatus according to claim 1, wherein the second γ-characteristic setter sets:
   a plurality of sub-blocks over pixel data at positions other than the center positions, the sub-block being smaller than each block; and
   a second γ-characteristic for each sub-block interpolating first γ-characteristics.

7. An image capturing apparatus according to claim 1, further comprising an image geometric distortion corrector which corrects a geometric distortion of the image data having been corrected by the γ-characteristic corrector.

8. An image capturing apparatus according to claim 7, further comprising an angle setter which sets an angle between an image pickup surface of the image pickup device and a surface of the object.

9. An image capturing apparatus according to claim 8, wherein the image geometric distortion corrector corrects, based on the set angle, an image geometric distortion of the image data that is caused by an oblique image capture.

10. An image capturing apparatus according to claim 7, further comprising:
    a taking lens which focuses the light image of the object onto an image pickup surface of the image pickup device;
    an angle setter which sets an angle between the image pickup surface and a surface of the object;

a distance meter which meters a distance to the object; and a calculator which calculates a distribution of image capturing magnifications within a specified portion of the surface of the object based on an angle set by the angle setter, a focal length of the taking lens, and an object distance metered by the distance meter;

wherein the image geometric distortion corrector corrects a geometric distortion of the image data based on a calculated distribution of image capturing magnifications.

11. An image capturing apparatus according to claim 1, further comprising:

a taking lens having changeable image capturing magnifications;

a detector which detects an image capturing magnification of the taking lens;

a block size setter which sets a size of each block based on a detected image capturing magnification.

12. An image capturing apparatus comprising:

an image pickup device which photoelectrically picks up a light image of an object to generate image data including a number of pixel data;

a block setter which sets a plurality of blocks over the number of pixel data;

a γ-characteristic setter which sets a γ-characteristic for each block based on pixel data, included in its block;

a γ-characteristic corrector which corrects pixel data of each block in accordance with the set γ-characteristic, the image data including a perspective geometric distortion after the γ-characteristic corrector corrects pixel data of each block; and an image geometric distortion corrector which corrects the γ-characteristic corrected image data which includes the perspective geometric distortion.

13. An image capturing apparatus according to claim 12, further comprising an angle setter which sets an angle between an image pickup surface of the image pickup device and a surface of the object.

14. An image capturing apparatus according to claim 13, wherein the image geometric distortion corrector corrects, based on the set angle, an image geometric distortion of the image data that is caused by an oblique image capture.

15. An image capturing apparatus according to claim 12, further comprising:

a taking lens which focuses the light image of the object onto an image pickup surface of the image pickup device;

an angle setter which sets an angle between the image pickup surface and a surface of the object;

a distance meter which meters a distance to the object; and a calculator which calculates a distribution of image capturing magnifications within a specified portion of the surface of the object based on an angle set by the angle setter, a focal length of the taking lens, and an object distance metered by the distance meter;

wherein the image geometric distortion corrector corrects a geometric distortion of the image data based on a calculated distribution of image capturing magnifications.

16. An image capturing apparatus according to claim 15, wherein the block setter sets blocks respectively having different sizes in accordance with image capturing magnifications.

17. An image capturing apparatus comprising:

a taking lens having changeable image capturing magnifications;

a detector which detects an image capturing magnification of the taking lens;

an image pickup device which photoelectrically picks up a light image of an object passed through the taking lens to generate image data including a number of pixel data;

a block setter which sets a plurality of blocks over the number of pixel data;

a block size setter which sets a size of each block based on a detected image capturing magnification;

a γ-characteristic setter which sets a γ-characteristic for each block; and a γ-characteristic corrector which corrects pixel data of each block in accordance with the set γ-characteristic.

18. An image capturing apparatus comprising:

an image pickup device which photoelectrically picks up an light image of an object to generate image data including a number of pixel data;

an image geometric distortion corrector which corrects a perspective geometric distortion included in the image data;

a block setter which sets a plurality of blocks over the image data having been corrected by the image geometric distortion corrector;

a γ-characteristic setter which sets a γ-characteristic for each block based on pixel data included in its block; and a γ-characteristic corrector which corrects a pixel data of each block in accordance with the set γ-characteristic.

19. An image capturing apparatus according to claim 18, further comprising an angle setter which sets an angle between an image pickup surface of the image pickup device and a surface of the object.

20. An image capturing apparatus according to claim 19, wherein the image geometric distortion corrector corrects, based on the set angle, an image geometric distortion of the image data that is caused by an oblique image capture.

21. An image capturing apparatus according to claim 18, further comprising:

a taking lens which focuses the light image of the object onto an image pickup surface of the image pickup device;

an angle setter which sets an angle between the image pickup surface and a surface of the object;

a distance meter which meters a distance to the object; and a calculator which calculates a distribution of image capturing magnifications within a specified portion of the surface of the object based on an angle set by the angle setter, a focal length of the taking lens, and an object distance metered by the distance meter;

wherein the image geometric distortion corrector corrects, based on a calculated distribution of image capturing magnifications, a geometric distortion of the image data that is cause by an oblique image capture.

22. An image capturing apparatus comprising:

an image pickup device which photoelectrically picks up a light image of an object to generate image data including a number of pixel data; and an image geometric distortion corrector which corrects a geometric distortion of the image data by applying a reduction processing to a specified portion of the image data, and filling dummy pixel data in a portion where pixel data is to be lost due to the reduction processing.

23. An image capturing apparatus according to claim 22, wherein the image geometric distortion corrector corrects a geometric distortion of the image data by further applying an enlargement processing to a specified portion of the image data.

24. An image capturing apparatus according to claim 23, further comprising:
   a taking lens which focuses the light image of the object onto an image pickup surface of the image pickup device;
   an angle setter which sets an angle between the image pickup surface and a surface of the object;
   a distance meter which meters a distance to the object; and
   a calculator which calculates a distribution of image capturing magnifications within a specified portion of the surface of the object based on an angle set by the angle setter, a focal length of the taking lens, and an object distance metered by the distance meter;
   wherein the image geometric distortion corrector corrects, based on a calculated distribution of image capturing magnifications, a geometric distortion of the image data that is caused by an oblique image capture.

25. An image capturing apparatus according to claim 22, wherein the dummy pixel data is data representing white color.

26. An image capturing apparatus according to claim 22, further comprising an angle setter which sets an angle between an image pickup surface of the image pickup device and a surface of the object.

27. An image capturing apparatus according, to claim 26, wherein the image geometric distortion corrector corrects, based on an angle set by the angle setter, a geometric distortion of the image data that is caused by an oblique image capture.

28. An image capturing apparatus according to claim 22, further comprising:
   a block setter which sets a plurality of blocks over image data corrected by the image geometric distortion corrector;
   a block extractor which extracts a block including the dummy pixel data;
   a first γ-characteristic setter which sets a first γ-characteristic for a block including no dummy pixel data based on pixel data included in its block;
   a second γ-characteristic setter which sets second γ-characteristic for a block including the dummy pixel data, the second γ-characteristic being equal to the first γ-characteristic for a block including no dummy pixel data which is closest to the block including the dummy pixel data; and
   a γ-characteristic corrector which corrects pixel data of each block in accordance with the set first and second γ-characteristics.

29. An image capturing apparatus according to claim 28, wherein the image geometric distortion corrector corrects a geometric distortion of the image data by further applying an enlargement processing to a specified portion of the image data.

30. An image capturing apparatus according to claim 29, further comprising:
   a taking lens which focuses the light image of the object onto an image pickup surface of the image pickup device;
   an angle setter which sets an angle between the image pickup surface and a surface of the object;
   a distance meter which meters a distance to the object; and
   a calculator which calculates a distribution of image capturing magnifications within a specified portion of the surface of the object based on an angle set by the angle setter, a focal length of the taking lens, and an object distance metered by the distance meter;
   wherein the image geometric distortion corrector corrects, based on a calculated distribution of image capturing magnifications, a geometric distortion of the image data that is caused by an oblique image capture.

31. An image capturing apparatus according to claim 30, wherein the block setter sets blocks respectively having different sizes in accordance with image capturing magnifications.

32. An image capturing apparatus according to claim 28, wherein the dummy pixel data is data representing white color.

33. An image capturing apparatus according to claim 28, further comprising an angle setter which sets an angle between an image pickup surface of the image pickup device and a surface of the object.

34. An image capturing apparatus according to claim 33, wherein the image geometric distortion corrector corrects, based on an angle set by the angle setter, a geometric distortion of the image data that is caused by an oblique image capture.

35. An image capturing apparatus according to claim 22, further comprising:
   a block setter which sets a plurality of blocks over image data corrected by the image geometric distortion corrector;
   an effective pixel data extractor which extracts effective pixel data from the pixel data of each block;
   a γ-characteristic setter which sets a γ-characteristic for each block based on effective pixel data included in its block; and
   a γ-characteristic corrector which corrects pixel data of each block in accordance with he set γ-characteristic.

36. An image capturing apparatus according to claim 35, wherein the image geometric distortion corrector corrects a geometric distortion of the image data by further applying an enlargement processing to a specified portion of the image data.

37. An image capturing apparatus according to claim 36, further comprising:
   a taking lens which focuses the light image of the object onto an image pickup surface of the image pickup device;
   an angle setter which sets an angle between the image pickup surface and a surface of the object;
   a distance meter which meters a distance to the object; and
   a calculator which calculates a distribution of image capturing magnifications within a specified portion of the surface of the object based on an angle set by the angle setter, a focal length of the taking lens, and an object distance metered by the distance meter;
   wherein the image geometric distortion corrector corrects, based on a calculated distribution of image capturing magnifications, a geometric distortion of the image data that is caused by an oblique image capture.

38. An image capturing apparatus according to claim 37, wherein the block setter sets blocks respectively having different sizes in accordance with image capturing magnifications.

39. An image capturing apparatus according to claim 35, wherein the dummy pixel data is data representing white color.

40. An image capturing apparatus according to claim 35, further comprising an angle setter which sets an angle between an image pickup surface of the image pickup device and a surface of the object.

41. An image capturing apparatus according to claim 40, wherein the image geometric distortion corrector corrects, based on an angle set by the angle setter, a geometric distortion of the image data that is caused by an oblique image capture.

42. An image capturing apparatus comprising:
  an image pickup device which photoelectrically picks up a light image of an object to generate image data including a number of pixel data;
  a taking lens which focuses the light image onto an image pickup surface of the image pickup device;
  a distance meter which meters a distance to the object;
  a calculator which calculates a distribution of image capturing magnifications within a specified portion of the surface of the object based on a focal length of the taking lens and an object distance metered by the distance meter;
  a block setter which sets a plurality of blocks over image data generated by the image pickup device, the plurality of blocks respectively having different sizes in accordance with image capturing magnifications;
  a γ-characteristic setter which sets a γ-characteristic for each block based on pixel data included in its block;
  a γ-characteristic corrector which corrects pixel data of each block in accordance with the set γ-characteristic, the γ-characteristic corrected image data including a geometric distortion that is caused by an oblique image capture; and
  an image geometric distortion corrector which corrects, based on a calculated distribution of image capturing magnifications, the geometric distortion of the γ-characteristic corrected image data.

43. A method for processing image data generated by an image pickup device, the image data including a number of pixel data, the method comprising the steps of:
  setting a plurality of blocks over the number of pixel data;
  setting a first γ-characteristic for pixel data at a center position of each block based on pixel data included in its block;
  setting second γ-characteristics for pixel data at other positions than the center position of each block based on set first γ-characteristics; and
  correcting pixel data of each block in accordance with the set first and second γ-characteristics.

44. A method for processing image data generated by an image pickup device, the image data including a number of pixel data, the method comprising the steps of:
  setting a plurality of blocks over the number of pixel data;
  setting a γ-characteristic for each block based on pixel data included in its block;
  correcting pixel data of each block in accordance with the set γ-characteristic, the image data including a perspective geometric distortion; and
  correcting the γ-characteristic corrected image data which includes the perspective geometric distortion is created.

45. A method for processing image data which is generated by an image pickup device photoelectrically picking up a light image of an object through a taking lens having changeable image capturing magnifications, the image data including a number of pixel data, the method comprising the steps of:
  detecting an image capturing magnification of the taking lens;
  setting a plurality of blocks over the number of pixel data;
  setting a size of each block based on a detected image capturing magnification;
  setting a γ-characteristic for each block; and
  correcting pixel data of each block in accordance with the set γ-characteristic.

46. A method for processing image data generated by an image pickup device, the image data including a number of pixel data, the method comprising the steps of:
  correcting a perspective geometric distortion included in the image data;
  setting a plurality of blocks over the corrected image data;
  setting a γ-characteristic for each block based on pixel data included in its block; and
  correcting pixel data of each block in accordance with the set γ-characteristic.

47. A method for processing image data which is generated by an image pickup device photoelectrically picking up a light image of an object through a taking lens having a focal length, the image data including a number of pixel data, the method comprising the steps of:
  metering a distance to an object;
  calculating a distribution of image capturing magnifications within a specified portion of a surface of the object based on a focal length of the taking lens and a metered object distance;
  setting a plurality of blocks over the number of pixel data, the plurality of blocks respectively having different sizes in accordance with image capturing magnifications;
  setting a γ-characteristic for each block based on pixel data included in its block;
  correcting pixel data of each block in accordance with the set γ-characteristic, the γ-characteristic corrected image data including a geometric distortion that is caused by an oblique image capture; and
  correcting, based on a calculated distribution of image capturing magnifications, the geometric distortion of γ-characteristic corrected image data.

* * * * *

UNITED STATES PATENT AND TRADEMARK OFFICE
CERTIFICATE OF CORRECTION

PATENT NO. : 6,806,903 B1
DATED : October 19, 2004
INVENTOR(S) : Noriyuki Okisu et al.

It is certified that error appears in the above-identified patent and that said Letters Patent is hereby corrected as shown below:

Title page,
Item [75], Inventors, correct the name of the second inventor from "Shinichi Fuji" to -- Shinichi Fujii --;
Under ABSTRACT, change "47 Claims" to -- 48 claims --;

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,806,903 B1 | Page 1 of 1 |
| APPLICATION NO. | : 09/013055 | |
| DATED | : October 19, 2004 | |
| INVENTOR(S) | : Noriyuki Okisu et al. | |

It is certified that error appears in the above-identified patent and that said Letters Patent is hereby corrected as shown below:

On the title page, Item "(75) Inventors", correct the name of the second inventor from "Shinichi Fuji" to --Shinichi Fujii--;

On the title page, at the bottom of the right-hand column, change "47 Claims" to --48 Claims--;

In the claims, Column 62, Line 59-66, following Claim 47, add

--48. A method for processing image data generated by an image pickup device, the image data including a number of pixel data, the method comprising the steps of:
correcting a geometric distortion of the image data by applying a reduction processing to a specified portion of the image data, and filling dummy pixel data in a portion where pixel data is to be lost due to the reduction processing.--.

Signed and Sealed this

Fourth Day of September, 2007

JON W. DUDAS
*Director of the United States Patent and Trademark Office*